(12) United States Patent
Fonseka et al.

(10) Patent No.: US 8,228,839 B2
(45) Date of Patent: Jul. 24, 2012

(54) UPLINK MODULATION AND RECEIVER STRUCTURES FOR ASYMMETRIC OFDMA SYSTEMS

(76) Inventors: John P. Fonseka, Plano, TX (US); Eric Morgan Dowling, Escazu (CR)

( * ) Notice: Subject to any disclaimer, the term of this patent is extended or adjusted under 35 U.S.C. 154(b) by 0 days.

(21) Appl. No.: 12/461,747

(22) Filed: Aug. 24, 2009

(65) Prior Publication Data

US 2009/0316627 A1    Dec. 24, 2009

Related U.S. Application Data

(63) Continuation of application No. 11/374,217, filed on Mar. 14, 2006, now Pat. No. 7,609,614, which is a continuation-in-part of application No. 11/253,730, filed on Oct. 20, 2005, now Pat. No. 7,532,676.

(51) Int. Cl.
*H04B 7/204* (2006.01)

(52) U.S. Cl. ........................................ 370/319

(58) Field of Classification Search ................ None
See application file for complete search history.

(56) References Cited

U.S. PATENT DOCUMENTS

| | | | |
|---|---|---|---|
| 4,835,791 A | 5/1989 | Daoud | |
| 5,852,476 A | 12/1998 | Limberg | |
| 6,389,079 B2 | 5/2002 | Raheli et al. | |
| 6,473,418 B1 | 10/2002 | Laroia et al. | |
| 6,667,760 B1 | 12/2003 | Limberg | |
| 6,694,147 B1 | 2/2004 | Viswanath et al. | |
| 6,801,589 B1 * | 10/2004 | Dogan | 375/343 |
| 6,928,062 B2 | 8/2005 | Krishnan et al. | |
| 6,947,509 B1 | 9/2005 | Wong | |
| 7,020,110 B2 * | 3/2006 | Walton et al. | 370/334 |
| 7,539,475 B2 * | 5/2009 | Laroia et al. | 455/296 |
| 2002/0097469 A1 * | 7/2002 | Yee et al. | 359/154 |
| 2004/0081123 A1 | 4/2004 | Krishnan et al. | |
| 2005/0063330 A1 | 3/2005 | Lee et al. | |
| 2005/0068921 A1 | 3/2005 | Liu et al. | |
| 2005/0068931 A1 | 3/2005 | Cho et al. | |
| 2005/0068990 A1 | 3/2005 | Liu et al. | |
| 2005/0120097 A1 * | 6/2005 | Walton et al. | 709/220 |
| 2005/0135324 A1 | 6/2005 | Kim et al. | |
| 2005/0141474 A1 | 6/2005 | Lee et al. | |
| 2005/0215251 A1 | 9/2005 | Krishnan et al. | |
| 2005/0243939 A1 | 11/2005 | Jung et al. | |
| 2005/0265227 A1 | 12/2005 | Byun et al. | |
| 2006/0039312 A1 * | 2/2006 | Walton et al. | 370/319 |
| 2008/0198695 A1 * | 8/2008 | Abdi | 367/134 |

OTHER PUBLICATIONS

Kahn and Thomas, "Bandwidth Properties and Optimum Demodulation of Single Sideband FM," IEEE Transactions on Communications Technology, vol. COM-14, No. 2, Apr. 1966, pp. 113-117.

(Continued)

*Primary Examiner* — Chi H Pham
*Assistant Examiner* — Fan Ng
(74) *Attorney, Agent, or Firm* — Eric M. Dowling

(57) ABSTRACT

The present invention centers upon uplink communication protocols for use primarily with orthogonal frequency division multiple access (OFDMA) communication systems. Aspects of the invention relate to narrow band frequency division multiplexed (NBFDM) modulation protocols primarily for uplink usage in asymmetric OFDMA communication systems. In particular, NBFDM uplinks that use quadrature multiplexed continuous phase modulation are detailed and noncoherent detection schemes are developed to process the uplink channel signals without the need to transmit uplink phase reference signals. Other aspects of the invention relate to burst mode uplink communications in OFDMA systems such as those involving opportunistic beamforming.

6 Claims, 23 Drawing Sheets

OTHER PUBLICATIONS

Chadwick, "Binary Single-Sideband Phase-Modulated Systems," IEEE Transactions on Information Theory, Jan. 1972, pp. 214-215.

Anderson et al., "A Bandwidth-Efficient Class of Signal Space Codes," IEEE Transactions on Information Theory, vol. IT-24, No. 6, Nov. 1978, pp. 703-712.

Pizzi et al., "Convolutional Coding Combined with Continuous Phase Modulation," IEEE Transactions on Communications, vol. COM-33, No. 1, Jan. 1985, pp. 20-29.

Rimoldi, "A Decomposition Approach to CPM," IEEE Transactions on Information Theory, vol. 34, No. 2, Mar. 1988, pp. 260-270.

Fonseka et al., "Combined Coded Multi-h CPFSK Signaling," IEEE Transactions on Communications, vol. 38, No. 10, Oct. 1990, pp. 1708-1715.

Abriskamar et al., "Suboptimum Detection of Trellis Coded CPM for Transmission on Bandwidth- and Power-Limited Channels," IEEE Transactions on Communications, vol. 39, No. 7, Jul. 1991, pp. 1065-1074.

Sasase et al., "Multi-h Phase-Coded Modulation," IEEE Communications Magazine, Dec. 1991, pp. 46-56.

Hohubowicz et al. "Good Multi-T Phase Codes Under Bandwidth and Complexity Constraints," IEEE Transactions on Information Theory, vol. 40, No. 5, Sep. 1994, pp. 1699-1702.

Fonseka et al., "Nonlinear Continuous Phase Frequency Shift Keying," IEEE Transactions on Communications, vol. 39, No. 10, Oct. 1991, pp. 1473-1481.

Sundberg, "Continuous Phase Modulation," IEEE Communications Magazine, Apr. 1986, pp. 25-37.

Premji et al., "A Practical Receiver Structure for Multi-h CPM Signals," IEEE Transactions on Communications, vol. 35, No. 9, Sep. 1987, pp. 901-908.

Nyirenda and Korn "Acutocorrelation Function and Power Spectral Density of Complex Phase Modulated Signals Derived from Full Response CPM," IEEE Transactions on Communications, vol. 38, No. 10, Oct. 1990, pp. 1649-1652.

Ginesi et al., "Symbol and Superbaud Timing Recovery in Multi-H Continuous Phase Modulation," IEEE Transactions on Communications, vol. 47, No. 5, May 1999, pp. 664-667.

Mujtaba, "A Novel Scheme for Transmitting QPSK as a Single Sideband Signal," IEEE, 1998, pp. 592-597.

Campenalla et al., "Optimum Bandwidth-Distance Performance in Partial Response CPM Systems," IEEE Transactions on Communications, vol. 44, No. 2, Feb. 1996, pp. 148-151.

Aulin et al., "Continuous Phase Modulation—Part I: Full Response Signaling," IEEE Transactions on Communications, vol. COM-29, No. 3, Mar. 1981, pp. 196-209.

Aulin et al., "Continuous Phase Modulation—Part II: Partial Response Signaling," IEEE Transactions on Communications, vol. COM-29, No. 3, Mar. 1981, pp. 210-225.

Tassduq et al., "OFDM-CPM Signals for Wireless Communications," Canadian Journal of Elect. Comput. Eng., vol. 28, No. 1, Jan. 2003, pp. 19-25.

Tassduq et al., "Performance of Optimum and Suboptimum OFDM-CPM Receivers over Multipath Fading Channels," Wireless Communications and Mobile Computing, vol. 5, 2005, pp. 365-374.

Tassduq et al., "PAPR Reduction of OFDM signals using Multiamplitude CPM," Electronic Letters, Aug. 2002, pp. 915-917.

Tassduq et al., "OFDM-CPM Signals," Electronic Letters, Jan. 2002, vol. 38, No. 2, pp. 80-81.

Dariush et al: "Maximul-likelihood differential detection of uncoded and trellis coded amplitude phase modulation over AWGN and fading channels—Metrics and Performance," IEEE Trans. Comm, Jan. 1994, pp. 76-88.

Colavolpe et al: "Noncoherent sequence detection," IEEE Trans. Comm, Sep. 1999, pp. 1376-1385.

Colavolpe et al: "Noncoherent sequence detection of continuous phase modulations," IEEE Trans. Comm, Sep. 1999, pp. 1303-1307.

Raheli et al: "Per-survivor processing: A general approach to MLSE in uncertain environments," IEEE Trans. Comm. vol. 43, pp. 354-364.

Yiin et al: "Noncoherently detected trellis-coded partial response CPM on mobile radio channels," IEEE Trans. Comm., Voil. 44, Aug. 1996, pp. 967-975.

Vahlin et al "Use of guard intervals in OFDM on multipath channels," Electronics letters, vol. 30, 1994, pp. 2015-2016.

Vahlin et al: "Optimal finite duration pulses for OFDM," IEEE, 1994, pp. 258-262.

Floch et al: "Coded orthogonal frequency division multiplex," Proc. Of the IEEE, Jun. 1995, pp. 982-996.

Siohan et al: "Analysis and design og OFDM/OQAM systems based on filterbank theory," IEEE Trans. Sig. Proc., May 2002, pp. 1170-1183.

Viswanath et al: "Opportunisitic beamforming using dumb antenna," IEEE Trans. Info. Theory, Jun. 2002, pp. 1277-1294.

Makrakis et al: "Trellis coded noncoherent QAM: new bandwidth and power efficient scheme," IEEE 1989, pp. 95-100.

Akansu et al., "Orthogonal transmultiplexers in communication: a review," IEEE Trans. Sig. Proc., Apr. 1998, pp. 979-995.

\* cited by examiner

UPLINK MODULATION AND RECEIVER STRUCTURES FOR ASYMMETRIC OFDMA SYSTEMS

This patent application is a continuation of U.S. patent application Ser. No. 11/374,217, filed Mar. 14, 2006 now U.S. Pat. No. 7,609,614 entitled "Uplink Modulation and Receiver Structure of Asymmetric OFDMA Systems," which is a continuation-in-part of U.S. patent application Ser. No. 11/253,730, entitled "Single Sideband and Quadrature Multiplexed Continuous Phase Modulation," filed Oct. 20, 2005, now U.S. Pat. No. 7,532,676.

BACKGROUND OF THE INVENTION

1. Field of the Invention

This invention relates to uplink communication protocols for use primarily with orthogonal frequency division multiple access (OFDMA) communication systems. Aspects of the invention relate to narrow band frequency division multiplexed (NBFDM) modulation protocols that operate at communication layers and sub-layers (e.g., physical and link layers) below a network protocol layer of an OFDMA communication system. Other aspects of the invention relate to noncoherent detection and enhanced methods for uplink communications in OFDMA systems.

2. Description of the Related Art

Wireless local area networks such as WiFi (e.g., IEEE 802.11) have become popular for home and office use, as well as for Internet access in public areas known as "hot spots." More recently wireless broadband access (WBA) technologies such as WiMax (e.g., IEEE 802.16, 802.16a, 802.16e) and FLASH-OFDM™ (e.g., IEEE 802.20) have been introduced. These technologies are also known as wireless MAN (metropolitan area network) technologies. While wireless local area networks (e.g., WiFi) have a relatively short range, WBA technologies tend to have a much larger range, from a kilometer to seven kilometers, or even tens of miles or more, for example using 450 MHz FLASH-OFDM™ technology form Flarion Networks, Inc.

Wireless broadband access technology typically uses OFDM (orthogonal frequency division multiplexing) at the physical layer and uses OFDMA (orthogonal frequency division multiple access) at the layers at and directly above the physical layer to allow multiple users to share the spectral resources afforded by the multiple tones of the underlying OFDM physical layer.

Wireless local area networks only need to support a relatively small number of users in a relatively small local coverage area. Interference is usually minimized because WiFi coverage areas often do not overlap, and if they do, they can be assigned to operate in different frequency ranges or with different coding schemes or hopping sequences so that they can minimize co-network interference. However, because of the much broader coverage area of WBA base stations, WBA suffers from all of the spectral cost and interference issues normally associated with cellular communication systems. For example, much higher numbers of users need to contend for and share the same spectrum, and adjoining base stations typically provide inter-cell interference sources. In many cases, the net system capacity and operating parameters of a WBA system need to be determined by worst case conditions. In many cases these worst case conditions limit the net performance of the system.

OFDM transmission assumes that an estimate of the phase of a sub-band channel between a mobile unit the base station is available. In the downlink, the channel phase is estimated by sending known information, i.e., phase-reference symbols, on one or more specified pilot channels during each OFDM symbol interval. Because these phase-reference symbols are broadcast to and are used by all the mobiles in a given base-station antenna's coverage area, only a small amount of spectrum is needed to support pilot signaling. However, in the uplink of an OFDMA system, a similar scheme would require each mobile to transmit separate phase reference symbols back to the base station. Given N mobiles in a given antenna's multiple access coverage area, this would require N times as many sub-band channels to be used to support phase-reference pilot signaling as was required to achieve the same effect in the downlink. Also, because the downlink signal is transmitted by a single base station, all the different tones are perfectly synchronized to the pilot tone(s) and to each other. This allows the OFDM receivers in subscriber stations to readily demodulate the downlink signal. However, imperfect synchronization and different path delays and Doppler effects create a loss in orthogonality in the uplink. Hence in the uplink, the OFDMA performance is further reduced due to intercarrier interference effects due to imperfect synchronization among multiple simultaneously transmitting mobile units and an attendant loss of orthogonality within the composite uplink signal as observed at the base station.

Many proposals have been made to deal with the difficulties in the uplink of OFDMA systems. One category of proposal is to use an altogether different protocol in the OFDMA uplink. That is, it has been proposed to use OFDM in the downlink of an OFDMA system, and to use something else, such as a third generation (3G) cellular-technology in the uplink, for example the HDR™ wireless data air interface available from Qualcomm, Inc.

Another class of proposals has been to try to develop efficient phase estimators to deal with the unavoidable synchronization and orthogonality errors inherent in the uplink (see the patents cited in the accompanying information disclosure statement for further details). These types of proposals seek to improve the situation via signal processing techniques similar to the idea of adaptive equalizers, but on a per-mobile/per channel basis. While these techniques can provide improvement, they are still limited in their ability to correct all of the underlying problems that are raised in an OFDMA uplink where different subscriber-side mobile units are not perfectly synchronized and give rise to different and time-varying multi-path delay effects and Doppler effects.

Given the inherent difficulties in the prior art OFDMA uplink protocols, it is contemplated by the present invention that uplink technologies are needed that can effectively and inherently overcome the synchronization and other related channel mismatch problems that plague prior art OFDMA uplink performance.

SUMMARY OF THE INVENTION

The present invention solves the aforementioned problems by providing novel uplink modulation schemes and receiver structures for use in processing composite multiple access uplink signals generated using the uplink modulation schemes.

In one aspect of the invention, a narrow band frequency division multiple access (NBFDMA) modulation format is used in the uplink instead of a prior art OFDMA type uplink protocol. The NBFDMA protocol may use coherent or noncoherent detection to demodulate each channel's symbol stream without the need to send uplink phase reference symbols. In another aspect of the invention, the NBFDM uplink is replaced with an offset OFDM uplink, but similar coherent and noncoherent receiver techniques are used to allow individual channels to be demodulated without the need to send phase reference symbols in the uplink. Other aspects of the invention use time division multiple access and frequency hopping techniques to allow individual mobile units to send very many symbols in parallel of different frequencies so that the ratio of phase reference symbols to data symbols becomes comparable to the efficiency experienced in the downlink. Preferably, this technique is augmented with an opportunistic method whereby transmission bandwidth is allocated to a mobile unit having a desirable near-instantaneous signal to noise ratio.

In an aspect of the present invention an NBFDM protocol (or some other protocol, like an offset-OFDM protocol) is used in the uplink while maintaining an OFDMA protocol in the downlink to create an Asymmetric OFDMA protocol, i.e., AOFDMA. An AOFDMA protocol is analogous to ADSL or V.90 because it uses different modulation schemes in the uplink and the downlink. To the layers at and just above the physical layer, though, the uplink protocol behaves operationally much like an OFDM uplink, but with reduced problems dues to lack of synchronization among mobile units and loss-of-orthogonality problems normally associated OFDMA uplinks. A key aspect of the uplink protocol is that it be some form of FDM protocol (e.g., NBFDM or offset OFDM) where each channel can individually be at least one of coherently or noncoherently demodulated without the need to send phase reference symbols on separate pilot channels.

In accordance with certain aspects of the present invention, the uplink FDM modulation protocol (e.g., NBFDM or offset OFDM) is embodied using similar tone hopping (e.g., slow hopping), beam forming, bit loading, and tone allocation algorithms as though it were an ordinary OFDMA uplink protocol. While a certain level of inter-mobile-uplink-transmission synchronization is still required and desirable, the tolerances are advantageously relaxed, thereby increasing performance and avoiding a host of error conditions.

In embodiments involving NBFDMA based uplinks and some types of embodiments involving offset OFDMA based uplinks, each tone is preferably modulated using a bandwidth efficient modulation scheme. For example, MSK, SSB-MSK, QM-MSK, or various forms of QM-CPM or TCM-QM-CPM as presented in the parent application may be used with either full-response or partial-response signaling. For the case of NBFDMA uplinks, the modulation type is preferably selected to allow the NBFDMA uplink channels to be spaced using the same 1/T spacing as the OFDMA downlink channel. The fast roll off of these channels enables them to be spaced as closely as the overlapped OFDMA channels. Depending on the operating parameters of the system and the specifically selected modulation scheme, the channel spacing can be made to be slightly more than 1/T or slightly less, for example plus or minus thirty percent, depending on the specific embodiment. The actual channel spacing is a function of the actual modulation scheme selected for the particular embodiment. For example, a spacing of 1.1/T might be used in some embodiments.

Channelizing filter banks are preferably used to enforce strict channel separation, to include a small guard band. Guard bands are useful to separate adjacent signals and to accommodate for relative Doppler shifting among the signals transmitted on different sub-channels by different mobile units. Various techniques such as passband sampling, multirate channelization filter banks (e.g., cosine-modulated filter banks, polyphase filter banks, etc.), vector transformations such as the fast Fourier transform, or conventional mixing and filtering may be used to separate the NBFDM sub-channels.

Coherent detection or noncoherent detection can be individually performed in each NBFDM sub channel without the need to maintain as strict of inter-channel synchronization. This eliminates the need for uplink pilot signal, or embodiments can be configured where different mobiles share one or more uplink pilot channels on a time-division multiplexed (TDM) basis. In embodiments that use offset OFDM in the uplink, guard bands are not generally needed.

BRIEF DESCRIPTION OF THE FIGURES

The various novel features of the present invention are illustrated in the figures listed below and described in the detailed description that follows.

DETAILED DESCRIPTION OF THE PREFERRED EMBODIMENTS

Figure 1:
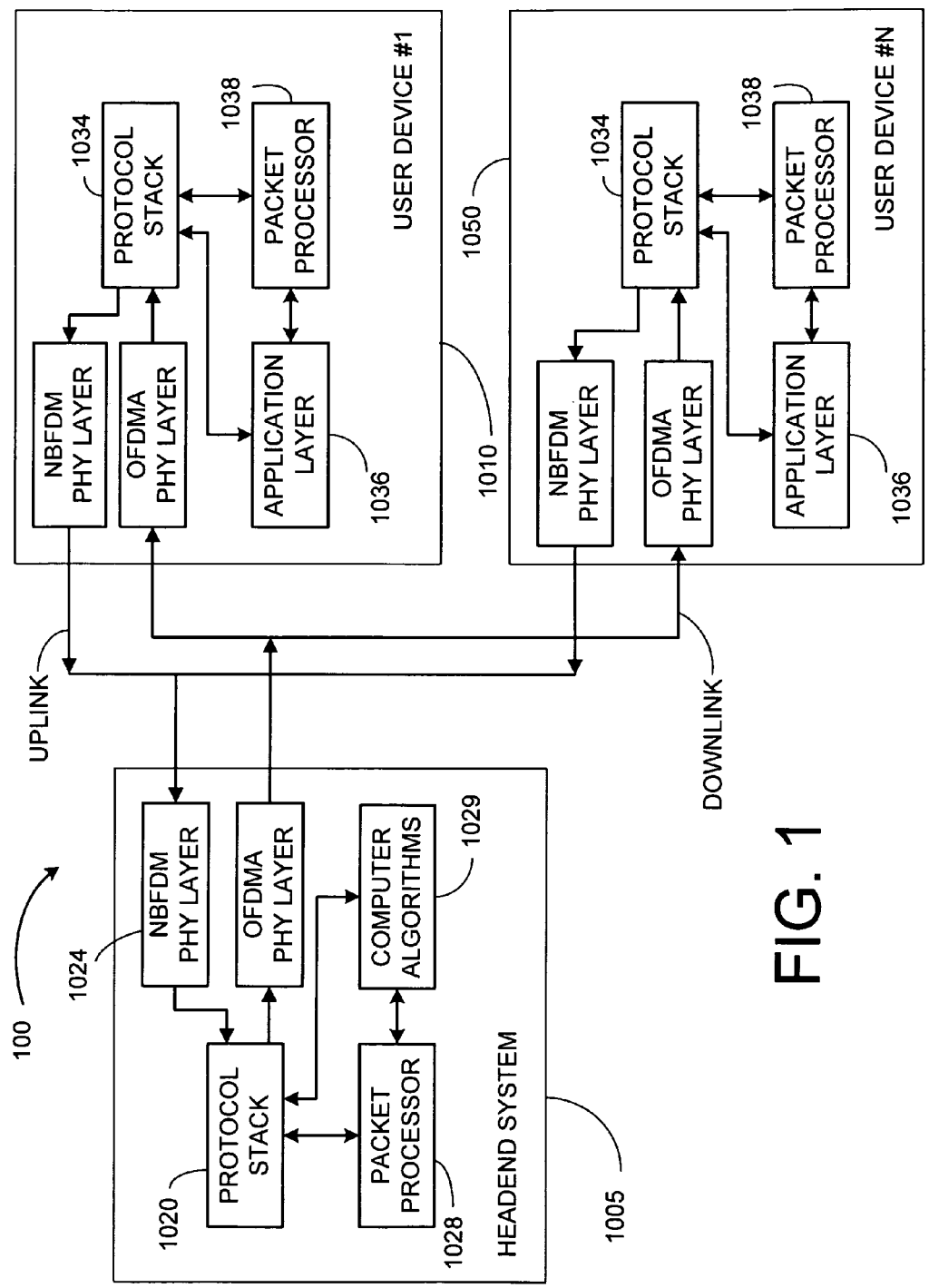
FIG. 1 is a block diagram representing an asymmetric uplink/downlink protocol structure for use in certain types of asymmetric OFDMA (AOFDMA) communication systems.

The detailed description of the preferred embodiments is organized as follows:
I. AOFDMA Communication Systems with NBFDMA and OOFDMA Uplinks
II. CPM, SSB-CPM, and QM-CPM
III. Review of coherent detection of CPM, SSB-CPM and QM-CPM signals
IV. Viterbi decoding of SSB-CPM and QM-CPM waveforms
V. Noncoherent detection of QM-CPM Signals—quadrature matched filter (QMF) approach
VI. Noncoherent detection of QM-CPM Signals—differential phase and envelope (DPE) approach
VII. Continuous-phase tone hopping in the NBFDM uplink
VIII. TDMA/OFDMA bursted uplinks embodiment of AOFDMA
IX. Embodiments and Alternative Embodiments
I. AOFDMA Communication Systems with NBFDMA and OOFDMA Uplinks Traditional OFDM uses a spectrally inefficient modulation format in each sub-channel. In traditional OFDM, each sub-channel's modulation uses a square wave pulse shape that has a slow sin(x)/x spectral roll-off. OFDM, however, achieves a degree of spectral efficiency by allowing the spectra of different subchannels to overlap in a controlled way so as to ensure the information of the different channels is orthogonal. Using this approach, standard OFDM systems are able to space the channels at 1/T where T is the OFDM symbol interval.

Other more spectrally efficient OFDM signaling schemes based on pulse-shaped offset-OFDM (called "OOFDM" herein) have also been proposed, but these schemes have the same synchronization problems and loss-of-orthogonalization problems as standard OFDM when incorporated into an OFDMA uplink. This is because different users still need to transmit into different frequency slots and this gives rise to synchronization and Doppler shift errors that adversely affect orthogonality in OFDM and pulse-shaped OOFDM based uplinks.

We now turn to specific embodiments of the present invention that make use of an NBFDM based multiple-access uplink protocol that behaves like an OFDMA uplink protocol to the upper layers, but does not have the same difficulties. Instead of using a spectrally inefficient signaling scheme with orthogonal subchannels, the NBFDM uplinks can be constructed by using highly bandwidth efficient signaling schemes with very fast spectral roll-offs and optional guard bands. The preferred embodiments use narrow-band modulation schemes with very high spectral roll off such as CPM, SSB-CPM, and various forms of QM-CPM. In accordance with aspects of the present invention, these modulation schemes can achieve on the order of a 1/T spacing and provide comparable performance as OFDMA. Advantageously, this spacing is attained without the need to send phase reference symbols on uplink pilot channels or to maintain as strict of inter-channel synchronization as needed to achieve inter-channel orthogonality.

The prior art views orthogonality as being beneficial and important in OFDMA systems, but the NBFDM uplink aspects of the present invention take an alternative view. NBFDM replaces orthogonality with narrow band uplink channels that are separated in frequency. This is because in the uplink, different mobiles will not transmit at exactly the same time, and different mobiles will have different relative Doppler shifts, so that the uplink signal will be observed with a loss of orthogonality at the base station. Advantageously, NBFDM provides an alternative uplink protocol that behaves similarly to a native OFDM type uplink protocol as viewed from just above the physical layer. Even at the physical layer itself, NBFDM acts similarly to OFDM, the main difference being that OFDM's orthogonality requirement is traded for a frequency separation requirement, and as a side effect, coherent or noncoherent detection can be performed in each channel without the need to send phase reference symbols on multiple pilot channels in the uplink.

Referring now to FIG. 1, a system level view of an AOFDMA communication system 100 as implemented in accordance with particular aspects of the present invention is illustrated in block diagram form. A headend communication device 1005 is preferably coupled to a communication network such as the public switched telephone network, the Internet, an intra-net, or a home network. In a preferred embodiment, the headend system is a wireless broadband access (WBA) station, and in another preferred embodiment it is a cable modem headend station. Other media such as digital subscriber lines, fiber optic communication (e.g., with wavelength division multiplexing), or free space laser communications could also be used.

A headend communication device 1005 communicates with a first user device 1010 and a second user device 1050. In general, each "user device" may actually be a customer premises subscriber device that multiplexes access for a plurality of individual users, and there can in general be more than two user devices coupled to the AOFDMA system at any given time. At any instant in time, there may be zero or more user devices operating, but in many embodiments, during peak hours there could be between several and several hundred user devices operating simultaneously, depending on the actual number of users supported by a particular embodiment and the instantaneous traffic load.

In the illustrative embodiment shown in FIG. 1, the headend system 1005 transmits to each of the user devices 1010, 1050 simultaneously using a downlink protocol implemented using an OFDM signaling scheme. The user devices 1010, 1050, on the other hand, transmit to the headend system 1005 simultaneously using an uplink implemented using an NBFDM signaling scheme. For example, the NBFDM signaling scheme could use a QM-CPM modulation format in each NBFDM sub channel.

In the AOFDMA system 100, the headend 1005 includes a protocol stack 1020 which is coupled to a packet processor 1028 which in turn is coupled to an outside network such as a private network (e.g., run by an enterprise or service provider) and/or a public network (e.g., the Internet). The protocol stack is also coupled to an OFDMA downlink module and an NBFDM uplink module. A computer algorithms block 1029 optionally provides services such as accounting, billing, user account management, user profiles, roaming management, software downloads, and other computerized services.

The user devices 1010, 1050 are electrically constructed similarly to the headend, but the computer algorithms block 1029 is replaced by an application layers services block 1036 to provide a user interface and application layer program support to the user device. If the user device 1010 is embodied as a network router (i.e., user device 1010 and/or 1050 is embodied as a subscriber premises interface device), then a packet processor block 1038 performs local network routing functions to a collection of one or more local user devices, and the application layer block is optional. The user devices can be embodied as vehicle mounted wireless mobile units, handheld devices such as wireless enabled PDAs, laptops, or smartphones. The user devices can also be embodied as fixed station devices, for example, using a parabolic dish antenna to communicate via a line-of-sight (or non-line-of-sight) microwave link with the headend (e.g., base station).

The NBFDM uplink blocks in the user devices transmit from the mobile units 1010, 1050 to the headend 1005 narrow band communication signals on a set of NBFDM sub-channels. Preferably the channels are spaced at 1/T, where T is the symbol rate, or possibly about this spacing, e.g., plus or minus five or ten percent, depending on the requirements of the specific embodiment at hand. As discussed below, each sub channel preferably uses a bandwidth efficient modulation scheme such as CPM, SSB-CPM, or QM-CPM. Such modulation types provide very fast spectral roll offs and allow narrow band channels to be used. Once the NBFDM signals are generated and transmitted, they can be received using a receiver bank of either coherent or noncoherent detectors (or a combination thereof).

In the case where the NBFDM block in the headend uses coherent detection, each sub-channel can individually perform frequency and/or phase locking and lock to the individual sub-channel's signal. Any of the phase locking and symbol timing recovery loop algorithms discussed in the parent application may be used to recover the phase for use in a coherent detector (e.g., see in the parent application FIGS. 18-21 and the discussion thereof), and the error signal for use in phase and symbol timing recovery is preferably the same signal or a similarly derived signal as the branch metric signals used in the Viterbi algorithm with the coherent detector. Various forms of coherent detectors are described in the parent application and any of the CPM or class of SSB-FM signaling schemes discussed in the parent application may be used in the AOFDMA systems as illustrated in FIG. 1 or its NBFDMA based alternative embodiments.

In addition to phase locked loop related recovery schemes as discussed in the parent application, especially when slow frequency hopping is used, each sub-channel's receiver can optionally use a block optimization algorithm to recover phase and/or symbol timing. In a block optimization algorithm, an error function is defined and the block optimization algorithm operates on data in the data block in order to find the values of one or more parameters that cause a measure of the error function to be minimized with respect to the one or more parameters. For example, any known linear optimization algorithm (e.g., least squares solution to an over constrained matrix problem $Ax=b$) or nonlinear optimization algorithm could be used to minimize an error function. Like the loop based approaches, the block-error function would preferably be the same as or derived from on the branch metrics of the Viterbi decoder as discussed herein. Typically one or more parameters indicative of time shifts can be used to align the data in the data block so that the error function is minimized or approximately minimized over the data in the data block. The carrier recovery and/or the symbol timing recovery can optionally be performed in a joint optimization involving block or sequential algorithms in conjunction with equalization. See the parent application form some details on various embodiments that could alternatively be implemented using block techniques, for example, over a block of data defined by the dwell time at a particular tone in a slow hopping sequence.

As discussed in further detail herein below, noncoherent receivers can also be constructed to implement the NBFDM uplink block in the headend 1005. A noncoherent detector typically looses a slight amount of BER performance relative to coherent embodiments, for example 3 dB or less, depending on the embodiment. However, noncoherent detectors do not need to implement carrier recovery, and this saves computation.

In certain AOFDMA embodiments of the system of FIG. 1, the present invention contemplates using a fast hopped OFDMA protocol in the downlink for data transmission from the headend to the user devices. In the same system, the present invention contemplates using a slow hopping sequence in the uplink from the user devices back to the headend. The OFDMA downlink can readily support fast hopping, especially using one or more shared pilot tones in the downlink to support synchronization. In the uplink, slow hopping is contemplated to allow the different user devices time to transmit a block of symbols before needing to hop frequencies. When the uplink uses a continuous phase modulation scheme like QM-CPM, a continuous phase frequency hopping technique as discussed herein below is preferably used to maintain spectral characteristics of the underlying sub-channel modulation scheme across the hops.

It should also be recognized that while FIG. 1 shows a preferred AOFDMA system, similar systems could be constructed, such as a bi-directional NBFDMA system. These embodiments are also within the scope of the present invention, but involve a separate aspect of the present invention, i.e., bi-directional NBFDMA based multiple access systems. In the bi-directional NBFDMA systems, the OFDMA downlink is replaced by an NBFDMA downlink.

FIG. 1 also illustrates various communication methods for use in a wireless broadband access network systems. The headend 1005 simultaneously sends a plurality of communication signals to a plurality of wireless user devices (e.g., 1010 and 1050) in the downlink direction. The communication signals are sent on separate tones of an orthogonal frequency division multiplexed physical layer. The headend 1005 then simultaneously receives from the plurality of wireless user devices a set of narrow band frequency division multiplexed uplink signals that are non-orthogonal and are substantially non-overlapping in the frequency domain. For example, substantially non-overlapping in the frequency domain could mean that a local sub-band can be constructed around a tone that contained ninety or ninety-five, or ninety-nine percent of the energy of the signal modulated onto the tone. Guard bands can optionally be used for further frequency-domain signal separation. The headend 1005 uses frequency domain filtering to separate different respective narrow band frequency division multiplexed signals of the set of narrow band frequency division multiplexed signals. For example, the output of first and second frequency-selective filters comprise first and second baseband data signals that respectively correspond to first and second information sequences transmitted by respective first and second distinct ones of the wireless user devices.

For example, in various communication methods and systems in accordance with the present invention, the narrow band frequency division multiplexed signals may be constructed to have a frequency spacing drawn from a range of [0.8 T, 1.2 T], where T is the narrow band frequency division multiplexed signal's symbol duration. As discussed above, in this type of embodiment, an NBFDM uplink is used that does not provide OFDM in the uplink, but instead provides a collection of narrowband channel signals modulated onto a set of uplink tones, and signal separation is performed by selecting appropriate frequency sub-bands from the uplink signal.

This is in contrast to OFDM which typically uses an orthogonal decomposition of a composite signal to isolate information modulated onto each tone, but with the orthogonal processing, signal separation is not performed by frequency domain filtering but instead by the orthogonal transformation. The signal energy of each sub-band signal in an OFDM system is not substantially limited to a small spectral region around the tone's center frequency, but instead the frequency spectra of the different signals modulated onto respective tones significantly overlap.

FIG. 1 also illustrates a method for use in a wireless broadband access network, where the headend 1005 simultaneously sends communication signals to a plurality of wireless user devices (e.g., 1010, 1050). The communication signals are sent on separate tones of an OFDM physical layer communication signal. The headend 1005 simultaneously receives from the plurality of wireless user devices respective narrow band sub-band signals whose useful information-bearing content is substantially each respectively confined to a respective sub-band channel. The headend 1005 then extracts a particular one of a plurality of individual baseband data streams from a respective particular sub-band channel relative to a respective tone by performing frequency domain filtering operations to recover useful information-bearing content modulated onto the respective tone.

In a similar method, the headend 1005 transmits information signals to a plurality of wireless subscriber stations using a an OFDM communication protocol. The headend system 1005 simultaneously receives from the plurality of wireless subscriber stations a set of non-orthogonal narrow band information signals whose information-bearing content is respectively substantially confined to a respective sub-band region of a frequency spectrum. The headend 1005 then extracts the respective information signals corresponding to individual ones of the plurality of wireless subscriber stations by performing frequency-domain filtering to extract the respective information signals from the respective sub-band.

Another specific type of method illustrated by FIG. 1 is for use in a wireless multiple-access communication system where a headend communicates with a plurality of wireless subscriber stations, and the plurality of wireless subscriber stations share an uplink frequency bandwidth using frequency division multiplexing. For example, the headend 1005 simultaneously transmits in a downlink direction a plurality of downlink information signals to a plurality of wireless subscriber stations using an OFDM downlink communication protocol. The headend 1005 then simultaneously receives from the plurality of wireless subscriber stations a set of non-orthogonal narrow band frequency division multiplexed signals. Each non-orthogonal narrow band frequency division multiplexed signal comprises a respective uplink information signal that is modulated onto a respective uplink tone. A particular one of the non-orthogonal narrow band frequency division multiplexed signals is modulated by a particular uplink information signal that is substantially confined to a particular sub-band region of the uplink frequency bandwidth. Next signal processing is employed to perform frequency-domain filtering to isolate signal energy contained in the particular sub-band region. This allows a signal processing sub-system to extract the particular uplink information signal from the set of non-orthogonal narrow band frequency division multiplexed signals. In such systems, small guard bands may optionally be used to enhance signal separation and the amount of signal energy contained within the particular sub-band region may be, for example between 90 and 99% of the total signal energy of the particular information signal. The frequency spacings between tones is selected to allow, for example, 97% of the signal energy to fit in the particular region with a small guard band.

An alternative embodiment is to use an ordinary FDMA uplink and an OFDMA downlink. This alternative embodiment is similar to the AOFDMA systems described herein, only the frequency spacing in the FDMA uplink is chosen to be larger than in an NBFDM uplink. For example, while an NBFDM uplink typically uses a frequency spacing on the order of 1/T (where T is the NBFDM uplink symbol interval and the OFDM downlink symbol interval, for example in the range between [0.8, 1.20] times T), the spacing can be made to be larger, although this lowers the system capacity in the uplink. For example, AOFDMA systems can be constructed where the downlink symbol interval is T and the downlink frequency spacing is 1/T, but the uplink frequency spacing is larger, for example in the range from 2/T to 10/T, or even higher. Thus it should be recognized that all such embodiments are in the scope of various aspects of the present invention. Such systems can be advantageous in some cases if more downlink bandwidth is needed than uplink bandwidth and simple and robust processing is desired in the uplink.

In another type of alternative embodiment of the present invention, the NBFDM uplink modulation used in the NBFDMA uplink protocol is replaced with an OOFDM uplink modulation scheme used to form an "OOFDMA" uplink protocol. That is, in FIG. 1, blocks 1024 and the blocks labeled "NBFDM PHY LAYER" are replaced with blocks labeled "OOFDM PHY LAYER." As discussed in an article by B. Le Floch et al., entitled: "Coded orthogonal frequency division multiplex," Proceedings of the IEEE, Vol. 83, No. 6, June 1995, pages 982-996, ("the LeFloch reference"), offset QAM (OQAM) and MSK signals can be sent on each channel using what we call "OOFDM," as can other signals (e.g., OFDM/IOTA as discussed therein). The class of types of orthogonal signals that can be sent is expanded in another article by P. Siohan et al., "Analysis and design of OFDM/OQAM systems based on filterbank theory," IEEE Trans Signal Processing, Vol. 50, No. 2, May 2002, pp. 1170-1183 ("the Siohan reference"). Also, efficient FFT based filterbank methods can be used to synthesize and analyze OOFDM signals. The LeFloch reference and the Siohan references are incorporated herein to help the reader recall the known prior art that serves as a background for aspects of the present invention.

As discussed in the LeFloch and Siohan references, narrow band modulations like MSK and other types of modulations may be sent in such a way that the orthogonality requirement of OFDM is maintained. An idea is to offset the symbols transmitted on each channel by a half symbol interval and to use symmetrical pulse shaping filters to shape the transmitted symbols. Also, for example, continuous modulations like MSK based OOFDM signals may be constructed and orthogonality can still be maintained in the OOFDM/MSK signal. Because each OOFDM symbol can be viewed as a (sampled) continuous signal in each channel, all of the coherent and noncoherent detectors discussed herein for use in NBFDM systems can be adapted for detecting the signals present in the OOFDM channels. Therefore, an alternative embodiment is to use OOFDM to generate the uplink signal, and to use per-channel coherent or noncoherent detection to detect the signals in the OOFDM channels.

Hence in this application, any discussion given with respect to NBFDM, where applicable, alternatively applies to OOFDM based uplinks as well. For example, certain NBFDMA uplinks discussed herein can be replaced by OOFDMA uplinks. While the NBFDM uplinks uses guard bands to separate signals, OOFDM uplinks rely on signal orthogonality for signal separation at the base station. However, both NBFDM and OOFDM share in common quasi-continuous signals in each multiplexed channel, and therefore the same general coherent and noncoherent detection schemes can be applied to eliminate the need to send phase-reference symbols using uplink pilot channels.

Figure 1A:
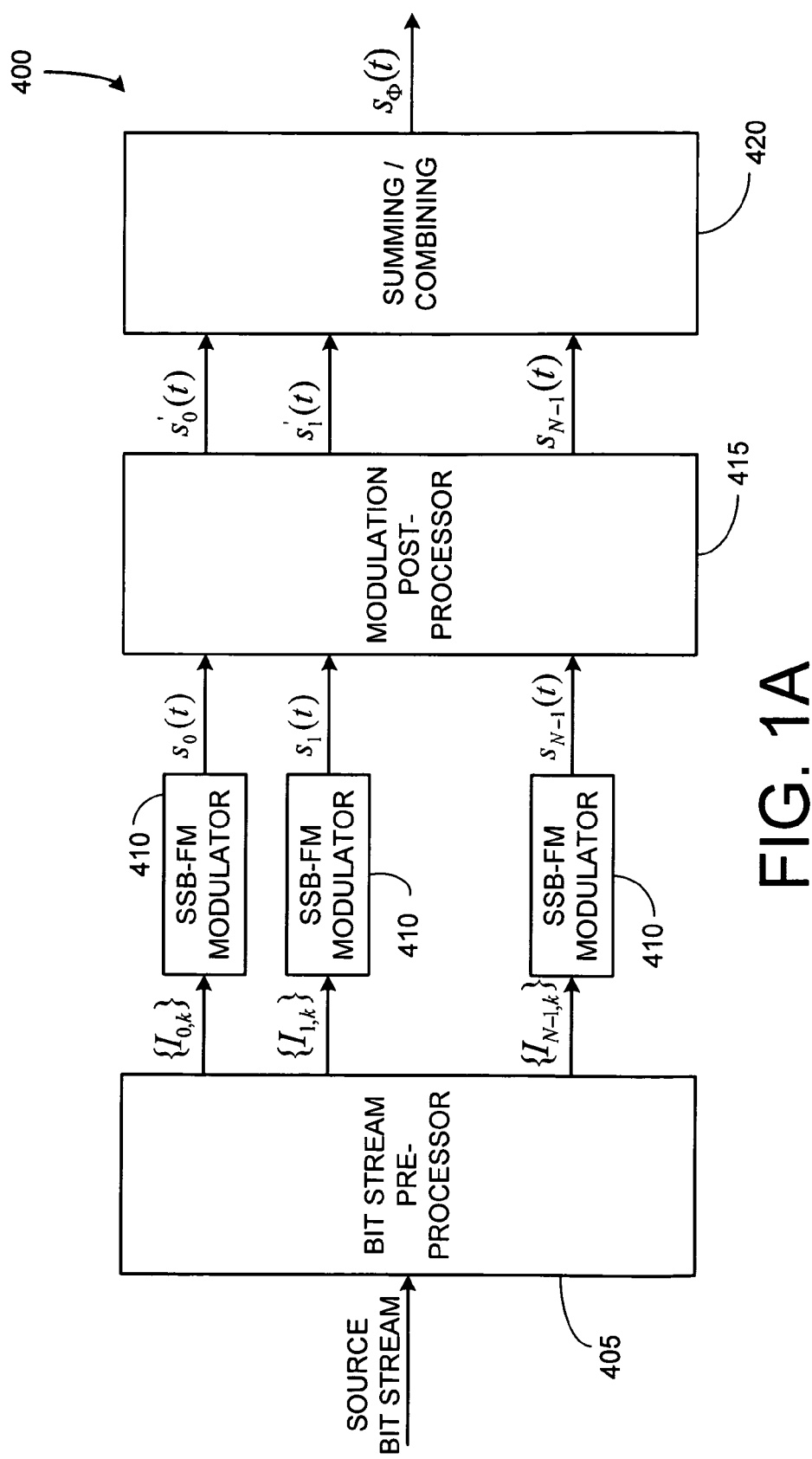
FIG. 1A is a block diagram illustrating an embodiment of an NBFDM uplink modulation system for transmitting narrowband data streams onto a plurality of uplink carriers.

Referring now to FIG. 1A, an embodiment of an uplink transmitter for use in an NBFDMA system is shown in block diagram form. Other aspects, such as slow frequency hopping control are discussed later in the application. Note that the blocks labeled SSB-FM can be any of the general class of SSB-FM signals discussed in the parent application, to include SSB-CPM and QM-CPM. The details of the structure and operation of the transmitter of FIG. 1A are provided in the parent application in connection with FIG. 22 therein. In uplink scenarios, the transmitter of FIG. 1A is embedded into a subscriber terminal and typically only transmits on a subset of the total set of tones allocated to the corresponding subscriber. The subset of tones used by any given subscriber terminal for uplink transmission is generally determined by a control function that is derived from the headend.

Figure 1B:
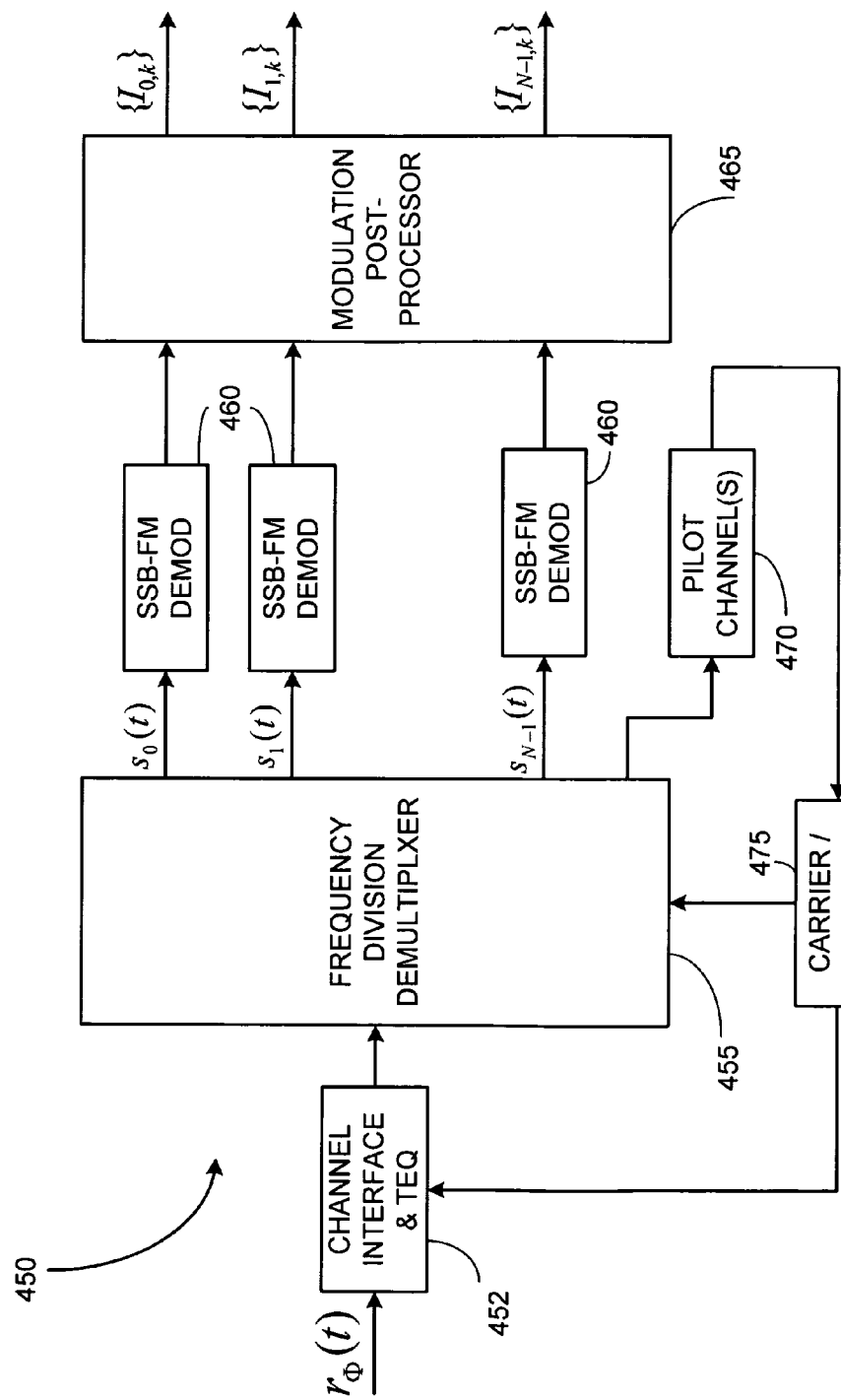
FIG. 1B is a block diagram illustrating an embodiment of an NBFDM uplink demodulator system for demodulating narrowband data streams received on a plurality of uplink carriers.

FIG. 1B shows an example of an NBFDM receiver structure as could be implemented in the headend system of FIG. 1. The NBFDM system is a form of a transmultiplexer and is preferably implemented with computationally efficient techniques like fast polyphase filter banks. The details of the structure and operation of the transmitter of FIG. 1B are provided in the parent application in connection with FIG. 23 therein.

II. CPM, SSB-CPM, and QM-CPM

This patent application is a continuation in part of co-pending U.S. patent application Ser. No. 11/235,730, entitled "Single Sideband and Quadrature Multiplexed Continuous Phase Modulation", filed Oct. 20, 2005. U.S. patent application Ser. No. 11/235,730 is hereby incorporated herein by reference. In this section we review CPM, SSB-CPM and QM-CPM signaling. For any further enablement related details beyond what is provided in this section, the reader is referred to the U.S. patent application Ser. No. 11/235,730.

A continuous phase modulation (CPM) baseband signal is given by:

$$x(t) = Ae^{j\alpha(t)} = A[\cos(\alpha(t)) + j\sin(\alpha(t))], \quad (1)$$

where, A is a constant amplitude, and $\alpha(t)$ is a phase function. Define an information sequence as: $I = (\ldots, I_{k-1}, I_k, I_{k+1}, \ldots)$; $I_k \in \{-1, +1\}$. Then the CPM phase function can be written:

$$\alpha(t) = 2\pi h \sum_{k=-\infty}^{\infty} I_k \int_{-\infty}^{t} g(\tau - kT) d\tau + \beta \quad (2)$$

where, h is a modulation index, T is a symbol duration, g(t) is a baseband pulse-shape waveform, and $\beta$ is a fixed phase-offset. The waveform g(t) can be defined to be nonzero only for $0 \leq t < T$, corresponding to full response CPM, or equivalently can be defined to have a region of support longer than a symbol interval, thus corresponding to partial response CPM. The power spectrum of x(t) in equation (1) is two-sided and x(t) is complex-valued.

To improve spectral efficiency, in SSB-CPM and QM-CPM based embodiments we map the complex signal, x(t), onto a real-valued trellis signal, m(t). Any mapping $T_1[\circ]$: $x(t) \rightarrow m(t)$ can be selected that maps the complex signal x(t) to the real-valued trellis signal, m(t), in such a way that we can still recover the original information sequence embedded into the memory structure (phase trellis paths) of the complex baseband signal. Preferably, the mapping is selected to preserve the spectral properties of x(t) so that after the transformation, the real-valued trellis signal, m(t), will occupy the same amount of bandwidth as the original complex baseband signal, x(t).

A simple and useful complex-to-real mapping for many embodiments is:

$$m(t) = \frac{1}{A}\text{Re}\{x(t)\} = \cos(\alpha(t)). \quad (3)$$

In equation (3), m(t) has the same spectral properties as the original CPM signal and all of the information encoded into x(t) can be extracted from m(t) without any loss in BER performance as compared to ordinary CPM, under a broad set of conditions.

With the mapping of equation (3), complex constellation points of x(t) that are complex conjugate pairs (e.g., $S_1 = a+jb$ and $S_2 = a-jb$) will map to the same value, a. While both constellation points $S_1$ and $S_2$ may map to the same single value, if a set of allowable phase transitions in and out of $S_1$ and $S_2$ give rise to distinct trellis paths in m(t) that are discernable by a trellis decoder, then this ambiguity can be resolved. As long as the paths corresponding to merge events in m(t)'s resulting signal trellis are distinct, subsequent trellis decoding techniques will be able to recover the original information sequence from the real-valued trellis signal, m(t).

Figure 2:
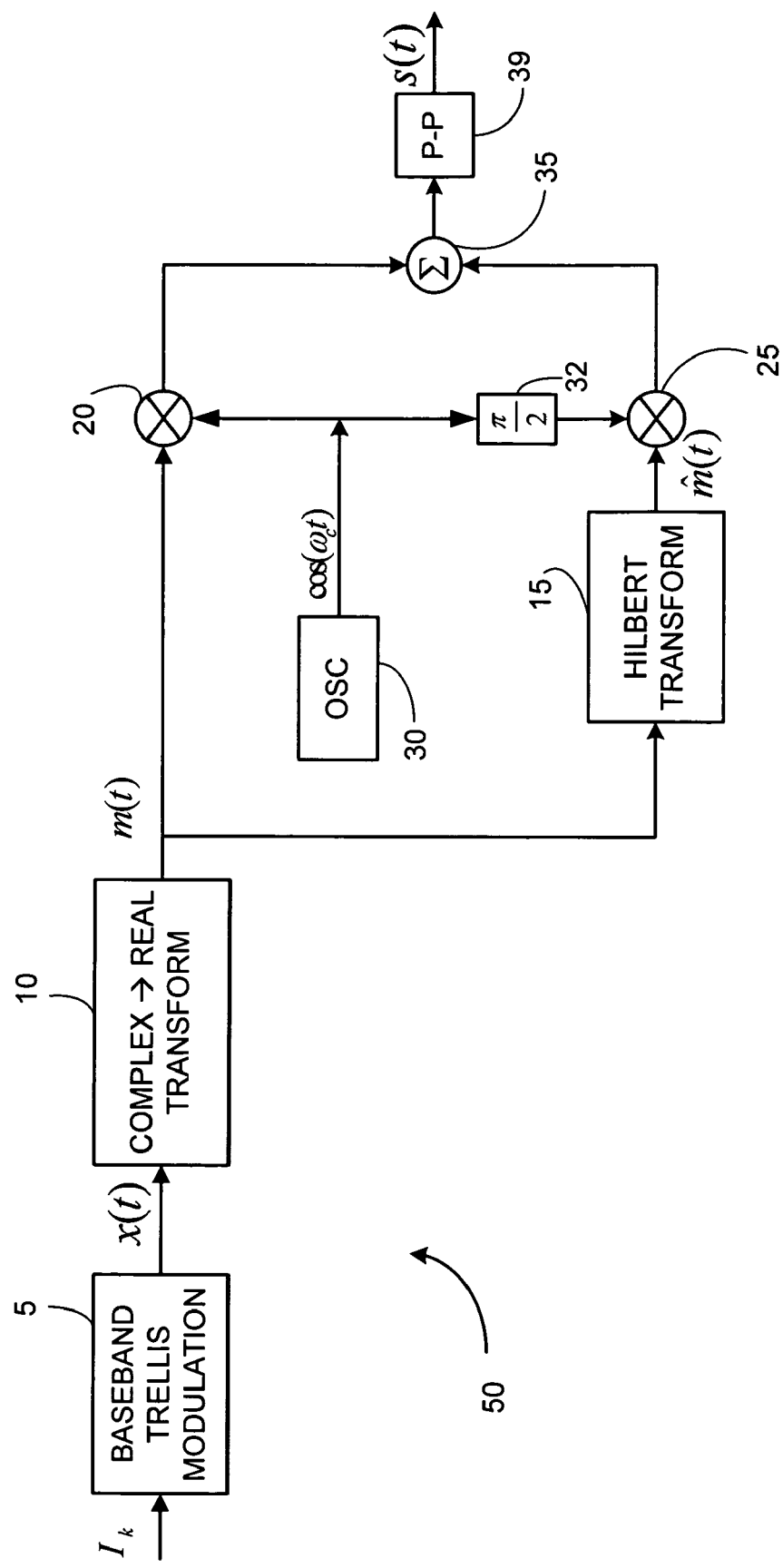
FIG. 2 is a block diagram illustrating a transmitter structure for generating an SSB-CPM waveform.

Referring to FIG. 2, a transmitter structure to generate an SSB-CPM signal is shown in block diagram form. The transmitter of FIG. 2 sends m(t) in half the bandwidth of an ordinary CPM signal (or, alternatively, sends a double-data rate version of m(t) in the same bandwidth as an ordinary CPM signal), by using a Hilbert transform approach to generate SSB-AM signals from real-valued baseband signals. The transmitter processes the real-valued trellis signal obtained according to $T_1[\circ]: x(t) \rightarrow m(t)$ using equation (3) by forming an SSB (upper sideband) lowpass equivalent signal according to:

$$z(t) = m(t) + j\hat{m}(t) \quad (4)$$

where, $\hat{m}(t)$ is the Hilbert transform of m(t). The SSB modulated signal at carrier frequency $\omega_c$ can be expressed as $$s_\pm(t) = A\text{Re}\{z(t)e^{j\omega_c t}\} \quad (5)$$

$$= Am(t)\cos(\omega_c t) \mp A\hat{m}(t)\sin(\omega_c t)$$

where the minus sign subscript gives the lower sideband and the plus sign subscript gives the upper sideband. Without loss of generality, focus on the upper sideband for now, which we can write $$s(t) = Am(t)\cos(\omega_c t) - A\hat{m}(t)\sin(\omega_c t), \quad (6)$$

or, $$s(t) = A\sqrt{[m^2(t)+\hat{m}^2(t)]}\cos[\omega_c t+\theta(t)] \quad (7)$$

where $$\theta(t) = \tan^{-1}\left[\frac{\hat{m}(t)}{m(t)}\right] \quad (8)$$

is the phase variation of s(t). It is seen that the SSB-CPM signal is no longer a constant envelope signal like its ordinary CPM counterpart, and it has a time varying phase variation.

If $\alpha(t)$ is continuous, m(t) and $\hat{m}(t)$ are continuous, hence, $\theta(t)$ is also continuous. Thus the continuous phase property of the signaling scheme is preserved through the transformation from ordinary CPM to SSB-CPM. While the SSB-CPM signal is not a constant-envelope signal like its ordinary CPM counterpart, the envelope fluctuation of the SSB-CPM signal is controlled and minimal, for example, with a PAPR between 1.2 and 1.8 which is controllable by the length of the FIR filter used to implement the Hilbert transform.

Various SSB-CPM signal types can be formed using equations (1)-(5). For example, if minimum shift keying (MSK) is applied in equation (2), then the resulting signal is an SSB-MSK signal. If Gaussian minimum shift keying (GMSK) is applied in equation (2), then the resulting signal is an SSB-GMSK signal. If continuous phase frequency shift keying (CPFSK) is applied in equation (2), then the resulting signal is an SSB-CPFSK signal. A double data rate (DDR) SSB-CPM signal is formed by starting with a signal in (2) that occupies twice the available channel bandwidth. When equations (3)-(5) are subsequently applied, the resulting signal will pack twice the data rate into the same bandwidth as occupied by a standard CPM signal generated using equations (1) and (2) alone. We call this a DDR SSB-CPM signal.

Figure 3:
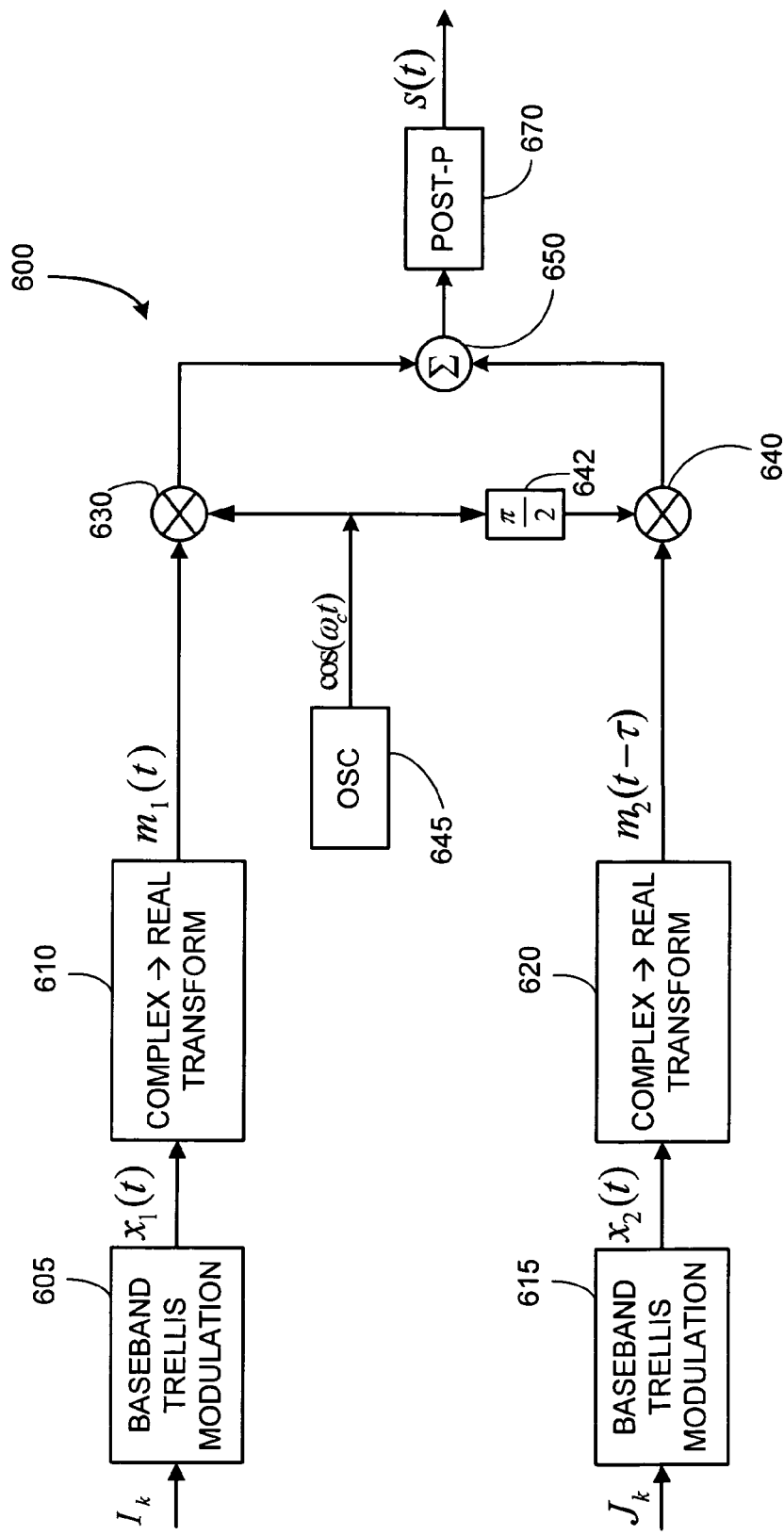
FIG. 3 is a block diagram illustrating a transmitter structure for generating a QM-CPM waveform.

Referring now to FIG. 3, a transmitter structure is shown that generates a quadrature multiplexed (QM-CPM) signal. The transmitter structure of FIG. 3 modulates two real-valued trellis signals simultaneously into the same bandwidth by multiplexing them onto a pair of quadrature-phase carriers, $\cos(\omega_c t)$, $\sin(\omega_c t)$. That is, instead of mapping m(t) and $\hat{m}(t)$ onto the cosine and sine carriers as per FIG. 2, the structure of FIG. 3 maps two separate information streams encoded onto two real-valued trellis signals, $m_1(t)$, $m_2(t)$ (obtained via equations (1), (2) and (3)) and then modulates $m_1(t)$ and $m_2(t)$ onto cosine and sine carriers as per FIG. 3. QM-CPM thus achieves the same data rate as DDR SSB-CPM, but advantageously without the use of the Hilbert transform and with a symbol duration that is twice as long as the DDR SSB-CPM symbol duration. As discussed in the parent application, coherently detected QM-CPM has the same BER performance as optimally implemented and coherently detected SSB-CPM when compared at the same information rate.

A QM-CPM signal can be written:

$$s(t) = A[m_1(t)\cos(\omega_c t) + m_2(t-\tau)\sin(\omega_c t)], \quad (9)$$

where A is a scalar that determines the amplitude of the output signal, and $\tau$ is a suitably chosen time-offset. The time-offset parameter provides an added degree of freedom useful in minimizing PAPR, but could optionally be set to zero. In polar form, we can write s(t) as:

$$s(t) = A\sqrt{[m_1^2(t)+m_2^2(t-\tau)]}\cos[\omega_c t+\theta(t)] \quad (10)$$

where $$\theta(t) = \tan^{-1}\left[\frac{-m_2(t-\tau)}{m_1(t)}\right] \quad (11)$$

is the phase variation of s(t). If $\alpha(t)$ in equation (2) is continuous, $m_1(t)$ and $m_2(t)$ will be continuous, so that $\theta(t)$ will also be also continuous, and the CPM property is preserved. The quadrature multiplexed signal, s(t), has both a time varying envelope and time varying phase. We can select the time-shift parameter, $\tau$, to minimize the PAPR. For example, with MSK signaling, we select $\tau=T/2$ and find that the minimum PAPR is 1.707.

The baseband trellis modulation blocks of FIG. 2 and FIG. 3 can be implemented using multi-amplitude signaling to increase the data rate per unit of bandwidth carried by SSB-CPM and QM-CPM signals transmitted therefrom. Let there be N complex-valued baseband CPM signals generated in accordance with equations (1) and (2). A linear combination of such signals may be written:

$$x_{MA}(t) = \sum_{i=1}^{N} a_i e^{j\alpha_i(t-\tau_i)} \quad (12)$$

$$= \sum_{i=1}^{N} a_i[\cos(\alpha_i(t-\tau_i)) + j\sin(\alpha_i(t-\tau_i))]$$

where $x_{MA}(t)$ is a multi-amplitude, complex-valued CPM baseband signal whose spectrum is the same as each of its component CPM signals. Application of the complex-to-real transform of equation (3) to the above yields:

$$m_{MA}(t) = T\left[\sum_{i=1}^{N} a_i e^{j\alpha_i(t-\tau_i)}\right] \quad (13)$$

$$= \sum_{i=1}^{N} a_i \cos(\alpha_i(t-\tau_i)).$$

In the above expression, $m_{MA}(t)$ is a real-valued trellis signal whose amplitude describes the amplitude-phase trellis of the multi-amplitude baseband signal, $x_{MA}(t)$ of equation (12). Just as PAM can be used to encode multiple bits per dimension, so can equation (13) be used to pack multiple bits of information onto the time-varying-trellis amplitude structure of $m_{MA}(t)$. Just as two such PAM signals can be quadrature multiplexed to form an $N^2$-point QAM signal constellation, so can two such $m_{MA}(t)$ signals be quadrature multiplexed to form a signaling scheme with $N^2$ possible trellis path combinations. The transmitter structures of FIG. 2 and FIG. 3 can be implemented where the baseband trellis modulation blocks 5, 605 and 615 are implemented using multi-amplitude signaling, e.g., according to equation (12) so the message signal, after complex-to-real transformation takes on the form of equation (13). Of course, equation (13) would typically be used directly instead of physically using equation (12) and then mapping that to equation (13).

The present invention also contemplates mapping M-ary CPM signals directly to real-valued message signals without the need to form linear combinations of binary message signals. In this type of embodiment, an underlying M-ary (e.g., 4-ary, 6-ary, 8-ary, 16-ary) CPM signal is mapped through a selected complex-to-real transformation to a real-valued message signal. The underlying CPM signal and the complex-to-real mapping are selected to assure that trellis paths are discernable, preferably maintaining the worst case minimum distance of the original M-ary CPM signal, if possible. The phase shift parameter, $\beta$, is typically adjusted to help maintain path differences. For example, SSB-CPM can be used to send the real-valued message signal in half the bandwidth required by the underlying M-ary CPM signal. Likewise, QM-CPM could be used to quadrature multiplex two such real-valued envelope signals into the same bandwidth occupied by the underlying M-ary CPM signal.

III. Review of Coherent Detection of CPM, SSB-CPM and QM-CPM Signals

Figure 4:
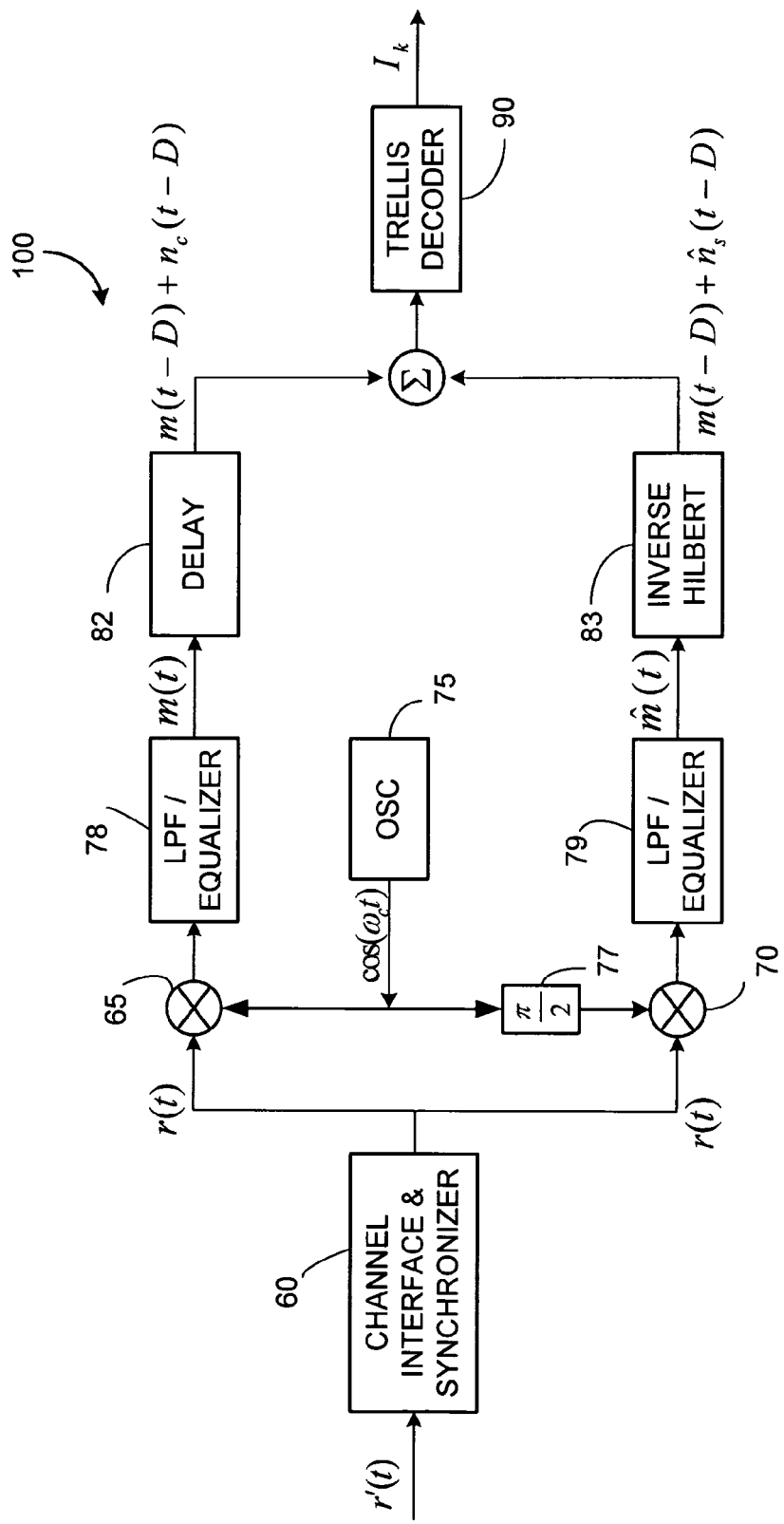
FIG. 4 is a block diagram illustrating a receiver structure for coherently demodulating an SSB-CPM waveform.

Referring now to FIG. 4, a receiver structure to demodulate the SSB-CPM signal is shown in block diagram form. When the transmitted upper sideband signal, s(t) of equation (6) is received, it will generally have the form:

$$r(t)=[Am(t)+n_c(t)]\cos(\omega_c t)-[A\hat{m}(t)+n_s(t)]\sin(\omega_c t) \quad (14)$$

where $n_c(t)$ and $n_s(t)$ are in-phase and quadrature-phase noise components, which are modeled as being statistically independent additive white Gaussian noise (AWGN) processes with zero mean and power spectral density $N_0$. The signal r(t) can be demodulated by first recovering an estimate of m(t) and applying that estimated signal to a trellis decoder based on a trellis structure embedded into the real-valued message signal, m(t).

The estimate of m(t) can be obtained by demodulating r(t) using a quadrature receiver structure to produce decision variables from the in-phase and quadrature components, of r(t), given respectively, by:

$$Z_I(t)=Am(t)+n_c(t) \quad (15)$$

$$Z_Q(t)=A\hat{m}(t)+n_s(t). \quad (16)$$

It is known that if $h_k$ is a Hilbert transformer's impulse response (e.g., an FIR approximation obtained using an optimal FIR filter design program such as Matlab™), that the inverse Hilbert transform's impulse response, $h_k^{-1}$ is given by $h_k^{-1}=-h_k$. Also, the Hilbert transform is an orthogonal transformation, so that the noise variance of a noise process is unchanged by the Hilbert transform and its inverse. Thus we can inverse Hilbert transform (16) to obtain a second independent estimate of m(t). When an inverse Hilbert transform is applied to both sides of equation (16) we obtain:

$$\hat{Z}_Q(t-D)=Am(t-D)+\hat{n}_s(t-D) \quad (17)$$

where D is a group delay associated with the inverse Hilbert transform. This signal corresponds to a delayed estimate of the same signal found on the in-phase branch:

$$Z_I(t-D)=Am(t-D)+n_c(t-D). \quad (18)$$

The independent estimates of equations (17) and (18) can be added together and applied to a trellis decoder designed to decode the trellis path structure inherent in the signal m(t). Ignoring the delay D for notational convenience, we can write $$Z(t) = \frac{(Z_I(t)+\hat{Z}_Q(t))}{2A} \quad (19)$$
$$= \frac{2Am(t)+(n_c(t)+n_s(t))}{2A}$$
$$= m(t)+n(t)$$

where n(t) is Gaussian noise with spectral density $N_0/2A^2$. Hence we see that processing the quadrature-phase channel provides a 3 dB gain in performance over recovering the message from the in-phase channel alone using equation (15). As discussed in the parent application, the BER performance of this receiver is the same as traditional CPM. If the noise margin permits, we can alternatively estimate m(t) directly from equation (15). This eliminates the inverse-Hilbert transform processing of equation (17) and the associated delay, D, but with a 3 dB cost in BER performance.

Figure 5:
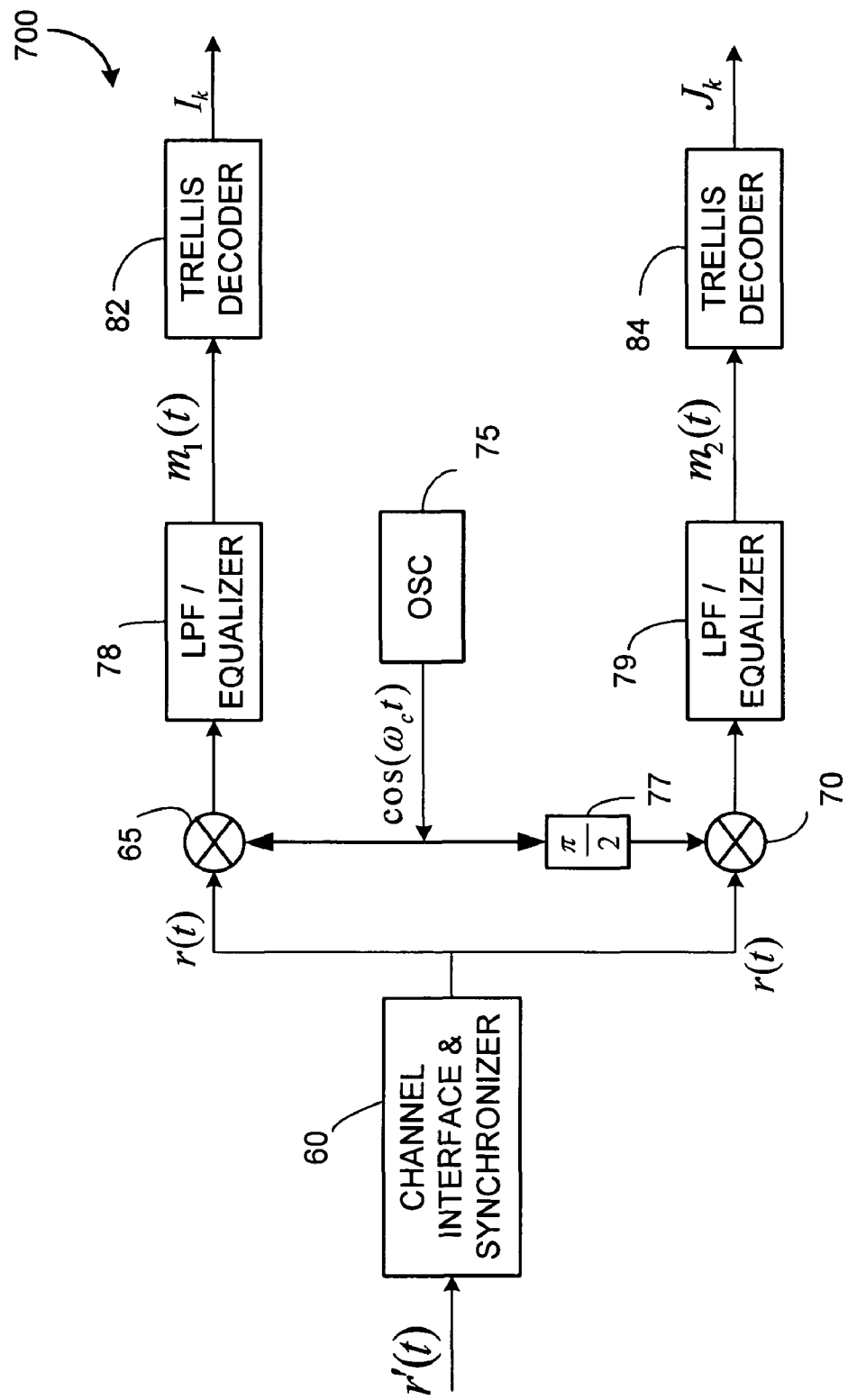
FIG. 5 is a block diagram illustrating a receiver structure for coherently demodulating a QM-CPM waveform.

Referring now to FIG. 5, a receiver structure for receiving, demodulating and decoding QM-CPM modulated signals is illustrated in block diagram form. Demodulation of QM-CPM is somewhat simpler than that of SSB-CPM because no Hilbert transform is needed and the symbol duration, T of equation (2), is twice as long as that of a DDR SSB-CPM signal carrying the same amount of information in the same bandwidth. FIG. 5 shows a QM-CPM receiver structure. This structure provides two independent channels of information. As discussed in the parent application, the BER performance of each the recovered real-valued trellis signals is the same as standard CPM. Hence QM-CPM and SSB-CPM both achieve the same BER performance as ordinary CPM, but can send twice the amount of data through a given channel bandwidth. When compared to less efficient modulation types like quadrature amplitude modulation (QAM), the bandwidth of QM-CPM occupies about ten times less bandwidth normalized to the information rate.

Recall that standard OFDM uses QAM to modulate data in each OFDM sub-channel. While each QAM sub-channel signal is highly bandwidth inefficient compared to QM-CPM, the orthogonality constraint of OFDM allows the channels to be spaced at 1/T, where T is the OFDM symbol interval. NBFDM embodiments of the present invention preferably use a QM-CPM signal which offers about a ten times bandwidth compression factor, and thus are able to achieve the 1/T spacing without the need to maintain orthogonality and also without the need to send uplink pilot tones.

IV. Viterbi Decoding of SSB-CPM and QM-CPM Waveforms

When coherent detection is used, a Viterbi decoder is preferably used to decode the real-valued message signal, m(t). Because the Viterbi decoder operates directly on the real-valued message signal, m(t), the same Viterbi decoder can be used irrespective of whether SSB-CPM or QM-CPM is used to modulate the carrier. In the case of coherent detection of QM-CPM, two copies of the Viterbi algorithm are preferably used, one to decode the real-valued message signal on the in-phase branch, and the other to decode the real-valued message signal on the quadrature-phase branch. When only non-coherent detection is available, as discussed below, the same general Viterbi algorithmic approach can be applied, but possibly with a modified state structure and a modified set of branch metrics.

For the specific example of coherently detected QM-CPM, the Viterbi decoder correlates the received signal with the possible transitions that can occur during the current interval, $kT \leq t < (k+1)T$. The processed received signal, Z(t) is compared with each possible transition signal of the trellis structure inherent in m(t) inherited from the corresponding CPM phase trellis via equation (3). When m(t) is derived from an MSK baseband signal, we must decode the trellis structure of FIG. 6 which logically corresponds to the trellis structure illustrated in FIG. 7. The trellis diagram of FIG. 6 was generated using binary MSK signaling in accordance with equation (2) with $\beta=-\pi/4$. For the case of coherent detection, to implement the Viterbi decoder, we compute a set of branch metrics according to:

$$B_{11}(k) = \int_{kT}^{(k+1)T} [Z(t) - m_{11}(t)]^2 \, dt \qquad (20)$$

$$B_{12}(k) = \int_{kT}^{(k+1)T} [Z(t) - m_{12}(t)]^2 \, dt$$

$$B_{21}(k) = \int_{kT}^{(k+1)T} [Z(t) - m_{21}(t)]^2 \, dt$$

$$B_{22}(k) = \int_{kT}^{(k+1)T} [Z(t) - m_{22}(t)]^2 \, dt.$$

Figure 6:
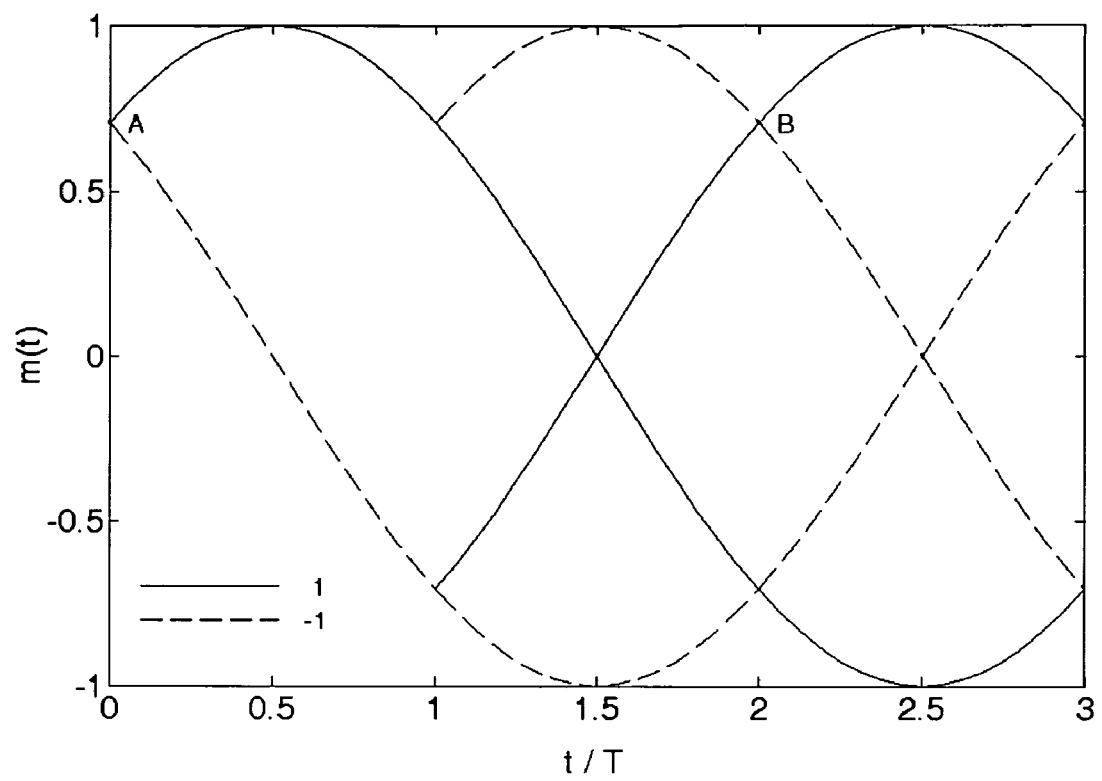
FIG. 6 is a signal diagram illustrating the trellis structure of a complex-to-transformed MSK signal, i.e., a real-valued message signal used to construct SSB-MSK and QM-MSK signals.

For the a specific example where m(t) is mapped via equation (3) from an MSK baseband signal using $\beta = -\pi/4$, the trellis of FIG. 6 results having two states corresponding to $$S_1 = \left\{ m(t) = \frac{1}{\sqrt{2}} \right\} \text{ and } S_2 = \left\{ m(t) = -\frac{1}{\sqrt{2}} \right\}.$$

The transition signals are given by $$m_{11}(t) = \cos\left(\frac{\pi t}{2T} - \frac{\pi}{4}\right),$$

$$m_{12}(t) = \cos\left(\frac{\pi t}{2T} + \frac{\pi}{4}\right),$$

$$m_{21}(t) = \cos\left(\frac{\pi t}{2T} - \frac{3\pi}{4}\right),$$

and $$m_{22}(t) = \cos\left(\frac{\pi t}{2T} + \frac{3\pi}{4}\right).$$

Figure 7:
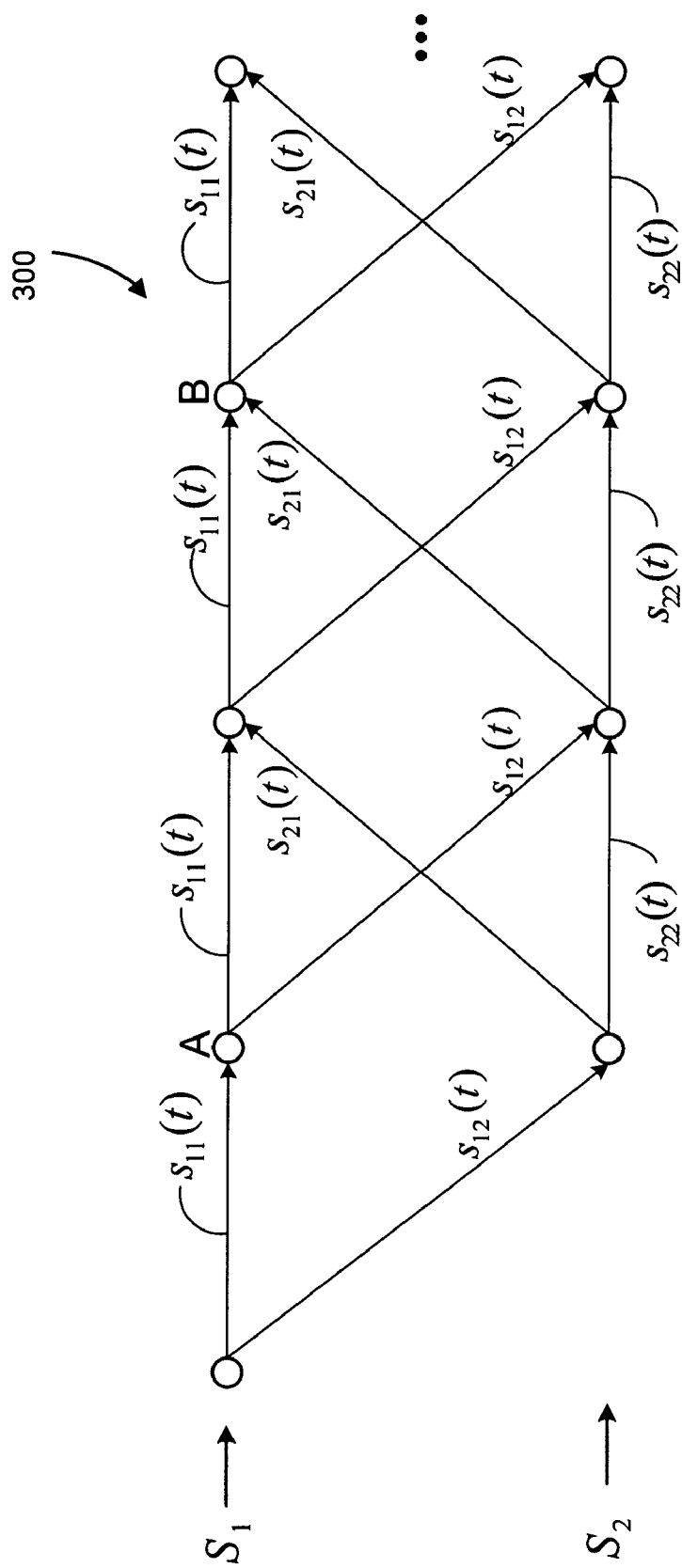
FIG. 7 is a signal trellis diagram illustrating the logical state-transition based trellis structure of the real-valued message signal shown in FIG. 6.

The Viterbi algorithm (see the parent application or other standard references for a detailed description thereof) is then applied to find the trellis path with the lowest path metric. FIG. 6 shows the set of possible variations in the actual signal m(t), and FIG. 7 shows how this signal is logically interpreted by the Viterbi decoder. The reference numerals A and B in these two figures are provided to align the two figures together.

In general, when coherent detection is used, the branch metric for the state transition from state $S_u$ to state $S_v$, using the transition signal $m_{uv}(t)$ can be calculated using the decision variable Z(t) during the interval (kT≦t<(k+1)T) by taking the squared Euclidean distance between the processed received signal, Z(t), and the transition signal $m_{uv}(t)$:

$$B'(S_u, S_v) = \int_{kT}^{(k+1)T} [Z(t) - m_{uv}(t)]^2 \, dt \qquad (21)$$

$$= \int_{kT}^{(k+1)T} Z^2(t) \, dt - 2 \int_{kT}^{(k+1)T} Z(t) m_{uv}(t) \, dt +$$

$$\int_{kT}^{(k+1)T} m_{uv}^2(t) \, dt.$$

Figure 8:
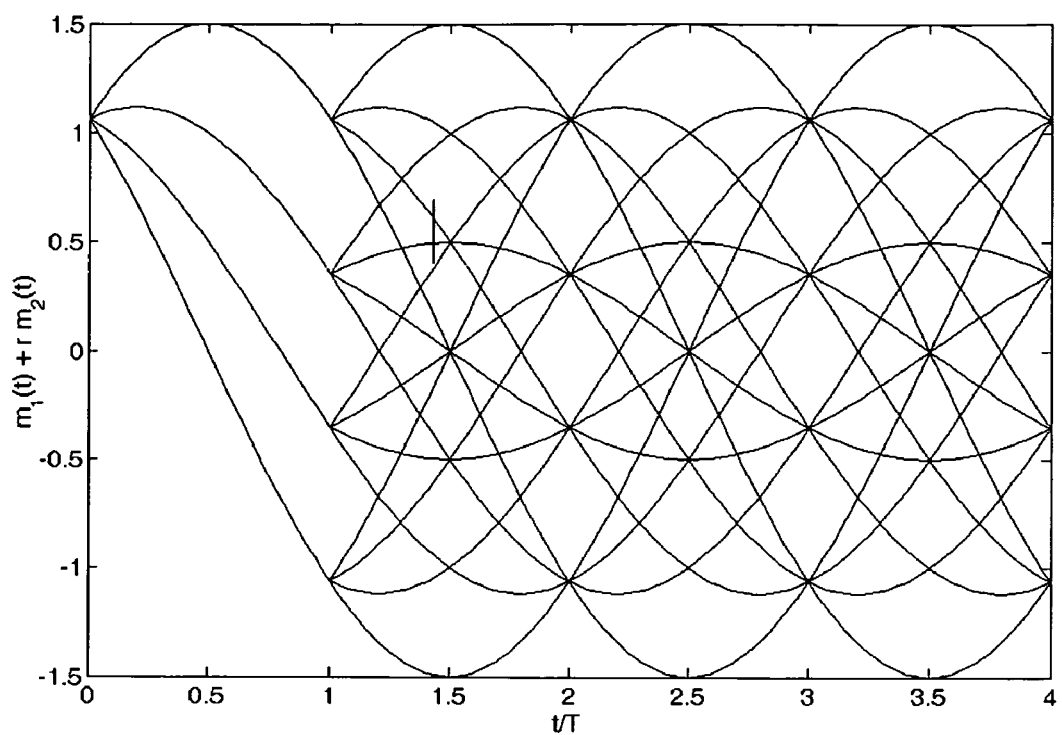
FIG. 8 is a signal diagram illustrating a trellis structure of a real-valued 4-ary signal constructed by linearly combining two signals as shown in FIG. 6.

Since the first term in (21) is common to all paths, it can be dropped from the metric. The last term, which is the energy of the signal $m_{uv}(t)$, i.e., $E_{uv}$, does not depend on the received signal and can be pre-calculated and stored for different signals at the receiver. The middle term, $\Psi_{uv}(k)$, is a correlation of Z(t) with a stored transition signal $m_{uv}(t)$. A simplified branch metric for the state transition from state $S_u$ to state $S_v$ during the interval kT≦t<(k+1)T may thus be written:

$$B_{uv}(k) = \int_{kT}^{(k+1)T} m_{uv}^2(t) \, dt - 2 \int_{kT}^{(k+1)T} Z(t) m_{uv}(t) \, dt \qquad (22)$$

$$= E_{uv} - \Psi_{uv}(k)$$

where $E_{uv}$ and $\Psi_{uv}(k)$ are shorthand for the integral values in equation (21) or approximations thereof. It can be noted that when equation (13) is used, more states are introduced and the real-valued trellis signal to be decoded looks like a trellis version of a multi-level PAM signal, for example, as shown in FIG. 8. It is also noted that the $\Psi_{uv}(k)$ values can be used as feedback terms in any of the ML carrier and symbol timing loops discussed in the parent application, or can be used by block algorithms that estimate the phase and/or symbol timing of a block of data comprising a plurality of symbol intervals, for example, a block of data produced during a dwell time of a slow hopping sequence.

As discussed below, when noncoherent detection is used, the same Viterbi algorithm may be applied, but with a modified trellis state structure and a modified set of branch metrics. For example, pairs of real states may be logically grouped into composite, complex-valued states, or states that use phase differences instead of absolute phases can be defined. Also, when inter-symbol interference (ISI) is present due to channel filtering, additional states can be introduced into the state structure of the Viterbi decoder. Reduced state techniques such as per-survivor processing may be used to reduce the state expansion that would be caused by adding the effects of ISI directly into the state structure of the Viterbi decoder.

Figure 9:
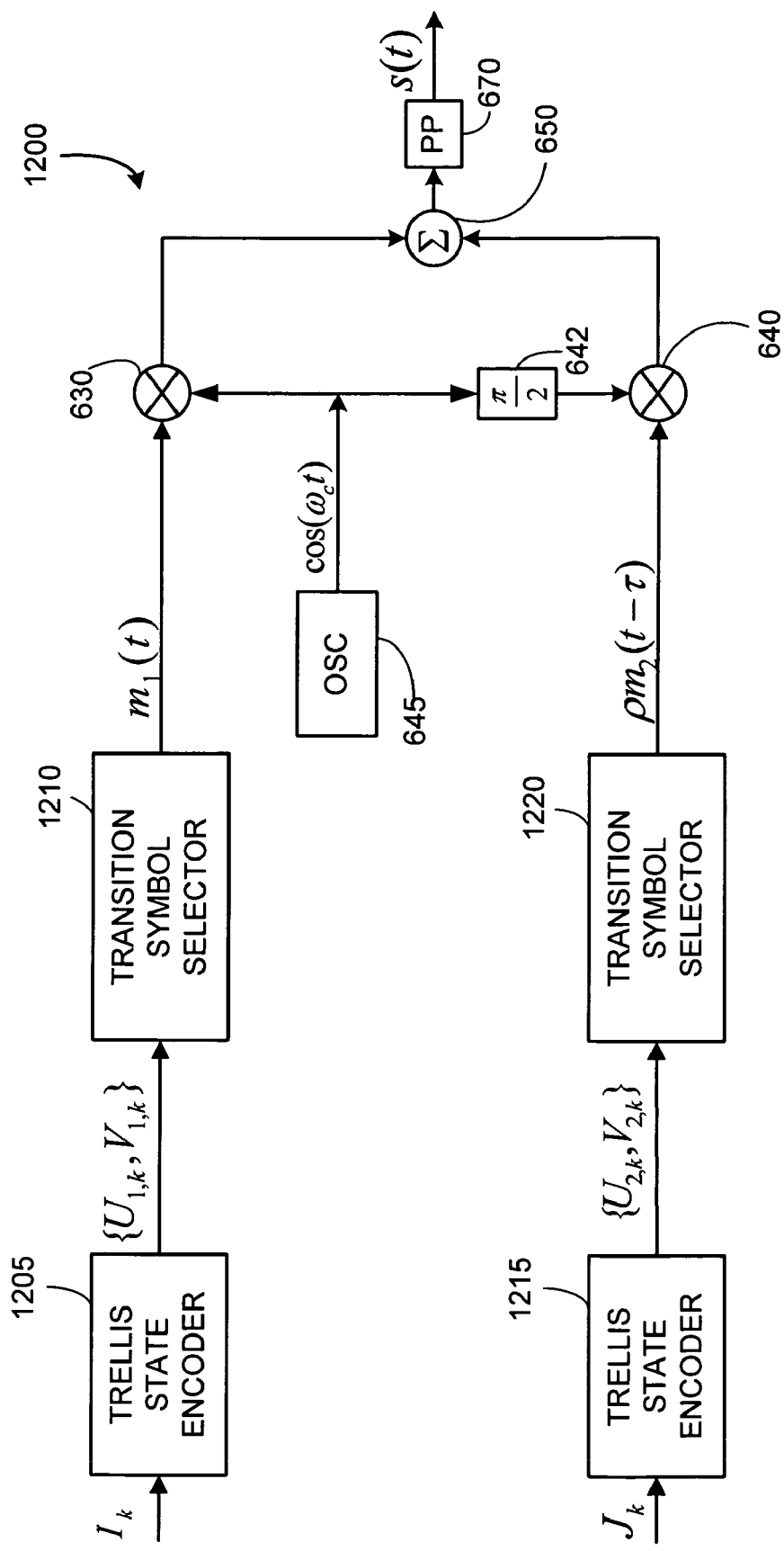
FIG. 9 is a block diagram illustrating a QM-CPM transmitter model viewed in light of a trellis structure inherent in the QM-CPM transmitted signal.

V. Noncoherent Detection of QM-CPM Signals—Quadrature Matched Filter (QMF) Approach Referring now to FIG. 9, a signal generation model of the QM-CPM modulator of FIG. 4 is illustrated in block diagram form. FIG. 9 is a logical model showing how the QM-CPM transmitted signal may be viewed as a state transition signal generated in response to state transitions of a state machine. To better understand the general concepts, we use the QM-MSK signal trellis of FIG. 7 as a specific example. Recall that in QM-MSK, during each symbol interval, the in-phase and the quadrature phase channels of the transmitter of FIG. 4 are both modulated with separate message signals, $m_1(t)$ and $m_2(t)$. That is, a QM-MSK modulator sends a pair of state transition signals from a pair of trellises as shown in FIG. 7, each symbol interval.

Two information sequences, (possibly previously coded using a trellis code or other types of codes) $I_k$ and $J_k$ are respectively coupled to trellis state encoders 905 and 915. Each symbol interval, the trellis encoders 905 and 915 each generate transitions from a first respective trellis state U to a second respective trellis state, V, like the state transitions depicted in FIG. 7. The state transitions are then mapped by state transition symbol selectors 910, 920 onto a pair of actual state transition symbols, for example, as shown in FIG. 6. The resulting pair of symbols is then I/Q modulated onto the carrier as shown in blocks 630-670.

In order to improve the performance of certain embodiments of noncoherent detectors designed to detect QM-CPM signals, we modify the QM-CPM waveform of equations (9)

and (10) and the transmitter of FIG. 3 to generate a modified QM-CPM waveform given by:

$$s(t) = A[m_1(t)\cos(\omega_c t) - \rho m_2(t-\tau)\sin(\omega_c t)] \quad (23)$$

$$= A\sqrt{m_1^2(t) + \rho^2 m_2^2(t-\tau)} \cos[\omega_c t + \theta(t)]$$

where $\rho$ is a free parameter added to control branch metric separation for some types of branch metrics. The time-offset parameter, $\tau$, can be used or set to zero, and the parameter $\rho$ could be used or set to one (effectively not used).

Figure 10:
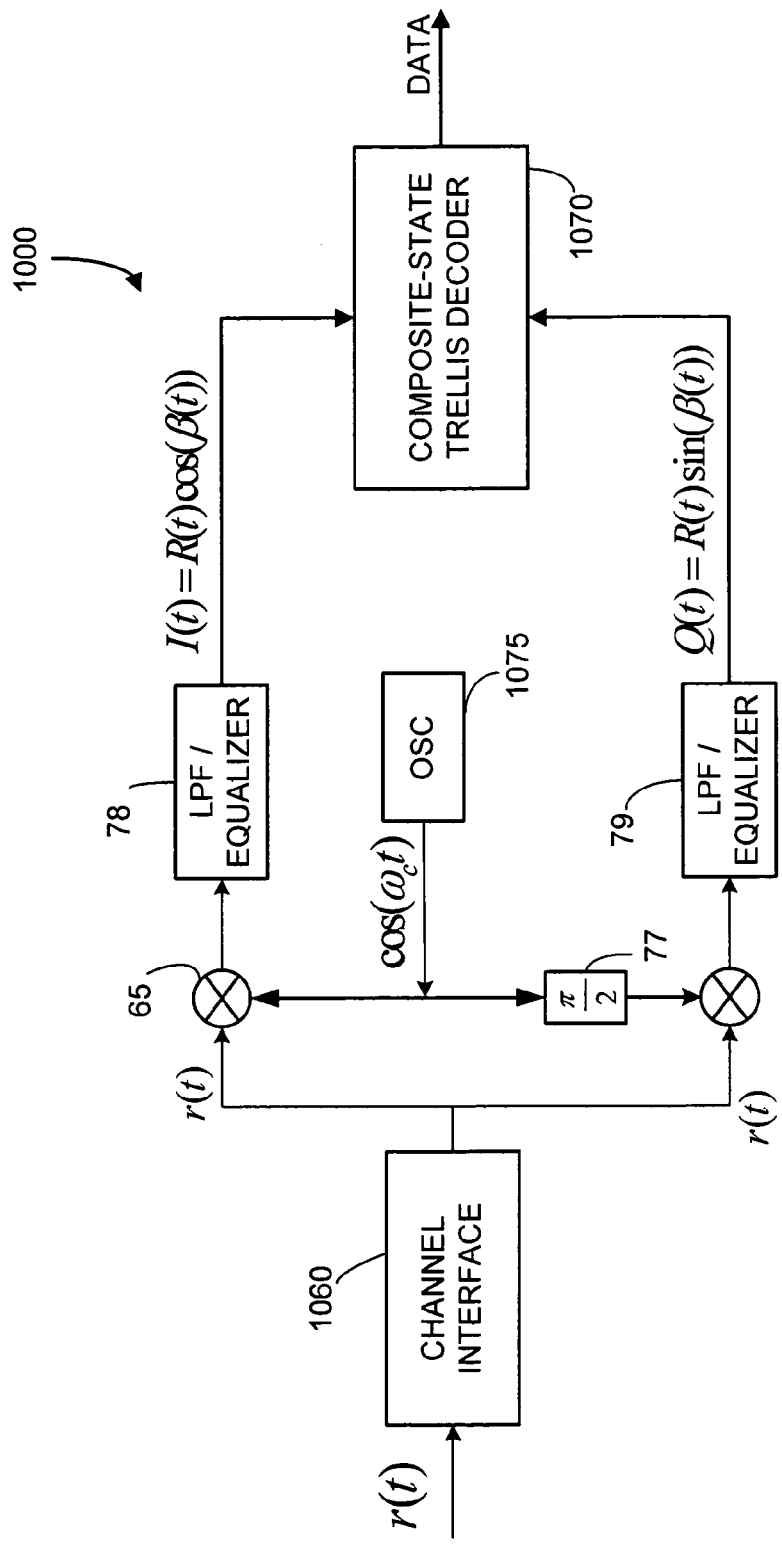
FIG. 10 is an illustration of a noncoherent receiver structure.

Referring now to FIG. 10, a noncoherent QM-CPM detector is illustrated in block diagram form. The quadrature receiver front end portion of FIG. 10 is similar to the coherent receiver front end of FIG. 5, the difference being that the oscillator 1075 is not locked to the carrier of the received signal, r(t). Receivers such as those shown in FIG. 10 where the local oscillator is not locked to the received signal noncoherently demodulate the received signal so that the baseband equivalent of the received signal is known only to within the random phase, $\gamma$. Depending on the detector embodiment, the random variable $\gamma$, can be assumed to be constant over a symbol interval or longer specified intervals. We can write the lowpass outputs of the in-phase and quadrature-phase channels of the noncoherent receiver front end shown in FIG. 10 as:

$$I(t) = R(t)\cos(\beta(t)), \quad (24)$$

and $$Q(t) = R(t)\sin(\beta(t)). \quad (25)$$

where R(t) is an envelope function and $\beta(t)$ is a phase function that is not phase locked to a the transmitted signal's phase function, $\theta(t)$. That is, even assuming noise-free reception, $\beta(t)=\theta(t)+\gamma$, where $\gamma$ the random phase component, most typically assumed to be uniformly distributed between zero and $2\pi$. The job of the noncoherent detector is to determine the sequence of state transitions generated in FIG. 9 using the information available to it, namely equations (24) and (25).

To better understand the signals produced in the noncoherent receiver, we can write the received QM-CPM signal as seen by a noncoherent QM-CPM receiver as:

$$r(t) = [Am_1(t)+n_c(t)]\cos(\omega_c t+\gamma) - [A\rho m_2(t-\tau)+n_s(t)]\sin(\omega_c t+\gamma) \quad (26)$$

or, in polar coordinates, $$r(t) = R(t)\cos[\omega_c t + \beta(t)] \quad (27)$$

where R(t) and $\beta(t)$ are the same as defined above. Using equations (26) and (27), the envelope and phase functions, R(t) and $\beta(t)$, may be respectively written as:

$$R(t) = \sqrt{[Am_1(t)+n_c(t)]^2 + [A\rho m_2(t-\tau)+n_s(t)]^2} \quad (28)$$

and $$\beta(t) = \tan^{-1}\left[\frac{A\rho m_2(t-\tau)+n_s(t)}{Am_1(t)+n_c(t)}\right] + \gamma. \quad (29)$$

Because the individual signals $m_1(t)$ and $m_2(t)$ cannot be separated in the receiver due to the unknown phase, $\gamma$, we reformulate the trellis model of FIG. 7 (as generated by the signal generator model of FIG. 9) using a different set of states. To start, let each of $m_1(t)$ and $m_2(t)$ be produced in accordance with equation (3), or equation (13) and be modulated according to equation (23). Next consider a pair of "simple" state transitions $u_1 \to v_1$ and $u_2 \to v_2$ that give rise to a pair of real-valued state-transition signals, $(m_1(t), m_2(t))$ (e.g., using the trellis of FIG. 7). Unlike the coherent detector of FIG. 5 that individually detects $m_1(t)$ and $m_2(t)$, the noncoherent receiver structures of the present invention view this pair of simple state transitions as a single composite state transition. For example, in the case of QM-MSK, instead of dealing separately with two of the two-state trellises of FIG. 7, we will deal with a single four-state trellis having composite states that each comprise a pair of the simple states of the trellis of FIG. 7.

Figure 11:
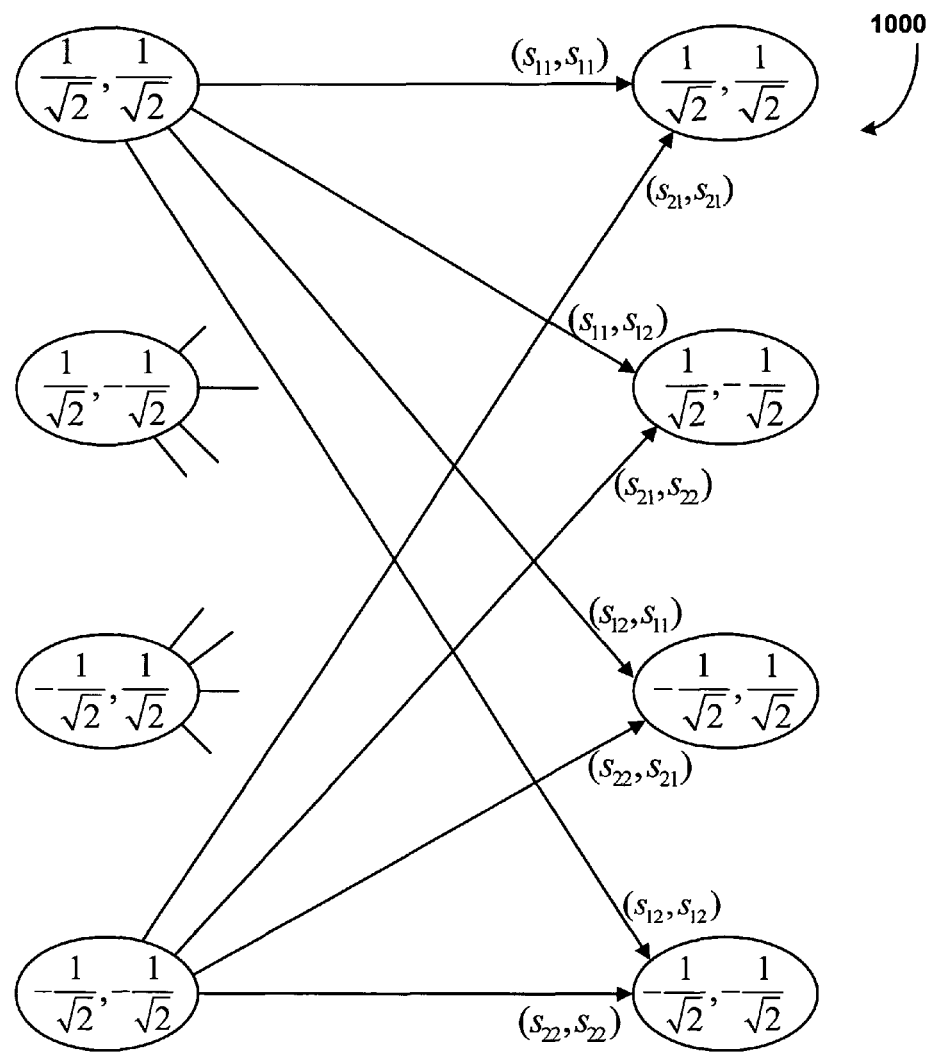
FIG. 11 is an illustration of an embodiment of a state diagram used by a trellis decoder used in a noncoherent receiver structure to decode QM-MSK signals.

FIG. 11 shows a composite trellis structure that uses composite states which are logical pairs of the simple states of FIG. 7. State transitions between composite states in FIG. 11 correspond to pairs of the simple state transitions shown in FIG. 7. The trellis structure of FIG. 11 is a specific example of noncoherent detection of QM-MSK and is discussed in further detail below.

To better understand composite states and composite state transitions for the specific example of QM-MSK, focus on the trellis structure of a single component signal such as $m_1(t)$. Note from FIG. 6 that each integer value of the time axis, i.e., each integer value of the time scale t/T, corresponds to the beginning of a symbol interval. Further, comparing FIG. 6 and FIG. 7, note that during each symbol interval, the real-valued message signals, $m_1(t)$ and $m_2(t)$, will each individually be equal to one of the four possible simple state transition signals whose logical structure is shown in FIG. 7, i.e., $s_{11}(t) = \cos[-\pi/4+\pi t/(2T)]$, $s_{12}(t) = \cos[\pi/4+\pi t/(2T)]$, $s_{21}(t) = -\cos[\pi/4+\pi t/(2T)]$, or $s_{22}(t) = -\cos[-\pi/4+\pi t/(2T)]$.

Since each of $m_1(t)$ and $m_2(t)$ will both always be equal to $$\pm \frac{1}{\sqrt{2}}$$

at the beginning of each symbol interval we can use these levels to identify the two possible simple states, $U_1$ and $U_2$ of FIG. 7. Building from these simple state values, i.e., $$U_1 = \frac{1}{\sqrt{2}}$$

and $$U_2 = -\frac{1}{\sqrt{2}},$$

the noncoherent QM-MSK decoder uses the four composite states as shown in FIG. 11, where the composite state of FIG. 11 is defined by the pair of simple state values, i.e., $$S_i = (U_1, U_2) = \left(\pm\frac{1}{\sqrt{2}}, \pm\frac{1}{\sqrt{2}}\right).$$

Next define a path variable, $P_{i,j}^N$ to represent a particular path of N composite transitions leading from a first composite state, $S_i$ to a second composite state, $S_j$. The path variable, $P_{i,j}^N$, actually represents a set of possible N-symbol paths from the composite state $S_i$ to the second composite state, $S_j$. However, it should be understood that depending on the context of its usage, $P_{i,j}^N$ will typically represent a particular N-symbol path from the composite state $S_i$ to the second composite state, $S_j$ whose metric is being evaluated. For example, in the evaluation of branch metrics during the execution of the Viterbi algorithm, $P_{i,j}^N$ will typically represent a particular path leading to a particular composite state whose branch metric is being evaluated for extending the particular path to a next composite state. This will become clearer in the development below.

For a given path, $p_{i,j}^N$, the corresponding transmitted signal output of FIG. 9 can be written as $s(t, P_{i,j}^N)$. For example, if N=1 and the single composite transition involves the pair of simple state transitions, $u_1 \to v_1$ and $u_2 \to v_2$ as per FIG. 7, then the baseband equivalent of $s(t, P_{i,j}^1)$ would be given by $s(t, P_{i,j}^1)=m_1(t)+j\rho m_2(t)$. A longer segment of the transmitted signal that spans multiple symbol intervals, i.e., N>1, would similarly be written as $s(t, P_{i,j}^N)=m_1(t)+j\rho m_2(t)$.

We next develop branch metrics for use in decoding the composite trellis structure, for example, of FIG. 11. The key issue is that the branch metrics need to be desensitized to the random phase component, $\gamma$. As we shall see, a number of different types of branch metrics can be derived and used. We start with a branch metric that is known to provide optimum noncoherent detection performance for any type of modulation. That is, we follow John G. Proakis, Digital Communications, $2^{nd}$ Ed., McGraw-Hill, 1989, and follow Colavople and Raheli, "Noncoherent sequence detection," IEEE Trans Comm., September 1999, pp. 1376-1385 (and also companion paper on pages 1303-1307). These references are incorporated herein by reference as background material to help understand the context of aspects of the present invention. Using these references, we write a length-N path metric for a path, $p_{i,j}^N$, involving a previous length-(N-1) path segment and a state transition to be evaluated during the $k^{th}$ interval as:

$$B_{i,j}^N([k-N+1:k+1]) = -\frac{1}{2N_0}\int_{(k-N+1)T}^{(k+1)T} |s(t, P_{i,j}^N)|^2 dt + \ln I_0\left(\frac{1}{N_0}\left|\int_{(k-N+1)T}^{(k+1)T} r(t)s^*(t, P_{i,j}^N) dt\right|\right) \quad (30)$$

$$= -\frac{1}{2N_0}\int_{(k-N+1)T}^{(k+1)T} |m_1(t) + j\rho m_2(t)|^2 dt + \ln I_0\left(\frac{1}{N_0}\left|\int_{(k-N+1)T}^{(k+1)T} r(t)(m_1(t) - j\rho m_2(t)) dt\right|\right),$$

where $I_0(\circ)$ is a zeroth order Bessel function and $s(t, P_{i,j}^N)$ is the transmitted signal of equation (23), for a particular path of N composite state transitions, $P_{i,j}^N$, leading from a first composite state, $S_i$ to a second composite state, $S_j$. The Bessel function comes about by integrating out the effect of the random phase from a conditional probability density function, as we shall see in further detail below as we develop a different detector.

In equation (30), note that the first term on the right-hand side is a transmitted-signal bias term. Also, the argument of the Bessel function is the magnitude of a cross correlation between the received signal and a replica of a composite QM-CPM state-transition signal over a period of N symbol intervals. That is, we can interpret equation (30) as a noncoherent matched filter receiver or, equivalently, a noncoherent quadrature correlation receiver.

In a preferred embodiment of the present invention, we preferably quadrature-down convert the received signal, r(t), using the receiver front end of FIG. 10. This provides a baseband equivalent signal $r(t_i)=I(t_i)+jQ(t_i)$, where $t_i$ is a sample time, and we can sample the signal at K such sample times per symbol interval. We also represent each possible QM-CPM state-transition signal similarly. That is, for each path of composite state transitions, $P_{i,j}^N$, we write $s(t_i, P_{i,j}^N)=m_1(t_i)+j\rho m_2(t_i)$ over the duration of the path. Next we approximate the integrals of equation (30) using K-point summations over each symbol interval. The N-symbol path metric for each N-symbol path of composite state transitions, $P_{i,j}^N$, that could have possibly been transmitted from the $(k-N+1)^{st}$ symbol interval up to the $k^{th}$ symbol interval may thus be written:

$$B_{i,j}^N([k-N+1:k+1]) = \quad (31)$$
$$-\frac{1}{2N_0}\sum_{l=1}^{N}\sum_{i=1}^{K}(m_{1,k-l+1}^2(t_i) + \rho^2 m_{2,k-l+1}^2(t_i)) +$$
$$\ln I_0\left(\frac{1}{N_0}\left|\sum_{l=1}^{N}\sum_{i=1}^{K} \begin{array}{c}(I_{k-l+1}(t_i) + jQ_{k-l+1}(t_i)) \\ (m_{1,k-l+1}(t_i) - j\rho m_{2,k-l+1}(t_i))\end{array}\right|\right).$$

For cases where the noise terms in equations (28) or (29) are not white, a pre-whitening transformation can be used. Such transformations are known to those skilled in the art. For example, see the Colavolpe reference for further details.

So far we have focused on computing path metrics, but in practical implementations we seek a Viterbi type solution that uses a sliding window and builds up survivor paths and path metrics by recursively evaluating and accumulating incremental branch metrics. While we seek an algorithm to evaluate sequences N symbols back in time, we seek to keep the number of states needed in the Viterbi decoder from growing beyond what would be needed if we used a branch metric that only focused on the current interval being evaluated. Therefore, we break the path metric of equations (30) and (31) into a previous survivor path component and an incremental branch metric component. That is, we write, $B_{i,j}^N([k-N+1:k+1])=B_{i,s}^{N-1}([k-N+1:k])+B_{S,j}^1([k:k+1])$, where S is a chosen composite state whose branch metrics are to be evaluated. Next we define a branch variable, m, whose values correspond to each possible composite state transition from each composite state, S, to each possible next composite state, $S_j$, that can be transitioned to from S. Using this notation, an incremental branch metric measured from any composite state, S, to each composite state, $S_j$, reachable from S, may be defined as $B_m(k)=B_{S,j}^1([k:k+1])$, and may written as a difference of path metrics:

$$B_m(k)=B_{i,j}^N([k-N+1:k+1])-B_{i,s}^{N-1}([k-N+1:k]). \quad (32)$$

Next plug equation (30) with appropriate integration endpoints into the two terms on the left hand side of equation (32), so that the incremental branch metric may be written as:

$$B_m(k) = -\frac{1}{2N_0}\int_{kT}^{(k+1)T}|m_1(t) + j\rho m_2(t)|^2 dt + \quad (33)$$
$$\ln I_0\left(\frac{1}{N_0}\left|\int_{(k-N+1)T}^{(k+1)T} r(t)(m_1(t) - j\rho m_2(t)) dt\right|\right) -$$
$$\ln I_0\left(\frac{1}{N_0}\left|\int_{(k-N+1)T}^{kT} r(t)(m_1(t) - j\rho m_2(t)) dt\right|\right).$$

The incremental branch metric of equation (33) is equal to a negative energy-bias component related to a state transition being considered to transition out of a current state, plus a component formed by correlating the received signal to an entire candidate N-symbol path, minus a component formed by correlating the received signal to the stored survivor-only portion of the candidate N-symbol path. With the incremental branch metrics defined in this way, the Viterbi Algorithm can add the incremental branch metrics together to build up path metrics. Standard survivor-path selection and pruning techniques can then be used to determine the most likely path.

One way to implement the above scheme is to define separate states for each N-tuple of possible states along each candidate N-symbol path. However, this leads to exponential state expansion and an exponential increase in computational complexity. In order to keep the number of states that need to be evaluated under control, we apply a technique called "per-survivor processing," (PSP). For further details, see: R. Raheli, A. Polydoros and C.K. Tzou, "Per-survivor processing: A general approach to MLSE in uncertain environments," IEEE Trans. Commun., vol. 43, pp. 354-364, 1995; and G. Colavolpe and R. Raheli, "Noncoherent sequence detection," IEEE Trans. on Commun., COM-47, pp. 1376-1385, September 1999; both of which are incorporated by reference herein for background purposes.

During execution of the Viterbi algorithm, we retain for each state one length-(N−1) survivor path and use the states in this survivor path to implement the last two terms in equation (33). At the time the branch metric is computed, we do not yet know which survivor path is correct, but we effectively check them all, and by the time the a symbol decision is made, the correct error-free path will have been used in the final survivor path selected by the Viterbi algorithm. At lower SNR there will be some level of error propagation due to the fact that any errors will propagate into the last two terms of equation (33). In some implementations we can keep and evaluate more than one survivor path per state in order to minimize error propagation effects with an attendant increase in complexity.

In a digital implementation, the integrals in equation (33) will be approximated by K-element summations. Thus for computational purposes, we re-write equation (33) as:

$$B_m(k) = -\frac{1}{2N_0} \sum_{i=1}^{K} (m_{1,k-l+1}^2(t_i) + \rho^2 m_{2,k-l+1}^2(t_i)) + \ln I_0 \left( \frac{1}{N_0} \left| \sum_{l=1}^{N} \sum_{i=1}^{K} \frac{(I_{k-l+1}(t_i) + jQ_{k-l+1}(t_i))}{(m_{1,k-l+1}(t_i) - j\rho m_{2,k-l+1}(t_i))} \right| \right) - \ln I_0 \left( \frac{1}{N_0} \left| \sum_{l=2}^{N} \sum_{i=1}^{K} \frac{(I_{k-l+1}(t_i) + jQ_{k-l+1}(t_i))}{(m_{1,k-l+1}(t_i) - j\rho m_{2,k-l+1}(t_i))} \right| \right).$$
(34)

The incremental branch metric can thus be computed by subtracting an energy bias component from the current interval from a correlation component for the entire path, and also subtracting a correlation component from a stored survivor path portion of the path. As we can see, equation (34) requires about O(9NK) multiply-accumulate operations to compute each branch metric used in the Viterbi algorithm.

The processing structure to implement this form of noncoherent receiver is illustrated in FIG. 10. In this specific embodiment, the block 1070 computes the branch metrics according to equation (34). The block 1070 also preferably implements the Viterbi algorithm as discussed in connection with FIG. 5 of the parent application. To quantify complexity, we assume that a trellis structure is used involving M states, and L possible transitions out of each state. For example, in FIG. 11, M=L=4, and ML=M²=16. In some systems, though, L<M. This is typically the case when TCM is used to add additional trellis constraints. Given these parameters, the noncoherent matched filter approach requires O(9MLNK) computations per symbol interval plus a storage requirement to store all the survivor states needed in equation (34). The O(9MLNK) complexity comes because the block 1070 computes equation (34) (O(9NK)) for each of the L different possible state transitions out of each of the M states.

Under the assumption that random phase, γ, is constant over the entire N symbol interval, this method is optimal and its performance approaches that of the coherent detector as N increases. However, as N increases, the assumption that the random phase, γ, is constant over the entire interval N can become more and more violated, especially in mobile communication systems such as those involving OFDM and NBFDM uplinks. As indicated by our numerical simulations, when the constant-random-phase assumption is violated, the method becomes suboptimal and performance suffers. Also, as N increases, the computational complexity linearly increases with a coefficient of 9MLK. To alleviate some of these difficulties, we also develop alternative types of detectors below that do not require the random phase to be constant over protracted N-symbol intervals.

In accordance with an aspect of the present invention, sub-optimal receivers that do not employ Viterbi decoding can also be constructed to perform sequence detection. For further background details of this approach, see: L. Yiin and G. L. Stuber, "Noncoherently detected trellis-coded partial response CPM on mobile radio channels," IEEE Trans. on Comm., COM-44, pp. 967-975, August 1996. The present invention also contemplates receivers that are constructed to decode any symbol by observing $n_1$ number of previous and $n_2$ number of future symbols. The receiver then finds the sequence that matches the received signal over the current interval with the decoded symbol in the middle part of it. This way, the receiver performs symbol-by-symbol detection, but the individual decisions are made based on the observations of sequences. The performance would be expected to improve with increasing $n_1$ and $n_2$. However, since the shortest merging event in QM-MSK occurs after 2 intervals, smaller values of $n_1$ and $n_2$ like $n_1=n_2=1$ can be expected to perform well. This type of embodiment could alternatively be used for strict symbol by symbol detection with $n_1=n_2=0$, although with an expected performance degradation. If intersymbol interference is present, the correlation template would be modified to account for channel filtering effects. Even though Viterbi decoding simplifies the computations, this type of embodiment does not require storing of metrics and it eliminates any error propagation due to per-survivor processing.

VI. Noncoherent Detection of QM-CPM Signals—Differential Phase and Envelope (DPE) Approach In this section we develop noncoherent detectors to detect QM-CPM symbol sequences by processing envelope estimates and differential phase estimates computed from the received signal. In this type of approach, we preferably set N=1, and for any pair of simple state transitions of FIG. 7 modulated during a particular symbol interval, we have a pair of corresponding real valued trellis signals as per FIG. 6, given by $m_1(t)$ and $m_2(t)$. Next convert this pair of real-valued message signals from Cartesian coordinates to polar coordinates using:

$$A_{i,j}(t) = \sqrt{[Am_1(t)]^2 + [A\rho m_2(t-\tau)]^2} \quad (35)$$

and $$\theta_{i,j}(t) = \tan^{-1}\left[\frac{\rho m_2(t-\tau)}{m_1(t)}\right]. \quad (36)$$

Where i, j denotes a composite state transition from a first composite state, i, to a second composite state, j, that corresponds to the pair of simple state transitions $u_1 \to v_1$ and $u_2 \to v_2$ as per FIG. 7 that are jointly modulated as per FIG. 9 during a particular symbol interval.

Next consider how the noncoherently received baseband signal, $(R(t), \beta(t))$, is related to the baseband representation of the transmitted signal, $(A_{i,j}(t), \theta_{i,j}(t))$. We can write $R(t) = A_{i,j}(t) + n_E(t)$ where $n_E(t)$ is an envelope noise term defined as the difference between the transmitted envelope and the estimated envelope calculated in the receiver. We can also write, $\beta(t) = \theta_{i,j}(t) + \gamma + n_\theta(t)$ where $\gamma$ is the random phase variable and $n_\theta(t)$ is a phase noise term generated in equation (29) due to the noise components in the argument to the arctangent function. Our aim is to develop statistical tests to compare the received signal parameters to known template parameters derived from the known state-transition signals sent from the QM-CPM transmitters of FIG. 4 and FIG. 9.

Figure 12:
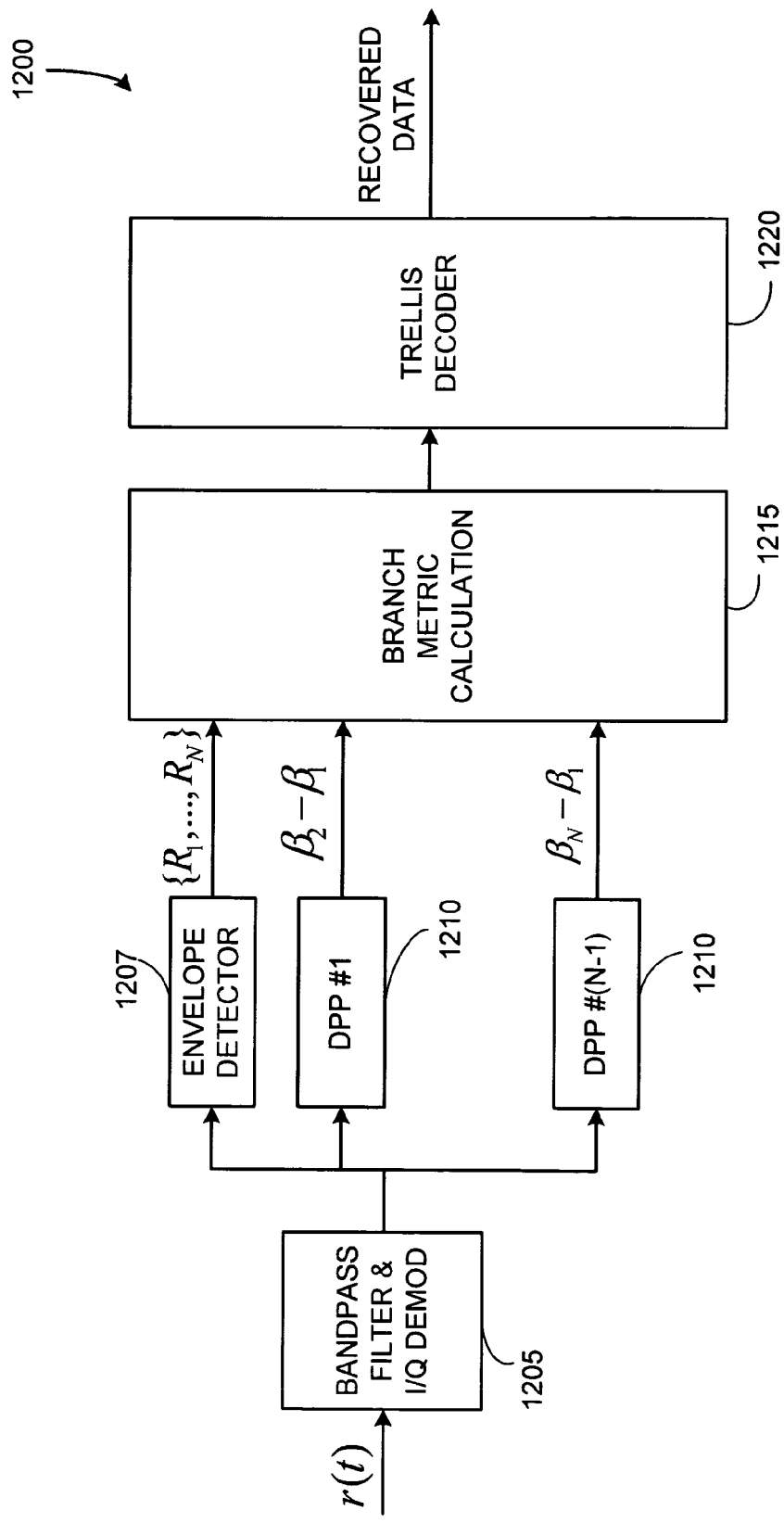
FIG. 12 is an illustration of a branch metric formation portion of a noncoherent receiver structure that processes envelope and differential phase measurements.

Referring now to FIG. 12, a noncoherent receiver structure 1200 for noncoherently detecting a QM-CPM signal using phase differences is illustrated in block diagram form. The noncoherent receiver 1200 comprises an I/Q demodulator 1205 and a front-end band pass filter and whose bandwidth B is chosen to pass a single QM-CPM signal while introducing a controlled amount of signal distortion and removing out-of-band noise. For example, the bandwidth of the filter B may be chosen to be somewhere between B96 and B99, i.e. the bandwidth that passes between 96% of the power in the QM-MSK signal to 99% of the bandwidth of the QM-MSK signal. The front-end band pass filter and I/Q demodulator 1205 provides the same I(t) and Q(t) signals as discussed in connection with FIG. 10. FIG. 12 typically uses the same composite trellis state logic as in FIG. 5. FIG. 12 illustrates one way to compute branch metrics for use in structures like FIG. 10.

The filtered signal output from the band pass filter and I/Q demodulator 1205 is coupled to an envelope detector 1207 and a set of differential phase detectors (DPD) 1210. In typical digital implementations, the blocks 1207 and 1210 will involve instructions that are executed by a processor to compute envelope and phase difference values, as discussed below. In other types of digital embodiments, the blocks 1207 and 1210 can be implemented using digital logic circuits, for example sequential logic circuits. The outputs of the envelope and differential phase detectors are coupled to a branch metric calculator 1215 which computes branch metrics for trellis signal decoding. The branch metrics are then coupled to a trellis decoder 1220 that preferably performs maximum likelihood sequence estimation using the Viterbi algorithm. The Viterbi algorithm may optionally be implemented with extra states to account for any added state information introduced by the band pass filter 1205. Trellis decoders that add states to account for intersymbol interference are well known in the art and can be used in the trellis decoder 1220 of FIG. 12. The trellis decoder typically uses the same composite states as discussed in connection with FIG. 11, optionally with additional state structure added to accommodate ISI.

The envelope detector 1207 processes the in-phase and quadrature-phase outputs of FIG. 10 and computes the envelope of equation (28) at a sample time $t_i$ using $R(t_i) = \sqrt{I^2(t_i) + Q^2(t_i)}$ (or optionally computes $R^2(t_i) = I^2(t_i) + Q^2(t_i)$ or some other similar measure of the envelope). The differential phase detectors 1207 compute an estimate of equation (29) (or some suitable, e.g., monotonic function thereof), to within a random phase term, using, e.g., $\beta(t_i) = \tan^{-1}(Q(t_i)/I(t_i))$ where again, $I(t_i)$ and $Q(t_i)$ are the outputs of the in-phase and quadrature-phase channels as illustrated in FIG. 10. The effect of the random phase, $\gamma$, in equation (29) is removed by computing phase differences, i.e., $\Delta\beta(t_i) = \beta(t_i) - \beta(t_0)$. The envelope measurements and the phase difference measurements are plugged into a branch metric calculation for use in the joint estimation of the in-phase and quadrature phase real-valued component signals that were transmitted in accordance with FIG. 9.

VI-A: Pseudo-Coherent Quadrature Matched Filter Detector

In order to arrive at a noncoherent correlation receiver formulation that makes use of phase differentials measurements, for i=1, ..., K, define, $\Delta\theta(t_i) = \theta(t_i) - \theta(t_0)$. Then we can define a template sequence that defines a replica of a each pair of transmitted signals that correspond to a state transition from a first composite state, i, to a second composite state, j, as:

$$H_{i,j}: \{m_1(t), m_2(t)\} = \{(A_{i,j}(t_1)\Delta\theta_{i,j}(t_1)), \ldots, (A_{i,j}(t_{K-1})\Delta\theta_{i,j}(t_{K-1}))\}. \quad (37)$$

The receiver structure of FIGS. 10 and 12 is used to derive the in-phase and quadrature-phase signals used for detection, $I(t)$ and $Q(t)$ given by equations ((24) and (25), which include the random phase variable, $\gamma$, as per equation (29). Next, the receiver computes the envelope, for $i = 0,1,2\ldots, K$: $R(t_i) = \sqrt{I^2(t_i) + Q^2(t_i)}$ and the differential estimates, for $i=1,2\ldots, K$: $\Delta\beta(t_i) = \beta(t_i) - \beta(t_0)$. This provides us with a phase-independent parameter sequence, for $i=0,1,2\ldots, K$: $((R(t_i), \Delta\beta(t_i))$ that can be correlator-matched to each of a set of template sequences, $(A_{i,j}(t_i), \Delta\theta_{i,j}(t_i))$ for each possible composite state transition. For example, the receiver computes, $Z(t_i) = R(t_i)\cos(\Delta\beta(t_i)) + jR(t_i)\sin(\Delta\beta(t_i))$ and compares it to the template signal, $\Gamma_{i,j}(t_i) = A_{i,j}(t_i)\cos(\Delta\theta_{i,j}(t_i)) + jA_{i,j}(t_i)\sin(\Delta\theta_{i,j}(t_i))$ for each possible composite state transition leading from composite state $S_i$ to composite state $S_j$. Now the same general types of branch metrics as per equations (20)-(22) can be applied, but on pairs of signals.

For example, following equation (21), a simplified branch metric for the composite state transition, S, during the interval $kT \leq t < (k+1)T$ may be written:

$$B_S(k) = \left| \int_{kT}^{(k+1)T} (R(t)e^{j\Delta\beta(t)} - A(t)e^{j\Delta\theta(t)})^2 dt \right| \quad (38)$$

or approximations or variations thereof, for example, that can be constructed by moving the absolute value inside the integral, and other types of variations that would be obvious to those of skill in the art. Due to the sampled nature of the data, the integrals would be computed as discrete sums over, for example, the K−1 complex-valued sample points $t_1, \ldots t_K$, considered in each symbol interval. In a sense, this is a pseudo-coherent type of metric because it approximates a coherent matched filter. We call the branch metric of equation (38) or other variations derived from composite versions of equation (21) as "difference squared metric" (DSM).

We note that equation (38) is optimal when the noise is Gaussian, and this is not typically the case because of equations (28) and (29). Therefore DSM based decoders may optionally use pre-whitening filters to convert the noise into Gaussian noise. In such cases, the signal terms of equations (35) and (36) need to be modified to take the effect of the pre-whitening filter into account.

VI-B Optimum Processing of Envelope and Phase Difference Measurements

For each time instant $t=t_i$ during each symbol interval, denote the envelope and the phase of the signal as per equations (28)-(29) by $R_i=R(t_i)$ and $\beta_i=\beta(t_i)$ respectively. Next, following the textbook S. Strak and J. W. Woods, "Probability and Random Processes with Applications to Signal Processing", 3rd Edition, Prentice Hall, 2002 (pages 151-152), and P.Z. Peebles, Jr. "Probability, random variables and random signal principles", McGraw Hill, 4th Edition, 2001, page 399, we write the conditional joint probability density function of $R_i=R(t_i)$ and $\beta_i=\beta(t_i)$, conditioned on the unknown phase variable $\gamma$, as:

$$f(R_i, \beta_i | \gamma) = \frac{R_i}{2\pi\sigma^2} e^{-\frac{A_i^2+R_i^2}{2\sigma^2}} e^{\frac{A_i R_i \cos(\beta_i - \theta_i - \gamma)}{\sigma^2}} \quad (39)$$

where $\sigma^2 = N_0 B$, B is the channel bandwidth, $N_0/2$ is the two-sided power spectral density (psd) of channel noise, $\theta_i = \theta(t_i)$ is the phase angle of the transmitted signal as would be observed at the receiver at time $t=t_i$ in the absence of channel noise, and $$A_i^2 = A^2[m_1^2(t_i) + \rho^2 m_2^2(t_i)] \quad (40)$$

is the squared signal envelope value as per equation (28) at time $t=t_i$ in absence of noise.

As with the other detectors, the envelope and phase values of equations (28) and (29) involve information from the pair of signals, $\{m_1(t_i), m_2(t_i)\}$ transmitted in parallel on the in-phase and quadrature phase paths of the QM-CPM transmitter of FIG. 9. Thus, as in the other detectors, the optimum detector that processes phase difference measurements also uses composite states as per FIG. 11.

We assume that the value of the unresolved phase term, $\gamma$, can vary from one interval to the other but is substantially constant over any single interval. In some embodiments this assumption can be relaxed, and instead we assume that the phase term is constant over a block of symbols of a specified length. If the conditional joint probability density function of equation (39) is observed at multiple time instants during the same interval, i.e., a $t_i$, for $i=1,2,\ldots K$, then all these observations will be conditioned by the same value of the random variable $\gamma$. Moreover, assuming the conditional joint probability density functions formed according to equation (39) for $i=1, \ldots K$ are statistically independent, then the overall conditional joint probability density function over a single interval, i.e., over a set of observations, $(R_1, R_2, \ldots R_K, \beta_1, \beta_2, \ldots \beta_K)$, can be written as:

$$f(R_1, R_2, \ldots R_K, \beta_1, \beta_2, \ldots \beta_K | \gamma) = \prod_{i=1}^{K} f(R_i, \beta_i | \gamma). \quad (41)$$

To de-condition the conditional joint probability density function of equation (41), we integrate the conditional joint probability density function over all possible values of the random variable, $\gamma$, where the random phase is assumed to be uniformly distributed over the range $[0, 2\pi)$. That is, we write the unconditional joint probability density function as:

$$f(R_1, R_2, \ldots R_K, \beta_1, \beta_2, \ldots \beta_K) = \frac{1}{2\pi} \int_0^{2\pi} \prod_{i=1}^{K} f(R_i, \beta_i | \gamma) d\gamma. \quad (42)$$

The joint probability density function of equation (42) may be expressed as a product of the marginal probability density functions, so thus we may substitute equation (39) into equation (42) to write:

$$f(R_1, R_2, \ldots R_K, \beta_1, \beta_2, \ldots \beta_K) = \quad (43)$$

$$c \left[ e^{-\sum_{i=1}^{K} \frac{A_i^2+R_i^2}{2\sigma^2}} \right] \frac{1}{2\pi} \int_0^{2\pi} e^{\sum_{i=1}^{K} \frac{A_i R_i \cos(\beta_i - \theta_i - \gamma)}{\sigma^2}} d\gamma,$$

where $c = R_1 \ldots R_K (2\pi\sigma^2)^{-K}$. Next define $\phi_i = [(\beta_i - \beta_1) - (\theta_i - \theta_1)] = [\Delta_{\beta_i} - \Delta_{\theta_i}]$, and $d_i = A_i R_i$, and make a change in variables in equation (43) by substituting $u = [\gamma - (\beta_1 - \theta_1)]$, and writing $(\beta_i - \theta_i - \gamma)$ as $[\beta_i - \theta_i - (u + \beta_1 - \theta_1)] = [\Delta_{\beta_i} - \Delta_{\theta_i} - u]$, so that we can express equation (43) in the form:

$$f(R_1, R_2, \ldots R_K, \beta_1, \beta_2, \ldots \beta_K) = c \left[ e^{-\sum_{i=1}^{K} \frac{A_i^2+R_i^2}{2\sigma^2}} \right] \frac{1}{2\pi} \quad (44)$$

$$\int_0^{2\pi} e^{\frac{[d_1 + \sum_{i=2}^{K} d_i \cos(\phi_i)]\cos(u) + [\sum_{i=2}^{K} d_i \sin(\phi_i)]\sin(u)}{\sigma^2}} du$$

$$= c \left[ e^{-\sum_{i=1}^{K} \frac{A_i^2+R_i^2}{2\sigma^2}} \right] I_0(\xi)$$

where, $$\xi = \frac{1}{\sigma^2} \sqrt{\left[d_1 + \sum_{i=2}^{K} d_i \cos\phi_i\right]^2 + \left[\sum_{i=2}^{K} d_i \sin\phi_i\right]^2}. \quad (45)$$

Note that the variable $\xi$ in equation (45) can be viewed as the magnitude of a complex vector $$e = \left[d_1 + \sum_{i=2}^{K} d_i e^{j\phi_i}\right],$$

i.e., $\xi = |e|$. Viewed another way, $\xi = |e|$ is an envelope-weighted norm of a phase-error vector whose elements are given by $$e^{j\phi_i} = e^{j[(\beta_i - \beta_1) - (\theta_i - \theta_1)]} = e^{j[\Delta_{\beta_i} - \Delta_{\theta_i}]},$$

for $i=1 \ldots K$.

To compute the joint probability density function of equation (44) over any observation interval, the system must sample K envelope values, $R_i$, and (K-1) differential phase values, $\Delta_{\beta_i} = (\beta_i - \beta_1)$. The joint probability density function of equation (44) effectively compares these observations to a set of possibly transmitted envelope samples $\{A_i\}$ and a set of possibly transmitted differential phase angles, $\{\Delta_{\theta_i}\}$, where $\Delta_{\theta_i} = (\theta_i - \theta_1)$. This joint probability density function is maximized when the envelope-weighted phase difference observations best match the phase differences corresponding to the QM-CPM composite state-transition signal that was actually transmitted. That is, in the operation of a preferred embodiment (which specifically uses the joint probability density function of equation (44)), the trellis decoder 1220 seeks to identify a sequence of most likely parameter sets, $\{A_1, \ldots A_K, \Delta\theta_2, \ldots \Delta\theta_K\}$ that best match, according to the weighted measure of equation (44), with the sequence of observed parameters, $\{R_1, \ldots R_K, \Delta\beta_2, \ldots \Delta\beta_K\}$.

It should be understood that the statistical independence assumption used in deriving the joint probability density function of equation (44) is valid if the noise contributions at different times, $t_i$, are independent. As the number of observations per interval, K, increases, this assumption can be violated. The value of K influences both performance and complexity, and is thus studied numerically below. When any detector's underlying assumptions are violated, the detector becomes sub-optimal, but still performs detection using the same functionality.

As discussed previously, the trellis decoder 1220 preferably performs ML decoding to detect the most likely transmitted signal sequence given the sets of observed envelope and differential phase parameters from each interval in the sequence. Assuming that the joint probability density functions in equation (44) are independent from one interval to the other, the overall joint probability density function for the entire sequence is equal to the product of the measures of equation (44) over all intervals in the sequence. Hence, we can use equation (44) in the receiver structure 1200 to construct an optimal receiver, and use the Viterbi algorithm in the trellis decoder 1220 to perform optimal sequence-level detection. This scheme is advantageous because it does not make the assumption that the random phase variable, γ, is constant over entire N-symbol paths. Rather, the random phase variable, γ, is only assumed to be constant over each individual symbol interval.

To perform Viterbi decoding to implement an optimal noncoherent sequence detector, blocks 1207 and 1210 process the QM-CPM signal to form the observation vector, $\{R_1, \ldots R_K, \Delta\beta_2, \ldots \Delta\beta_K\}$ in each symbol interval, and then block 1215 plugs these observations into equations (44)-(45) using all the attendant definitions of variables therein. That is, we can use the natural logarithm of the joint probability density function of equation (44) to construct an additive branch metric for each interval. In order to speed real time operation, the natural logarithm of equation (44) could be stored in a lookup table and the inputs to equation (44) could be quantized and combined in various ways to form an address or sets of addresses into the lookup table(s). In the section below, we make some approximations and develop near-optimal approaches which have been verified by simulation to provide about the same BER performance as the optimal noncoherent detector, but require less complexity to implement.

In accordance with an aspect of the present invention, we define "differential phase and envelope" (DPE) processing to involve detectors that use the natural log of equation (44) or variations or approximations thereof as branch metrics. In the next sub-section we present exemplary branch metrics that can be used with DPE based detectors. For example, a DPE detector for QM-MSK signals uses the receiver of FIG. 10, where the trellis decoder 1070 uses the composite state structure of FIG. 11. Depending on the specific embodiment, various types of DPE branch metrics can be computed from the differential phase and envelope measurements computed as illustrated in FIG. 12.

VI-C. Low Cost, Near-Optimal Noncoherent Detection of QM-CPM Signals

In this section we show how to derive a simplified set of branch metrics that are relatively easy to compute. These simplified branch metrics allow the Viterbi algorithm to provide about the same bit error rate (BER) performance as the optimal noncoherent ML detector. As previously discussed, let $B_m(k)$ be the branch metric corresponding to a composite state transition, m, from a current composite state, S, to a possible next composite state in the $k^{th}$ symbol interval. In the course of the execution of the Viterbi algorithm, during each symbol interval, we evaluate a branch metric, $B_m(k)$, for each allowable composite state transition out of each composite state, S, of the governing trellis diagram, e.g., FIG. 11. In the absence of noise, when the $m^{th}$ composite message pair in the $k^{th}$ symbol interval is sent, the received signal would have a noncoherent parameter set given by $\{A_1, \ldots A_K, \Delta\theta_2, \ldots \Delta\theta_K\}$. With noise and distortion, the actual observed set of observed parameters would be given by $\{R_1, \ldots R_K, \Delta\beta_2, \ldots \Delta\beta_K\}$. To provide a statistical measure of closeness, we set $B_m(k)$ equal to the natural logarithm of the joint probability density function of equation (44) to obtain:

$$B_m(k) = \ln\left( c \left[ e^{-\sum_{i=1}^{K} \frac{A_i^2 + R_i^2}{2\sigma^2}} \right] I_0(\xi) \right) \quad (46)$$

$$= \ln(c) + \ln\left( \left[ e^{-\sum_{i=1}^{K} \frac{A_i^2 + R_i^2}{2\sigma^2}} \right] \right) + \ln(I_0(\xi))$$

Because $R_i^2$ and $\ln(c)$ are common to all branch metrics, these terms will not be discriminative for branch metric comparative purposes so can be dropped from the branch metric without any performance penalty. Therefore we modify the branch metric of equation (46) as such and write a simplified version with equal discriminative abilities as:

$$B_m(k) = \ln\left( \left[ e^{-\sum_{i=1}^{K} \frac{A_i^2}{2\sigma^2}} \right] \right) (I_0(\xi)) \quad (47)$$

$$= -\sum_{i=1}^{K} \frac{A_i^2}{2\sigma^2} + \ln(I_0(\xi))$$

$$= P + Q$$

where $$P = -\sum_{i=1}^{K} \frac{A_i^2}{2\sigma^2}$$

is constant for each branch and can be prestored, and $Q = \ln[I_0(\xi)]$ depends on both on the envelope and differential phase observations. While the values Q could be directly calculated based on the observed parameters, $\{R_1, \ldots R_K, \Delta\beta_2, \ldots \Delta\beta_K\}$ or could be looked up from a table based upon the observed parameters, $\{R_1, \ldots R_K, \Delta\beta_2, \ldots \Delta\beta_K\}$, as is done in the optimal detector, we seek approximations that do not adversely affect performance, but allow us to more easily compute Q.

For the case where $\xi \gg 1$, Q can be approximated as:

$$Q \approx \ln\left[\frac{e^\xi}{\sqrt{2\pi\xi}}\right] = \xi - \frac{1}{2}[\ln(\xi)] - \frac{1}{2}[\ln(2\pi)] \approx \xi - \frac{1}{2}[\ln(2\pi)]. \quad (48)$$

Because the last term in equation (48) is common to all paths, it can be neglected without any performance penalty. Therefore, assuming $\xi \gg 1$, we can simply set $Q=\xi$, multiply by the noise level, $\sigma^2$, and modify the branch metric of equation (47) accordingly to obtain the further simplified branch metric:

$$B_m(k) \approx 2\sqrt{\left[d_1 + \sum_{i=2}^{K} d_i \cos\phi_i\right]^2 + \left[\sum_{i=2}^{K} d_i \sin\phi_i\right]^2} - \sum_{i=1}^{K} A_i^2. \quad (49)$$

Note that the branch metric of equation (49) is independent of the noise level $\sigma^2$ and simple to compute using just sine, cosine and square root lookup tables.

It is observed that the $\xi \gg 1$ assumption is usually valid at high SNR. However, for paths that are significantly separated from the transmitted path, $\xi$ can be very small even at high SNR, which results in $I_0(\xi) \approx 1$ while the $\xi \gg 1$ assumption instead approximates $I_0(\xi) \approx 0$. However, for these paths P in equation (47) is a large negative value, and hence, the difference between the metric in equation (46) and the metric of equation (49) turns out to be insignificant, even when the $\xi \gg 1$ assumption is violated. Hence, at moderate to high SNR the simplified branch metric of equation (49) can be used in place of the optimal branch metric in equation (46), as our numerical simulation results presented in the example below confirms.

VI-D: Exemplary Embodiment: Noncoherent Detection of Binary QM-MSK Signals

Referring again to FIGS. 6 and 7, consider the real-valued binary QM-MSK component signal shown in FIG. 6. FIG. 6 illustrates all possible signal variations that define the logical signal trellis structure of the QM-MSK component signal, as depicted in FIG. 7. As previously discussed, the QM-MSK signal involves two real-valued component signals, $m_1(t)$ and $m_2(t)$, that are quadrature multiplexed onto in-phase and quadrature-phase carriers as per equation (23), and noncoherent detection is thus preferably performed using composite states and composite state transitions as per FIG. 11.

Figure 13:
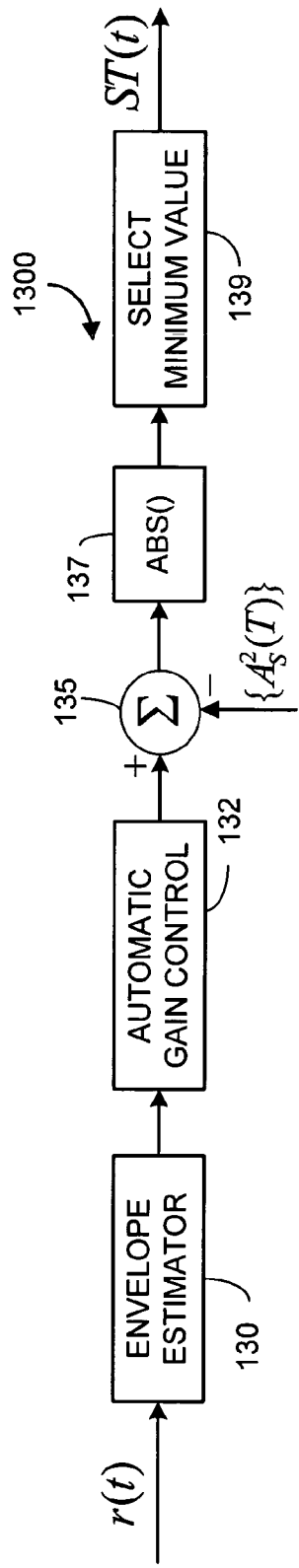
FIG. 13 is an illustration of a processing arrangement used to derive a symbol timing reference from a noncoherently received QM-MSK signal.

While it is not necessary to perform carrier recovery in a noncoherent embodiment, symbol timing is still needed. Note in the case of QM-MSK that at the symbol times, kT, the QM-MSK signal is always equal to $\pm 1/\sqrt{2}$. Therefore, for all possible composite signals sent, $A_S^2(kT) = \frac{1}{2}$. Assuming for now the effects of filtering are negligible (or that some equalization pre-filtering is applied), a simple way to derive a timing signal is illustrated in FIG. 13. The received signal, r(t), is processed using a receiver front end like the one shown in FIG. 10.

The envelope is estimated as previously discussed in an envelope detector 130. The envelope detector 130 may optionally include additional equalization filtering, for example, using a zero forcing equalizer with a known delay to assure the received signal is more closely equal to the state values at the symbol times. The signal gain is adjusted in an automatic gain control block 132, which is typically implemented in software. Next, in subtractor 135, the known squared envelope value at the symbol time, in the case of QM-MSK, $A_S^2(kT) = \frac{1}{2}$, is subtracted from the envelope squared value. The output of the subtraction is then rectified in a block 139. If there is more than one possible value for $A_S^2(kT)$, for example, in the QM-MSK trellis of FIG. 8 as opposed to the one in FIG. 6, then a plurality of subtractions are performed for each possible $A_S^2(kT)$, and the minimum is selected in block 139. The output of block 139 in the noiseless case will periodically be equal to zero at the symbol times. This signal can be processed using known symbol timing recovery such as the ones discussed in the parent application. For example, an ML timing loop or an early-late tracking loop could be used to process the output symbol timing signal, ST(t). If additional equalization filtering was used in the symbol timing recovery subsystem, then the symbol timing signal needs to be adjusted to account for the known delay.

As previously discussed, during any given symbol interval, $m_1(t)$ in FIG. 6 will be equal to one of: $s_{11}(t)=\cos[-\pi/4+\pi t/(2T)]$, $s_{12}(t)=\cos[\pi/4+\pi t/(2T)]$ $s_{21}(t)=-\cos[\pi/4+\pi t/(2T)]$, or $s_{22}(t)=-\cos[-\pi/4+\pi t/(2T)]$. Since each of $m_1(t)$ and $m_2(t)$ will both always be equal to $$\pm \frac{1}{\sqrt{2}}$$

at the beginning of each symbol interval, we thus use these levels to identify the two possible states, $S_1$ and $S_2$ of FIG. 7. We also define pairs of these simple states as composite states in FIG. 11.

When we set $\rho=1$ in equation (23), it was found that the state transitions from $$\left(\frac{1}{\sqrt{2}}, \frac{1}{\sqrt{2}}\right) \text{ to } \left(-\frac{1}{\sqrt{2}}, -\frac{1}{\sqrt{2}}\right),$$

and from $$\left(\frac{1}{\sqrt{2}}, \frac{1}{\sqrt{2}}\right) \text{ to } \left(-\frac{1}{\sqrt{2}}, -\frac{1}{\sqrt{2}}\right)$$

(other similar transitions) provide equal results when plugged into the branch metric equations (46), (47) and (49). Thus when $\rho=1$, the decoder cannot properly use these branch metrics to discern the different state transition paths as needed for sequence estimation. This condition can be avoided by making $\rho \neq 1$, which is the reason the parameter $\rho$ was introduced in equation (23). This parameter is discussed in further detail below in connection with a set of numerical simulation experiments conducted to determine its effect on performance.

Now that the exemplary embodiment has been constructed, we next show some specific choices of how to configure the observation vector, $\{R_1, \ldots R_K, \Delta\beta_2, \ldots \Delta\beta_K\}$. For example, set K=2 and set the sampling times $t_i$ to correspond to observing the envelope and differential phase parameters of the received signal at the beginning, in the middle and at the end of every symbol interval. Use the corresponding observation vector in the branch metric equations (44) or a selected approximation thereof for use with the Viterbi decoder whose state transition diagram is implemented according to FIGS. 6-7 and 11.

Next observe from FIG. 6 that for the special case of QM-MSK signals, the expected envelope values at the beginning and at the end of every interval ($A_1$ and $A_3$) are the same $$\left(\text{i.e., } |A_1| = |A_3| = \left|\pm\frac{1}{\sqrt{2}}\right| = \frac{1}{\sqrt{2}}\right)$$

for all trellis paths, and thus these values provide no information that would be useful in discerning different ones of the paths. On the other hand, the expected envelope in the middle of each interval (i.e., $A_2$) varies depending on which state transition signal was sent and thus provides useful information for path discrimination. Also, as shown in FIG. 6, two paths have zero-valued expected envelopes in the middle of the interval, and thus undefined phases at these points, so we avoid computing differential phases based on the signal samples taken at the center of the interval. Therefore, for the case of binary QM-MSK signals, a good choice for a low-cost sub-optimal receiver would be one that that computes branch metrics using only the value of the envelope at the middle of the interval ($R_2$) and the differential phase for the entire interval (phase at the end minus phase at the beginning).

We next show how to compute the specific branch metric for the specific noncoherent QM-MSK trellis decoder that computes samples of the envelope in the middle of the interval and that computes the differential phase between the beginning and end of each symbol interval. We use the same high SNR assumptions that led to equation (49). That is, we specifically look at the form that equation (49) would take on for this particular choice of parameter vector.

In order to determine the contribution from the envelope observation, $R_2$, sampled at the middle of the interval, start with equation (39). By following the steps of equations (43)-(44), we can write:

$$f(R_i) = \frac{1}{2\pi\sigma^2}\left[e^{-\frac{A_i^2+R_i^2}{2\sigma^2}}\right]\frac{1}{2\pi}\int_0^{2\pi} e^{\frac{A_iR_i\cos(\beta_i-\theta_i-\gamma)}{\sigma^2}}d\gamma \quad (50)$$

Now since at $R_2$ we have no phase differential value, $\phi$, to work with anyway, we eliminate the effect of the random unknown phase by integrating over all phase values in equation (50), so that equation (50) becomes:

$$f(R_i) = \frac{1}{2\pi\sigma^2}\left[e^{-\frac{A_i^2+R_i^2}{2\sigma^2}}\right]I_0(A_iR_i/\sigma^2) \quad (51)$$

$$\approx \frac{1}{2\pi\sigma^2}\left[e^{-\frac{A_i^2+R_i^2}{2\sigma^2}}\right]\frac{e^{A_iR_i/\sigma^2}}{\sqrt{2\pi A_iR_i/\sigma^2}}$$

where the approximation made in equation (51) is the same high SNR assumption used to derive equation (49). To get this into the form of an additive branch metric, we compute the natural logarithm of the probability density function and perform some algebraic manipulations to obtain:

$$\ln[f(R_i)] = -\frac{(A_i-R_i)^2}{2\sigma^2} - \ln(2\pi\sigma^2) - \frac{1}{2}\ln(2\pi A_iR_i/\sigma^2) \quad (52)$$

$$\approx -\frac{(A_i-R_i)^2}{2\sigma^2} - \ln(2\pi\sigma^2)$$

Noting that the last term in equation (52) is common to all paths as are the envelop contributions at $A_1$ and $A_3$, we thus eliminate these terms from the branch metric and thus can write P for use in the branch metric as:

$$P = -\frac{(A_2-R_2)^2}{2\sigma^2}. \quad (53)$$

Similarly, in this specific example, the Q in equation (48) need only be evaluated at the endpoints of the interval for the single phase difference measure:

$$Q = \frac{1}{\sigma^2}\sqrt{(A_1R_1+A_3R_3\cos\phi)^2+(A_3R_3\sin\phi)^2} \quad (54)$$

Next observe that $A_1=A_3=A\sqrt{(1+\rho^2)/2}$. Assuming the SNR is high enough, the envelopes $R_1$ and $R_3$ will be approximately equal to $A\sqrt{(1+\rho^2)/2}$, so that we can approximate:

$$Q \approx \frac{A^2(1+\rho^2)}{2\sigma^2}\sqrt{2+2\cos\phi}. \quad (55)$$

Therefore, for this particular example, the total branch metric involving the contributions from both P and Q can be approximated by the further-simplified form:

$$B_m(k) = -(A_2-R_2)^2 + \sqrt{2}A^2(1+\rho^2)\sqrt{1+\cos\phi}, \quad (56)$$

where $\phi$ is the difference between the measured differential phase and the template differential phase for the $m^{th}$ composite state transition of the transmitted QM-CPM signal, i.e., $\phi=[\Delta_\beta-\Delta_{\theta_m}]$. It was noted numerically that the simplified/approximated metric of equation (56) performed about the same as when the same observation vector, $\{R_2, \phi\}$ is plugged directly into equation (46). As is discussed shortly, our simulations indicate that an observation vector that comprises only a single envelope measurement and a single phase difference measurement does not perform as well as would be desired. This helps us understand where the limits are, i.e., how the decoder behaves when only supplied with a minimal amount of data in the lowest cost embodiments.

The performance of the above receiver can be improved by taking more samples during each interval. As discussed previously, in the specific case of QM-MSK, for some of the state transition signals shown in FIG. 6, the expected envelope at the middle of the interval and the corresponding $A_i$ is zero, giving rise to a random phase that is uniformly distributed between 0 and $2\pi$. As before, we thus avoid measuring the QM-MSK signal's differential phase at the middle of the interval.

One way to construct an observation vector is to measure the signal envelope at times T/4, T/2 and 3 T/4, and measure the signal's differential phases between the beginning of the symbol interval and times T/4, 3 T/4, and T. For example, a decoder can be constructed that directly plugs these three envelope observations and these three differential phase measurements into one of the branch metric of equations (46) or (49). Our numerical simulations show that the results are about the same, so we prefer equation (49) due to its computational simplicity.

Other simpler branch metrics can also be constructed that have been shown numerically to perform about as well as the detector described in the paragraph above. For example, a branch metric can be constructed that uses the three envelope observations and only one differential phase measurement between times T and 0 (phase at the end of the symbol interval minus the phase at the beginning of the symbol interval) as:

$$B_m(k) = \sqrt{2}A^2(1+\rho^2)\sqrt{1+\cos\phi} - \sum_{i=1}^{3}(A_i-R_i)^2. \quad (57)$$

Or, for example, we can heuristically scale the contributions of the three envelope detectors to contribute more evenly with the one differential phase measurement by defining:

$$B_m(k) = \sqrt{2}A^2(1+\rho^2)\sqrt{1+\cos\phi} - \frac{1}{3}\sum_{i=1}^{3}(A_i-R_i)^2. \quad (58)$$

The bit error probability ($P_{be}$) of the receiver of FIG. 12 using the QM-MSK signal structure of FIGS. 6-7 and 11 was computer simulated and plotted with $E_{b,avg}/N_0$ for different branch metrics considered in this study. The bandwidth of the receiver front end filter was assumed to be the 99% bandwidth of QM-MSK signals, i.e. BT=1.2. The average bit energy $E_{b,avg}$ was found by first finding the symbol energy $E_{s,avg}$ using $$E_{b,avg.} = \frac{E_{s,avg.}}{2} = \frac{A^2 T}{4}\overline{[m_1^2(t)+\rho^2 m_2^2(t)]} = \frac{A^2 T}{8}(1+\rho^2) \quad (59)$$

where for QM-MSK $$\overline{m_1^2(t)} = \overline{m_2^2(t)} = 1/2$$

and the overbar represents the time average.

Figure 14:
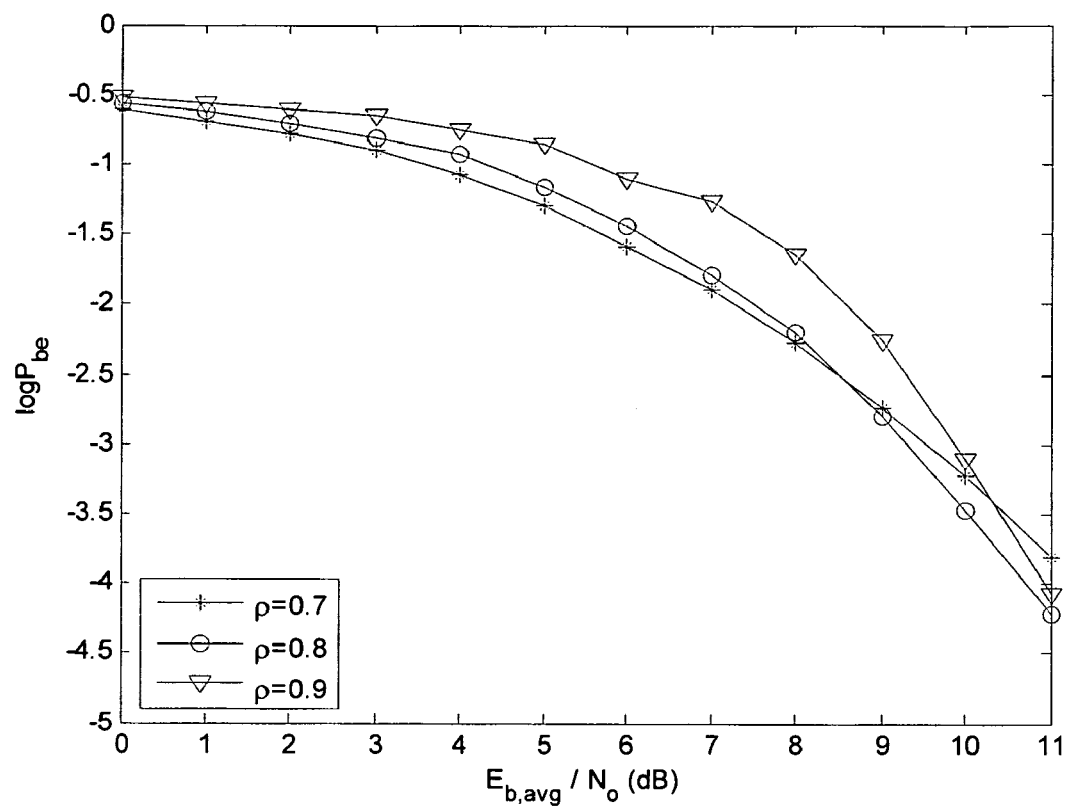
FIG. 14 is a performance plot showing how BER performance is affected by a parameter ρ used to generate QM-MSK adapted for reception in the noncoherent receiver.

Because it was numerically verified that in all cases the exact metric in equation (46) and the approximations of equation (49) perform very close to each other, the numerical results are presented only with simplified metrics. FIG. 14 shows the simulated $P_{be}$ variations of the QM-MSK with the metric in (49) for ρ=0.7, 0.8 and 0.9. It is seen that ρ=0.8 is a good choice, and hence the rest of the results are presented for ρ=0.8. It was also noted that ρ=0.8 provided better performance at lower SNR while ρ=0.9 provided better results at higher SNR. As SNR decreases, the best value for ρ decreases and as SNR increases, the best value to use for ρ increases. Therefore, in accordance with an aspect of the present invention, the ρ parameter is adjusted adaptively by measuring one or more signal parameters related to SNR, either directly or indirectly, and setting ρ, for example, to a pre-stored value based on the one or more measured SNR-related parameters.

Figure 15:
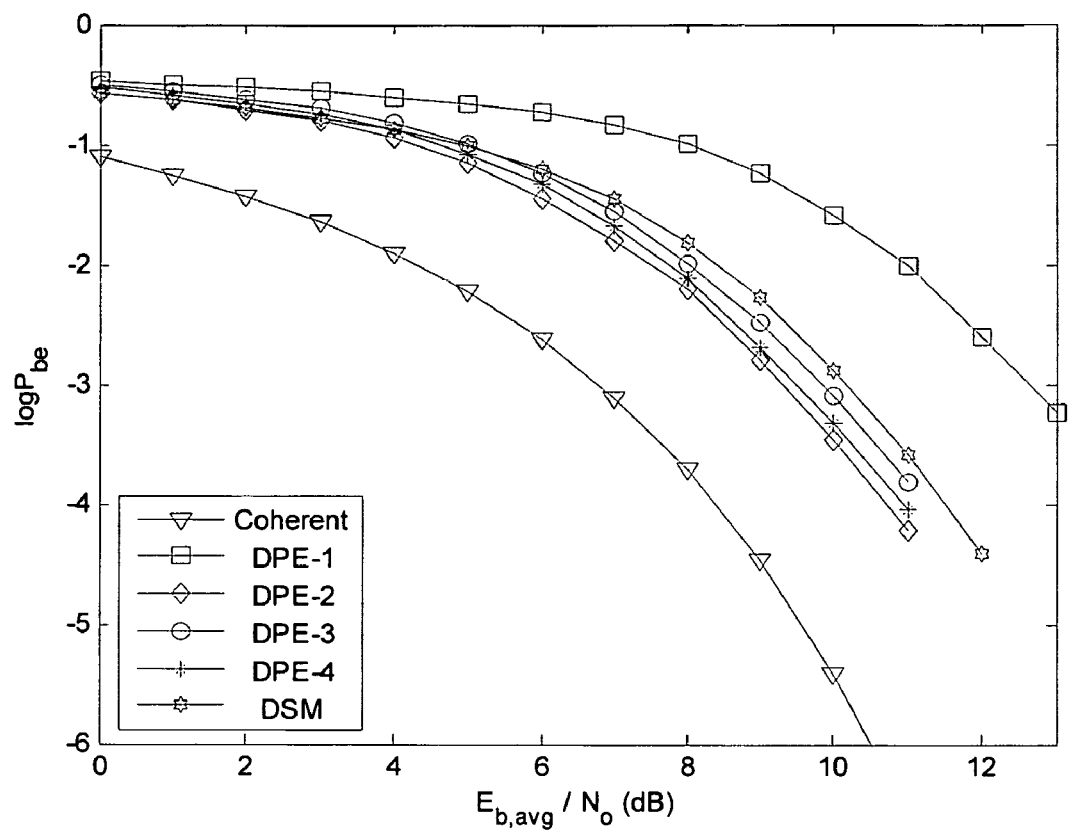
FIG. 15 is a BER performance curve illustrating performance of various versions of a noncoherent QM-MSK receiver that processes envelope and differential phase measurements.

FIG. 15 shows the simulated bit error probability variations of QM-MSK with the DSM scheme and DPE schemes with the following branch metrics when ρ=0.8:
Scheme DPE-1: Eqn. (56) with K=2
Scheme DPE-2: Eqn. (49) with K=4
Scheme DPE-3: Eqn. (57) with K=4
Scheme DPE-4: Eqn. (58) with K=4

For comparison, the theoretical probability of bit error for coherent detection is also plotted in FIG. 15. It is seen that the receiver with K=2 (DPE-1) performs about 5 dB worse than coherent detection, while the receivers with K=4 perform within 2.5 dB of coherent detection. It is also observed, as expected, that scheme DPE-2 using equation (49) performs best among all the DPE schemes with K=4.

Figure 16:
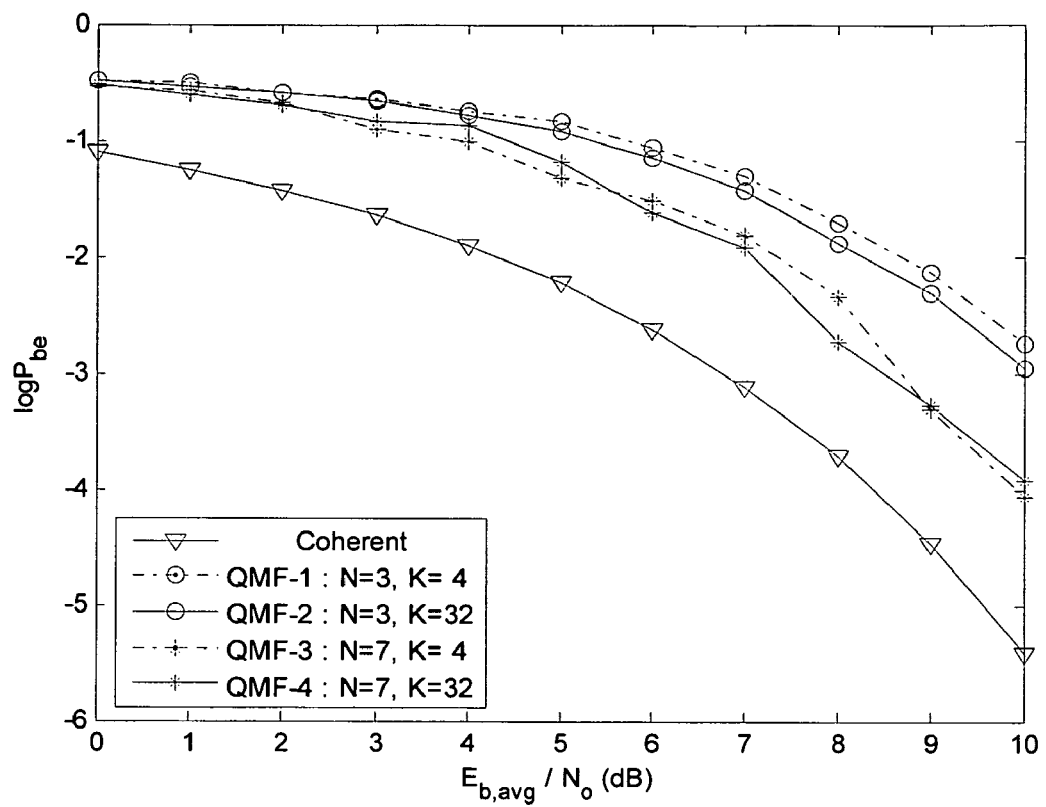
FIG. 16 is a BER performance curve illustrating performance of various versions of a noncoherent QM-MSK receiver that uses the sequence-based quadrature matched filter approach.

VI-E: Comparative Analysis of Noncoherent Sequence Matched Filter and Envelope/Differential Phase Approaches For comparative purposes, we now evaluate the same QM-MSK example as discussed above in section VI-D above. In this version, though, we use the branch metrics of equation (34) and the per-survivor processing Viterbi algorithm techniques discussed in connection with equation (34). FIG. 16 shows a set of bit error probability curves generated using Monte Carlo simulation techniques for a set of detectors that use the QMF branch metrics of equation (34) with the following parameters:
Scheme QMF-1: N=3, K=4
Scheme QMF-2: N=3, K=32
Scheme QMF-3: N=7, K=4
Scheme QMF-4: N=7, K=32

Figure 17:
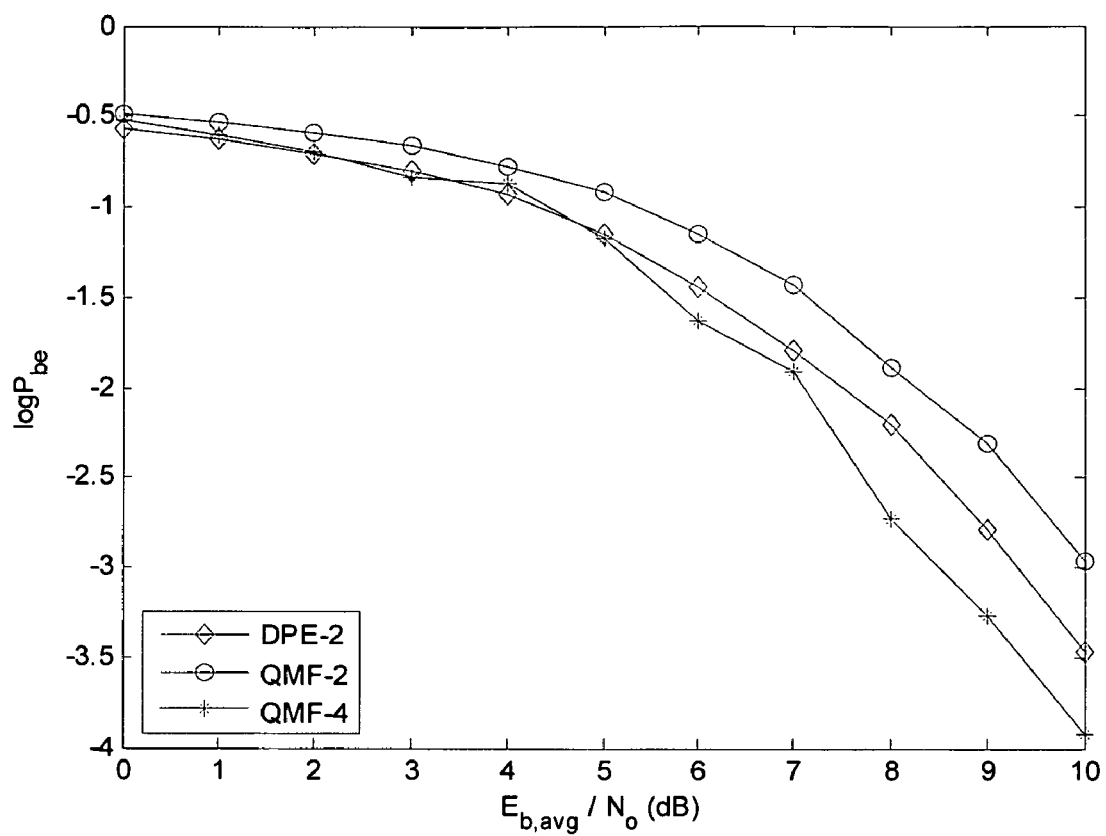
FIG. 17 compares performance of selected versions of a noncoherent QM-MSK receiver that that processes envelope and differential phase measurement to the sequence-based quadrature matched filter approach, under the assumption that the random phase is constant over an entire N-symbol sequence.

As can be seen from FIG. 16, the performance improves as N and K increases. FIG. 17 compares performance of scheme DPE-2 with schemes QMF-2 and QMF-4. Under the condition that the random phase, γ, is constant over the entire N-symbol interval, and if N≧7 with K=4 or K=32, the QMF schemes that use equation (34) perform better than the DPE-2 scheme. However, scheme DPE-2 performs better than scheme QMF-2, indicating that the N≧7 condition is needed for the QMF methods to outperform the DPE methods on the QM-MSK example under study. We note that while method DPE-2 requires O(9MLK), that method the QMF-3 scheme requires O(7*9MLK), i.e., a factor of seven more computations than DPE-2.

Figure 18:
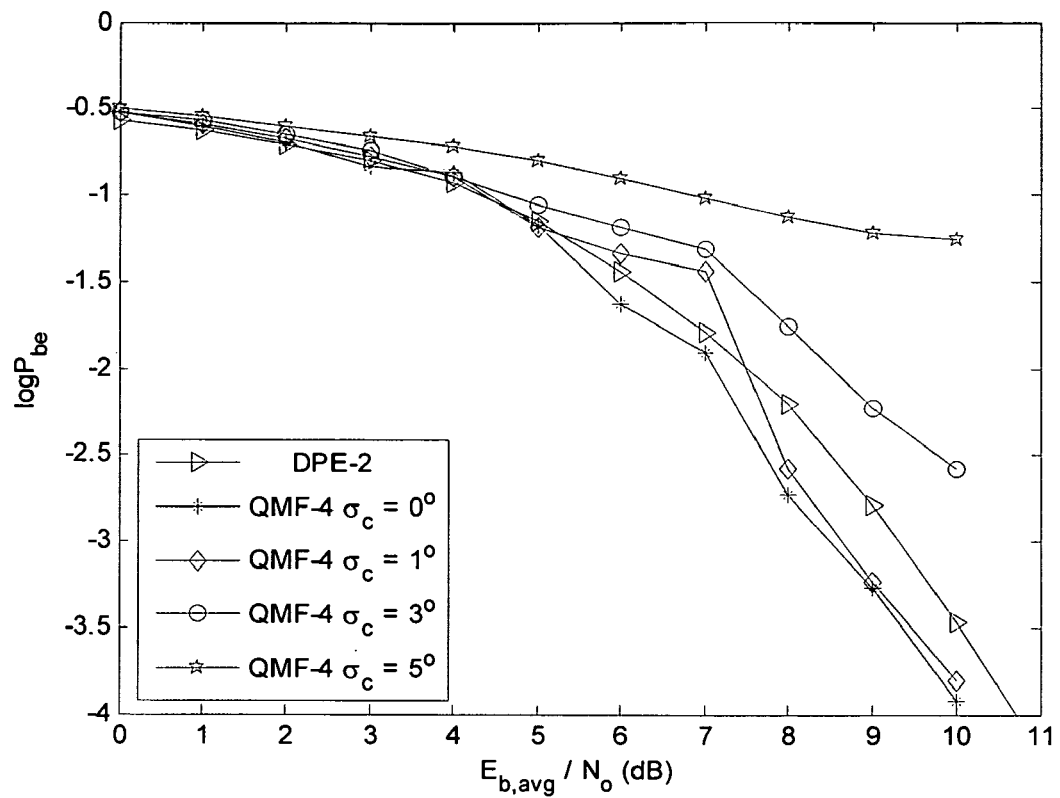
FIG. 18 compares performance of selected versions of a noncoherent QM-MSK receiver that that processes envelope and differential phase measurement to the sequence-based quadrature matched filter approach, under the assumption that the random phase has a small amount of fluctuation from one symbol interval to the next.

FIG. 18 studies the effect of a random phase γ that changes slightly from one symbol interval to the next. That is, FIG. 18 analyzes the performance of the QMF methods by considering γ to be constant during any single interval and letting it have independent Gaussian increments with variance $\sigma_c^2$ from one interval to the next, essentially by modeling γ by a Weiner process. FIG. 18 shows the error probability variation of scheme QMF-4 when $\sigma_c$=1 degree, $\sigma_c$=3 degrees and $\sigma_c$=5 degrees. It is seen that scheme QMP-4's performance falls below that of scheme DPE-2 when the random phase variable is not perfectly constant over the N-symbol interval. Such conditions may be encountered in many types of mobile communications scenarios. Scheme DPE-2 was found to perform better than scheme QMF-4 when $\sigma_c$=3 degrees or greater. Also, when $\sigma_c$=1 degree, DPE-2's performance is equal to or better than that of QMF-4 up to an $E_b/N_0$ of 7.5 dB, and QMF-4's performance edge at high SNR is less than one dB. Scheme DPE-2 can also maintain a performance edge when other types of phase variations occur such as phase slips or other types of phase variations caused by Doppler, multi-path, and deep fading effects, oscillator instabilities and fluctuations, as well as other effects caused by subscriber terminals making symbol timing adjustments to align to an OFDMA or NBFDMA uplink symbol time slot.

Another effect to consider when comparing scheme QMF-4 to scheme DPE-2 is that scheme QMF-4 used per-survivor processing to limit the number of states needed for Viterbi decoding, while scheme DPE-2 does not use per-survivor processing. It was noted in our simulations that the per-survivor processing introduces some degree of error propagation at moderate to lower signal to noise ratios. The error propagation can increase the number of errors that occur in succession because the errors propagate into and contaminate the survival paths used in equation (34). It should be noted that additional per-survivor processing may be optionally used any of the schemes, for example, DPE-2 and QMF-4, in order to account for inter-symbol interference, if present, in such a way as to not expand the number of states in the Viterbi decoder.

VII. Continuous-Phase Tone Hopping in the NBFDM Uplink

In this section we consider frequency hopping in the NBFDM uplink. On this application, we refer to frequency hopping among "tone" subchannels in an OFDM or an NBFDM system as "tone hopping." The phrase "fast hopping" is defined as a tone hopping system where the dwell time of a particular information stream at a particular tone is one symbol interval. The phrase "slow hopping" is defined as a tone hopping system where the dwell time of a particular information stream at a particular tone is a sequence of N>1 symbol intervals.

Consider an NBFDM uplink where each tone is modulated using a continuous phase modulation such as CPM or QM-CPM. In order to maintain the desirable spectral properties of CPM, the CPM or QM-CPM signal modulated onto each tone should maintain a continuous phase within each symbol interval and across boundaries between adjacent symbol intervals. Therefore, an aspect of the present invention introduces a slow hopping technique that is constrained to maintain phase continuity as observed at each individual tone. That is, at a particular tone, the phase of the sub-channel just before the hop and just after the hop should be as close to being the same as possible.

For example, consider an NBFDM uplink embodiment that uses QM-CPM to modulate each tone and uses slow hopping for hopping different user's signals among different tones. Represent a first user's transmitted QM-CPM signal (in polar coordinates) as $u_1(t)=(A_1(t), \theta_1(t))$, and a second user's transmitted QM-CPM signal as $u_2(t)=(A_2(t), \theta_2(t))$. Then to ensure the desirable spectral properties of the QM-CPM signal are preserved, we enforce a coding constraint that forces $u_1(t)$ and $u_2(t)$ to be equal at the point where the slow hop transition occurs. This way the signal modulated onto the particular tone will be a QM-CPM signal without phase jumps at the hopping instants.

To enforce the slow hopping continuity constraint, we insert periodic state-synchronization symbols into each user's information stream every $N_d^{th}$ symbol interval, where $N_d$ is the dwell time in symbol intervals of the slow hopped system (which is typically different from the N in equation (30) and other equations discussed in connection with the QMF based detectors. In fact, it should be noted that the QMF based detectors would not be expected to perform as well in slow hopped uplinks, because each hop, the paths $P_{i,j}^N$ become interrupted. While the QMF based detectors can be adapted to operate in a slow hopping environment, such embodiments need to be restarted each hop with a clean symbol sequence memory. As such, sequences of less than N symbols will be used after each hop until N symbol intervals have passed. Because our simulations show the performance is reduced for small values of N, it is expected that the DPE based detectors would out perform QMF detectors both slow-hopped or fast hopped uplinks. If $N_d \gg N$ then a slow-hopped QMF detectors performance would approach the simulation curves reported herein, but $N_d \gg N$ would not be expected to be the case in most frequency hopped systems. This is because the DPE detectors only need assume the random phase, $\gamma$, is constant over a single symbol interval.

It can be understood that state-synchronization symbols are similar in ways to pilot symbols transmitted in OFDMA uplinks. That is, state-synchronization symbols detract from the useful bandwidth of the system and use up one $N_d^{th}$ of the useful bandwidth. For comparison purposes, this would be equivalent to sending one pilot tone per group of $N_d$ tones in a standard OFDMA uplink. For moderate sized $N_d$, for example $N_d \geq 8$, a large savings can be obtained using the CPM-NBFDMA slow hopping approach of the present invention as compared to using an OFDM uplink with pilot tones. Beside the advantage of reduced bandwidth needed for reference tones in the uplink, NBFDMA uplinks are also less sensitive synchronization and Doppler mismatches among the uplink signals transmitted by different subscriber terminals.

Figure 19:
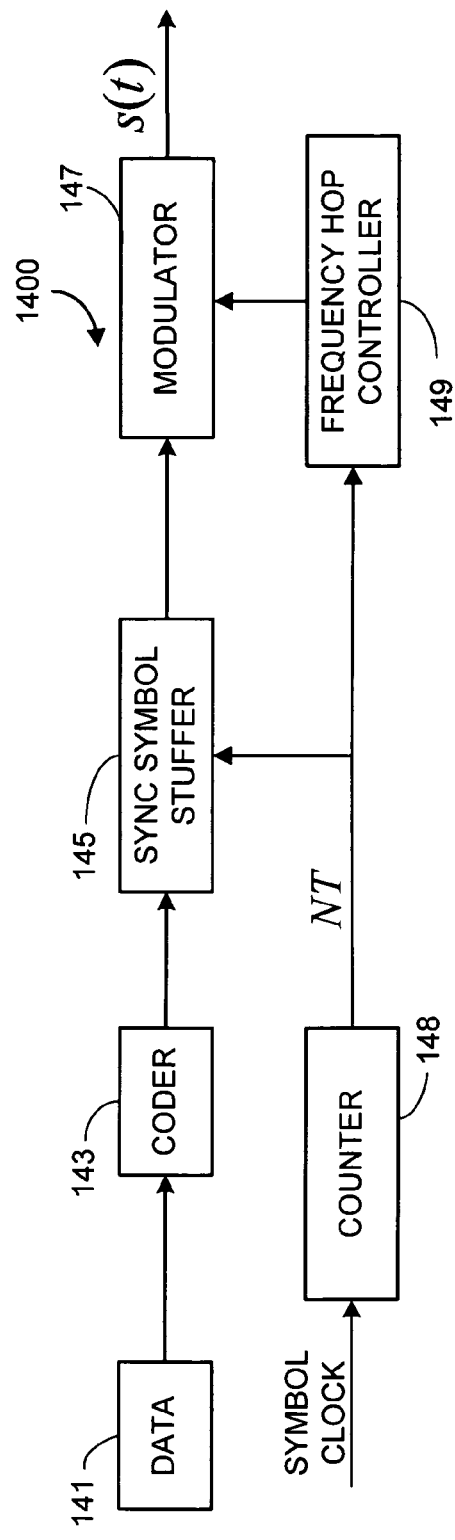
FIG. 19 is an illustration of a control arrangement for assuring phase continuity across frequency hops in a continuous-phase frequency hopping system.

An exemplary embodiment of an aspect of the invention involving continuous-phase slow hopping in the uplink while is illustrated in FIG. 19. The data stream 141 is optionally coded in a coder 143 and this information stream is sent to a synchronization symbol stuffer 145. The output data stream, including the stuffed synchronization symbols is sent to a modulator 147 which can be implemented as a QM-CPM modulator or other types of continuous phase modulators. A symbol clock, typically derived from the basestation's downlink signaling and control, is sent to a symbol counter 148. The symbol counter 148 generates an indication every $N_d^{th}$ symbol interval to signal to the symbol stuffer 145 to insert a synchronization symbol, and indicates to the frequency hop controller that it is time to hop to the next frequency in a frequency hop schedule derived from base station control.

The synchronization symbols that are inserted depend on the trellis state of the transmitter in a particular channel at the $(N_d-1)^{st}$ symbol interval. The synchronization symbol is inserted during the $N_d^{th}$ symbol interval to carry the state from where it happens to be in the $(N_d-1)^{st}$ symbol interval to a known common reference state. This way a second signal also passing through the known reference state at the same time can switch into the particular channel at the end of the $N^{th}$ symbol interval without causing a phase jump.

VIII. TDMA/OFDMA Bursted Uplinks Embodiment of AOFDMA

In this section we consider an alternative approach to using a narrow band modulation in the uplink. The idea of this type of embodiment of an AOFDMA system is to make user terminals look temporarily more like the base station. In this type of AOFDMA embodiment the headend preferably executes a fast frequency hopping protocol in the downlink and sends data to multiple user terminals using multiple tones as usual. As discussed below, the headend preferably implements opportunistic beamforming whereby a set of beam former weights are varied to form a slowly time varying channel response that favors different subscribers at different times. In this type of OFDMA embodiment, the uplink looks more like a TDMA bursted uplink than a slow hopped OFDMA uplink although it is a combination of both, as described in more detail below. At any given time, only one or a few specially-selected subscriber stations transmit in the uplink direction. Overall system throughput is optimized subject to constraints and pilot tone usage is optimized jointly to maximize overall system efficiency.

Figure 20:
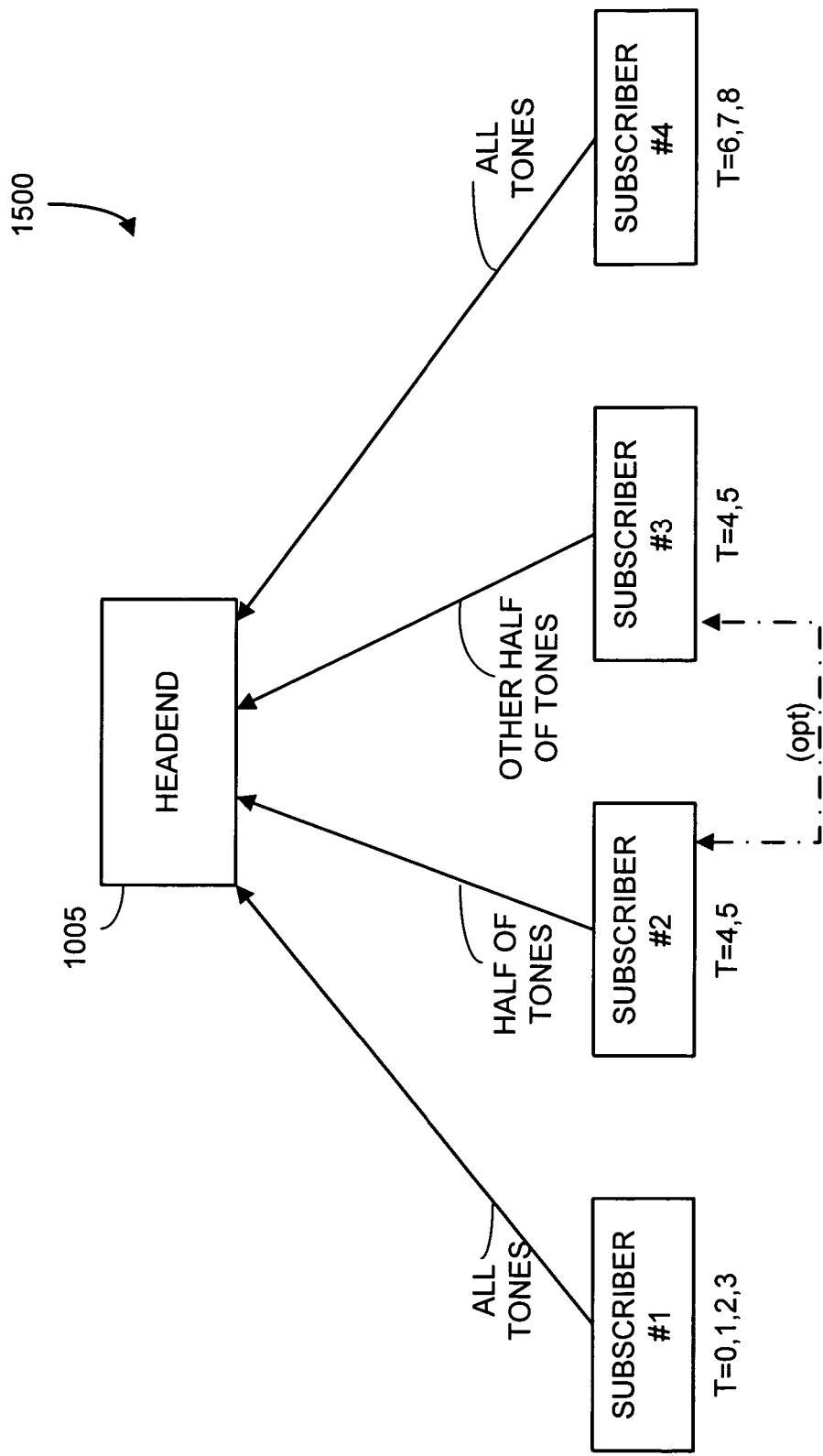
FIG. 20 is an illustration of a communication system where different subscriber terminals transmit to a headend using a TDMA/OFDMA bursted uplink protocol.

Consider FIG. 20. In this illustration, a headend system 1005 is in communication with four subscriber terminals. At times T=0,1,2,3, subscriber #1 transmits an OFDM (or OOFDM) uplink signal using all of the tones. Subscriber #1 can thus send one or more pilot tones the same as the base station. More than one pilot tone may be needed if the frequency response of the overall OFDM channel is not flat. The idea here is to allocate to subscriber #1 a large enough number of tones so that it can use pilot tones efficiently.

Continuing with the illustration, at times T=4,5 subscribers #2 and #3 both transmit together using half the tones each. In different embodiments different numbers of subscribers can share the tones evenly or unevenly. For example, three subscribers could transmit at the same time, one with half the tones and the other two with a quarter of the tones. In some embodiments, subscriber terminals #2 and #3 use an optional local connection to ensure they properly synchronized to enhance compatibility in the uplink. Next in FIG. 20, subscriber #4 transmits using all the tones during symbol time intervals T=6,7,8.

The scheme of FIG. 20 is preferably used with a scheduling algorithm performed by the headend 1005. For example, the mobile units can monitor the downlink and provide periodic SNR reports to the headend. The headend preferably allocates bursts to the subscribers who are experiencing the best possible channel conditions. The headend system 1005 preferably periodically alters its transmit and receive beamforming patterns periodically so that different users experience favorable conditions periodically, but at different times. In this scheme, because subscriber stations send bursts of data on parallel tones, inter-tone coding is preferably provided to allow errors on deeply faded tones to be detected and/or corrected using data derived from other tones.

In embodiments that use opportunistic beam forming, the headend uses an antenna array and modifies the beam pattern as a function of time to induce additional time-varying channel fading. The subscriber stations monitor the downlink and report their SNR values, so that the base station knows which antenna patterns have peaks at which subscribers. A scheduling algorithm in the headend 1005 then schedules as much bandwidth as possible to the subscriber or subscribers who currently have the best SNR reading. This tends to maximize overall system throughput.

In accordance with an aspect of the present invention, the scheduler also takes pilot tone usage and into consideration. If the OFDM channel is perfectly flat, only one pilot tone is needed. However, because of frequency selective fading and other effects, a plurality of pilot tones may be needed. In the downlink, these pilot tones are spaced out to cover different groups of frequencies that have relatively flat inter-group frequency responses. In this type of embodiment, different users are allocated large groups of tones for burst uplink transmission. The uplink tone groups are allocated so that a single pilot symbol can be shared among as many tones as possible in each allocated group. Pilot tone sharing is taken into consideration by a scheduling algorithm which allocates the tone groups so as to optimize system throughput subject to QOS constraints.

For example, suppose that, due to current channel conditions, thirty tones were found have a relatively flat response. This could be determined using the frequency response of the channel on a system-wide basis, or could be reported based on measurements and analysis performed in and reported by each mobile unit. Then the scheduling algorithm would favor an allocation that grouped these thirty tones into a group for use by a single mobile in one or more time slots. The single mobile could thus optimally use one uplink tone (e.g., in the center of the group) for a pilot signal to be shared among the other twenty-nine tones in the group.

While the base station can perform fast hopping in the downlink, fast hopping in the uplink is more difficult due to inter-mobile synchronization difficulties. Fast hopping in the uplink would correspond to sending bursts by different subscriber stations that are just one OFDM symbol long. Therefore, for the same reason that slow hopping is preferred in the uplink, in a TDMA/OFDMA style uplink, bursts that span at least two or more symbol intervals are preferred from a synchronization standpoint. The present invention provides ways to allow a few selected users to be assigned separate parallel uplink tone groups so that the burst duration can be lengthened. This is illustrated in FIG. 20 where two uses transmit on the uplink, each using half the uplink bandwidth. This can be used to stretch out the length of a burst.

In embodiments that use opportunistic beamforming, the opportunistic beamforming weights are preferably varied slowly so that a favorable SNR condition is experienced for a time interval that matches a desired burst duration. The burst duration is typically short, but preferably not as short as a single OFDMA symbol interval. The scheduler preferably schedules a small number of subscribers to share all the bandwidth at once for the duration of a burst interval.

To improve performance, in certain embodiments, the headend maintains a geographic profile data for each mobile station. This geographic data can be obtained in various ways, for example, using triangularization, mobile units can report their GPS coordinates, or certain subscriber installations may have known fixed coordinates that are maintained in a database at the fixed database headend. In the short term, due to mobility, the geographic information is maintained in a dynamic data base at the headend.

In accordance with an aspect of the present invention, this geographic information is used in the headend to schedule uplink bandwidth. Subscriber terminals are grouped according to geographical location. For example, subscriber terminals located in the same relative geographical area are preferred (or discouraged) for sharing uplink tones in the same time slots. The geographic information is weighted with the SNR estimates, and users who have similar SNR readings and, for example, are in relatively close geographic proximity, are preferred for sharing uplink tones. This allows a few users share almost all of the bandwidth during a burst duration. Instead of one user occupying all of the OFDMA tones at once, a few users are carefully selected to share the uplink. Optionally, a small group of users that are geographically located near by can perform inter-mobile synchronization using relatively low power control signaling, and can thus provide more highly synchronized joint uplink signals in such embodiments where small groups of subscriber terminals self-synchronize in order to send improved quality uplink signals. For example, first terminal can assume a local control functionality and transmit within a local wireless coverage area a spread spectrum timing signal for correlation and local timing adjustment by subscriber stations in the local wireless coverage area. This way a subset of terminals can maintain a tight local synchronization and more optimally share uplink spectrum by locally aligning their uplink transmissions.

For example, the headend 1005 can implement an OFDMA protocol that involves wirelessly transmitting information signals to a plurality of wireless subscriber stations using an OFDM downlink communication protocol. In accordance with an aspect of the present invention, the headend simultaneously receives from two or more of the plurality of wireless subscriber stations information modulated onto separate tones of a composite uplink signal received in accordance with an OFDM communication protocol to provide orthogonal frequency division multiplexed multiple access to the plurality of wireless subscriber stations. In this specific type of embodiment, the two or more of the plurality of wireless subscriber stations use a local wireless channel to communicate inter-subscriber synchronization signals, derive an inter-subscriber synchronization reference therefrom, and use the inter-subscriber synchronization reference to synchronize their OFDM uplink transmissions for transmission to the headend 1005.

Another way to determine which subsets of subscribers such as subscriber #2 and #3 can transmit simultaneously is to measure their timing errors at the headend. For example, if it is determined that two users have similar SNR peak times and that they have similar time offsets relative to the correct OFDM uplink symbol time, then those two users can be effectively scheduled together to share large portions of the total set of tones in the same burst interval. Other timing error measures may also be used, such as timing jitter relative to the headend's OFDM symbol timing reference. The scheduling algorithm may decide to assign a user with a high timing jitter all of the bandwidth over a short burst duration in order to avoid the loss of orthogonality problems that could arise by mixing that user with other users with better timing jitter characteristics.

Another way to decide which mobiles can be scheduled together is to analyze and use their Doppler shifts. Different mobiles can have different Doppler shifts which cause various effects, to include loss of orthogonality. For example, if one mobile has a positive Doppler shift and another has a negative Doppler shift, the total net relative Doppler shift could be large enough to give rise to significant inter-carrier interference. In a burst type scheduling environment where only a few users share large numbers of tones in a few bursted time slots, this effect could degrade performance. Thus the scheduling algorithm of the present invention preferably takes this into account and avoids scheduling different users with large relative Doppler offsets into the same burst interval.

Figure 21:
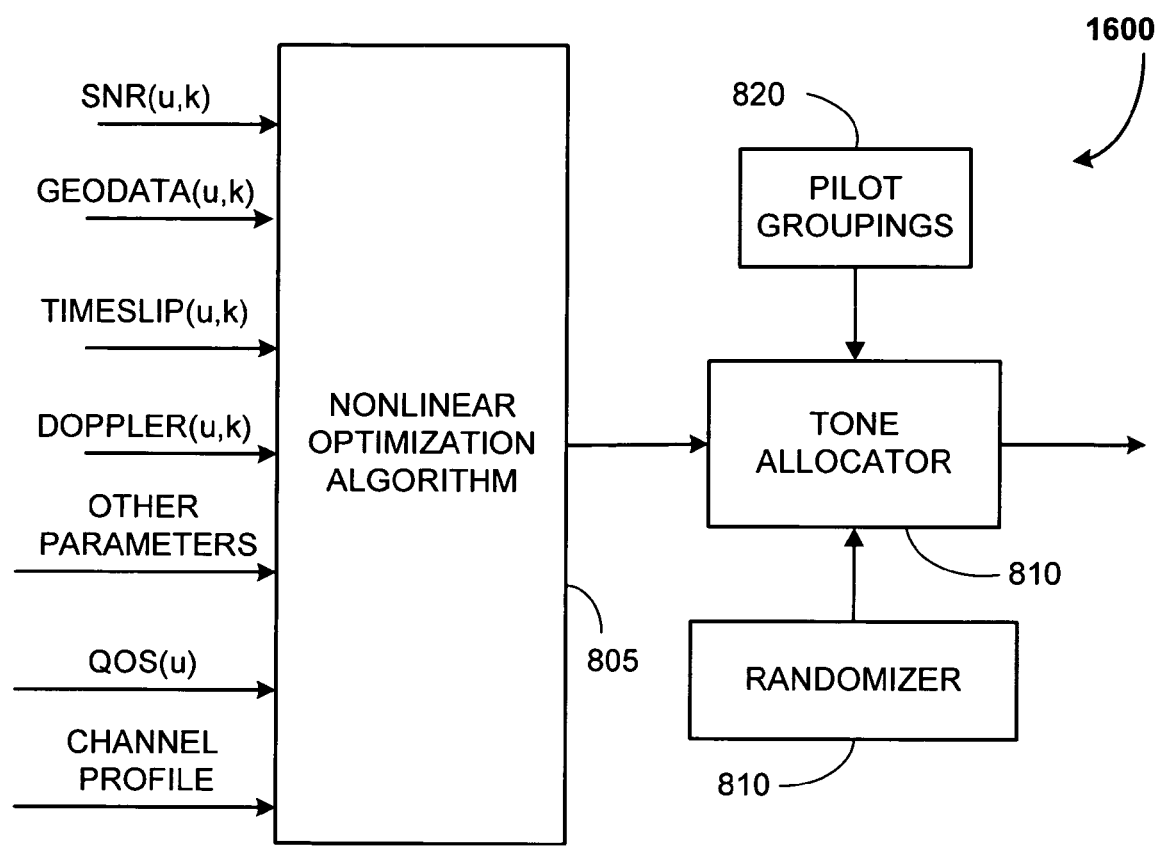
FIG. 21 is a block diagram illustrating a scheduling algorithm that schedules different subscriber stations to use sets of uplink tones during particular time slots based upon the optimization of a performance function and taking into account a number of different optimization parameters.

Referring now to FIG. 21, a scheduling module 1600 is illustrated in block diagram form. A nonlinear optimization algorithm 805 uses scheduling algorithms known in the art, for example, based on integer programming. The nonlinear optimization algorithm used can be similar to the type of scheduling algorithm used in opportunistic beamforming, and can be used in conjunction with opportunistic beam forming as discussed above.

In accordance with aspects of the present invention, the non-linear optimization algorithm 805 is configured to schedule a few different subscriber units to share the total uplink bandwidth in selected burst intervals. The nonlinear optimization algorithm 805 preferably accepts periodic SNR measurements reported by the mobile units and schedules large portions of instantaneous uplink bandwidth to those users experiencing favorable instantaneous SNR conditions (which may be synchronized with the time-varying opportunistic beam forming pattern as previously discussed).

Additionally, the nonlinear optimization algorithm 805 processes optional geographic data so that groups of users in close geographic proximity can be identified and the scheduler can favor (or disfavor) for scheduling together groups of mobile units that are geographically located near one another.

The nonlinear optimization algorithm 805 also preferably processes time slip data derived from the physical and/or link layers in the headend. While the headend sends synchronization in the downlink and the mobiles do their best to adjust their timing, a timing error profile can be calculated for each user and this data can then be used by the optimization algorithm 805 to classify different users into groups. For example, the scheduler looks for mobiles that have similar timing error profiles and attempts to schedule different users together in ways to minimize effects of synchronization errors. Some user's signal might be early most of the time, and others late, and it would be preferable to group early users with other early users. Others might have high timing jitter variances, while others may have low timing jitter variances. The optimization algorithm 805 uses a cost function to minimize co-interference effects by grouping subscriber stations in such a way to minimize the effects of co-channel group interference among the different subscriber stations. Doppler profiles and other parameters can also optionally be analyzed and taken into account by the optimization algorithm 805.

Additionally, the optimization algorithm 805 also takes into account a set of quality of service (QOS) constraints and responds to dynamic user requests for bandwidth. This way, the scheduler 1600 knows what subscribers require what bandwidth, and then sets out about its job of optimally scheduling the bandwidth.

The scheduler 805 preferably also takes into account a channel profile that may be time varying in accordance with the time varying beam pattern. The channel profile is used to determine which subgroups of channels have relatively flat frequency responses. A pilot tone can be shared among other tones as long as the other tones have similar responses. Hence the scheduler 805 optionally uses channel profile data to determine the number of channels in the subgroups of channels being allocated. The number of channels in a subgroup is related to the number of channels that can effectively share a single pilot tone.

As discussed previously, especially for mobiles that are geographically close together, additional inter-mobile control signaling can be used. For example, a first mobile can send a timing signal to one or more peers to form an ad hoc synchronized subgroup of mobiles that can more effectively cooperate to simultaneously send data onto different groups of tones in one or more uplink slots. In systems where geographic locating is or is not used, a particular mobile can send out a local timing signal and other stations can be identified to be "close" to the particular mobile unit based on their ability to receive the timing signal. For example, other stations could perform an SNR measurement on the timing signal and only respond if the SNR measurement is above a threshold. In a preferred embodiment, the particular mobile transmits a spread spectrum coded waveform that also serves as a signature of the particular mobile unit. Preferably, different mobile units can transmit different spread spectrum timing signal simultaneously and other mobile units can separate the different timing signal using code division multiple access type methods. In the other mobile units, correlators would be used to perform pulse compression to derive precise timing to a chip level, although the actual coded waveform itself would be much longer.

Once the scheduler 805 generates a schedule, it sends the schedule to a tone allocator 810. The schedule output from the scheduler 805 indicates which users will transmit in a particular burst duration, and how many tones each user is allocated. The tone allocator maps scheduling requirements onto physical tones. The tone allocator takes input from a pilot groupings module that keeps track of the same previously mentioned information that indicates which tones can be shared. The scheduler 805 is more interested in just the numbers of tones per group and the tone allocator is more concerned with the actual tones allocated to each user. A randomizer 810 is used to randomize the tone assignments as well and to implement any further frequency hopping within a dwell time of a burst allocation. In some embodiments the tone allocation function can be performed jointly in the block 805.

The scheduler of FIG. 21 used in conjunction with a burst oriented transmission scheme as shown in FIG. 20 can be used to overcome many uplink problems. Hence this solution is considered as an alternative form of AOFDMA. In this type of embodiment, the downlink uses fast hopping and the uplink hops between different users or subgroups of users in bursts. This is similar to TDMA, but in any burst interval, more than one user can share the uplink spectrum using different groups of tones. This ability allows the burst times to be lengthened, reducing synchronization requirements in the uplink. By scheduling small groups of users together that have compatible parameters, uplink pilot tone efficiency approaches that of the downlink and the error rate in the uplink channel is minimized.

IX. Embodiments and Alternative Embodiments

Certain embodiments of the present invention involve wireless multiple-access communication systems where a headend communicates with a plurality of wireless subscriber stations. The plurality of wireless subscriber stations use frequency division multiplexing to share an uplink frequency bandwidth. The headend implements a method of communications. The headend simultaneously transmits in a downlink direction a plurality of downlink information signals to a plurality of wireless subscriber stations using an orthogonal frequency division multiplexed (OFDM) communication protocol. The headend also receives a non-orthogonal narrow band frequency division multiplexed uplink signal that comprises a plurality of uplink information signals that are modulated onto respective uplink tones. Respective ones of the plurality of uplink information signals are transmitted from respective ones of the plurality of wireless subscriber stations, and respective ones of the uplink information signals are substantially confined to respective sub-band portions of the uplink frequency bandwidth. Frequency-domain filtering is performed by the headend to isolate respective signal energies contained in the respective sub-band portions to extract each respective uplink information signal from the plurality of uplink information signals.

It should be noted that all headend methods and systems also give rise to related methods of providing network services. For example, if the headend implements the method described in the paragraph above, the headend may be operated on behalf of a network services provider. For example, the network services provider may provide cellular telecommunications data network services and/or wireless broadband access services. In such cases the headend method is operated for economic gain and the wireless subscriber stations alternatively pay subscription fees or per usage fees. Hence to any of the methods described herein, additional steps such as charging subscriber subscription fees and/or per-usage fees, network roaming fees, and the like are to be under stood as additional aspects of the present invention. That is, all of the technical diagrams provided herein also illustrate methods of providing network services and charging fees for such services for economic gain or profit.

Many embodiments of the present invention are based on a broad inventive concept as disclosed herein. Methods, apparatus and systems can be constructed based upon these principles. A channelizing filter bank is used to separate a collection of frequency division multiplexed uplink signals into a plurality of non-coherently demodulated channel signals. For example, the channelizing filter bank processes an FDM, OFDM or NBFDM signal. The channelizing filter bank preferably involves a traditional filter bank, a vector transform (such as the FFT or fast wavelet transform), or some other type of filter bank like a multirate filter bank (e.g., fast polyphase). The noncoherently demodulated channel signals are then noncoherently detected either by using a trellis decoder, another type of sequence estimator, or symbol-by-symbol detector which can either operate over individual symbol intervals or larger sequence intervals. For an example of a general framework of this type of embodiment, see FIG. 1A, and re-label the blocks 460 as "noncoherent demodulator." Many modifications can be made to FIG. 1A, but this provides the general framework to those of skill in the art.

Along these same lines, embodiments that employ the channelizing filter bank to separate any collection of frequency division multiplexed uplink signals into a plurality of non-coherently demodulated channel signals can be constructed. The noncoherently demodulated channel signals are then noncoherently detected either by using a trellis decoder, another type of sequence estimator, or symbol-by-symbol detector which can either operate over individual symbol intervals or larger sequence intervals. Such embodiments can be used in other types of systems beside uplinks of AOFDMA, OFDMA, OOFDMA, or similar systems. For example, such embodiments could be used in DMT based ADSL applications or other types of multi-carrier systems.

Another aspect of the present invention involves demodulators (demodulator methods) for use in FDM, NBFDM and/or OFDM type uplinks. The demodulator uses a channelizing filter bank to separates a collection of frequency division multiplexed signals into a plurality of component baseband signals including a first component baseband signal. The demodulator also includes a trellis decoder that is responsive to the first component baseband signal. The trellis decoder uses a set of composite states (e.g., as shown in FIG. 11) including a first composite state that represents information related to a first pair of simple states. Each simple state in the first pair of simple states is a state in an underlying real-valued trellis path, for example, the states shown in FIG. 7. The trellis decoder also makes use of a branch metric calculator that calculates a respective branch metric for each of a plurality of composite state transitions. Each composite state transition of the plurality of composite state transitions respectively leads from the first composite state to a respective second composite state. Each respective second composite comprises a second respective pair of simple states. Each simple state in each second respective pair of simple states is a state in an underlying real-valued trellis path of a signal encoder, for example, the states shown in FIG. 7. In most embodiments, state transitions from the first composite state to the first composite state are also supported, but such transitions could optionally be eliminated, for example, by making use of trellis coded modulation to limit the set of possible state transitions out of each state.

The present invention also contemplates embodiments involving coherent detection that make use of composite states. For example, a coherent QM-MSK receiver could optionally use separate in-phase and quadrature-phase trellis decoders in accordance FIG. 7, or could use a single trellis decoder with composite states as per FIG. 11. Hence it should be noted that any of the receivers discussed herein could be used with coherent detection, and any of the receivers discussed in the parent application could be modified to use a composite-state trellis structure, for example, in the case of QM-MSK, in accordance with the trellis diagram of FIG. 11.

It should be noted that in certain embodiments, a channelizing filter bank can implemented as a channelizing filter bank, for example, as a fast polyphase filter bank. Likewise, fast channelizing filter banks may be implemented using vector transformations. For example, in OFDM uplinks, the vector transform may be a fast Fourier transform(FFT), or in OOFDM uplinks, it may involve an FFT plus other pre-processing and/or post-processing operations. Likewise, other types of vector transformations may be used (e.g., fast wavelet transformations, modulated cosine, DCT, etc.) to perform various types of trans-multiplexing operations that are performed by channelizing multirate filter banks. The particular filter bank structure used depends on specific implementation details, and can depend on whether NBFDM, OFDM, or OOFDM is used to modulate uplink signals in a particular application.

In accordance with another aspect of the present invention, the above development can be used to construct other types of demodulator for use in FDM, NBFDM and/or OFDM type uplinks. A channelizing filter bank is used to separate a collection of frequency division multiplexed uplink signals into a plurality of component baseband signals including a first component baseband signal. A trellis decoder responsive to the first component baseband signal, uses a set of composite states such as those shown in FIG. 11. The states used by the trellis decoder include a first composite state that represents information related to a first pair of simple states. Each simple state in the first pair of simple states is a state in an underlying real-valued trellis path such as the states shown in FIG. 7. The trellis decoder also makes use of a branch metric calculator. The branch metric calculator calculates a respective branch metric for each of a plurality of composite state transitions. Each composite state transition of the plurality of composite state transitions respectively leads from the first composite state to a respective second composite state, and each respective second composite is related to an underlying second respective pair of simple states. Each simple state in each second respective pair of simple states is a state in an underlying real-valued trellis path of a signal encoder, e.g., as shown in FIG. 7.

Either of the embodiments discussed in the two paragraphs above can preferably be used with a receiver that receives a wireless frequency division multiplexed uplink signal that comprises a set of tones. Onto a particular one of the tones is modulated a particular data sequence from a particular subscriber station. The demodulators can also optionally employ a channelizing filter bank that separates from the frequency division multiplexed uplink signal a plurality of component baseband signals including a first component baseband signal, wherein the first component baseband signal carries information related to the particular data sequence. In specific embodiments, the uplink signal can be an NBFDM signal where onto each tone is modulated a QM-CPM signal. Such embodiments typically employ an I/Q demodulator in each sub-channel that noncoherently extracts first and second real-valued baseband signals respectively from an in-phase carrier signal and a quadrature-phase carrier signal relative to a respective tone. The I/Q demodulator is typically not phase locked to the incoming signal, and non-coherent detection proceeds by jointly detecting the composite state, e.g., as per FIG. 11 as opposed to detecting two separable states from two separable trellises as per FIG. 7, as is used in the coherent case.

In accordance with an aspect of the present invention, differential phase and envelope (DPE) processing is used to construct various apparatus, systems and methods that can be used to noncoherently detect a sequence of information symbols encoded into a quadrature-modulated signal. Each information symbol in the sequence of information symbols has a duration of one symbol interval. An I/Q demodulator may optionally be used to noncoherently extract from an in-phase carrier signal and a quadrature-phase carrier signal first and second real-valued baseband signals. An envelope estimator computes from the first and second real-valued baseband signals one or more envelope measurements per symbol interval. A differential phase detector computes from the first and second real-valued baseband signals one or more differential phase measurements per symbol interval. A trellis decoder is used that operates on a set of composite states including a first composite state that comprises information related to a first pair of information values that were respectively modulated onto an in-phase carrier and a quadrature-phase carrier by an I/Q modulator. The trellis decoder also includes other composite states, to include a second composite state that comprises information related to a second pair of information values that were respectively modulated onto the in-phase carrier and the quadrature-phase carrier by the I/Q modulator. A branch metric calculator processes the one or more envelope measurements and the one or more differential phase measurements to calculate a set of branch metrics for each of a plurality of composite state transitions. Each composite state transition of the plurality of composite state transitions respectively leads from the first composite state to a respective second composite state. State transitions from the first composite state back to the first composite state are typically allowed in many embodiments, but such transitions could optionally be eliminated, for example, in accordance with a trellis coded modulation scheme that could optionally be employed to limit the set of allowable composite state transitions.

Figure 22:
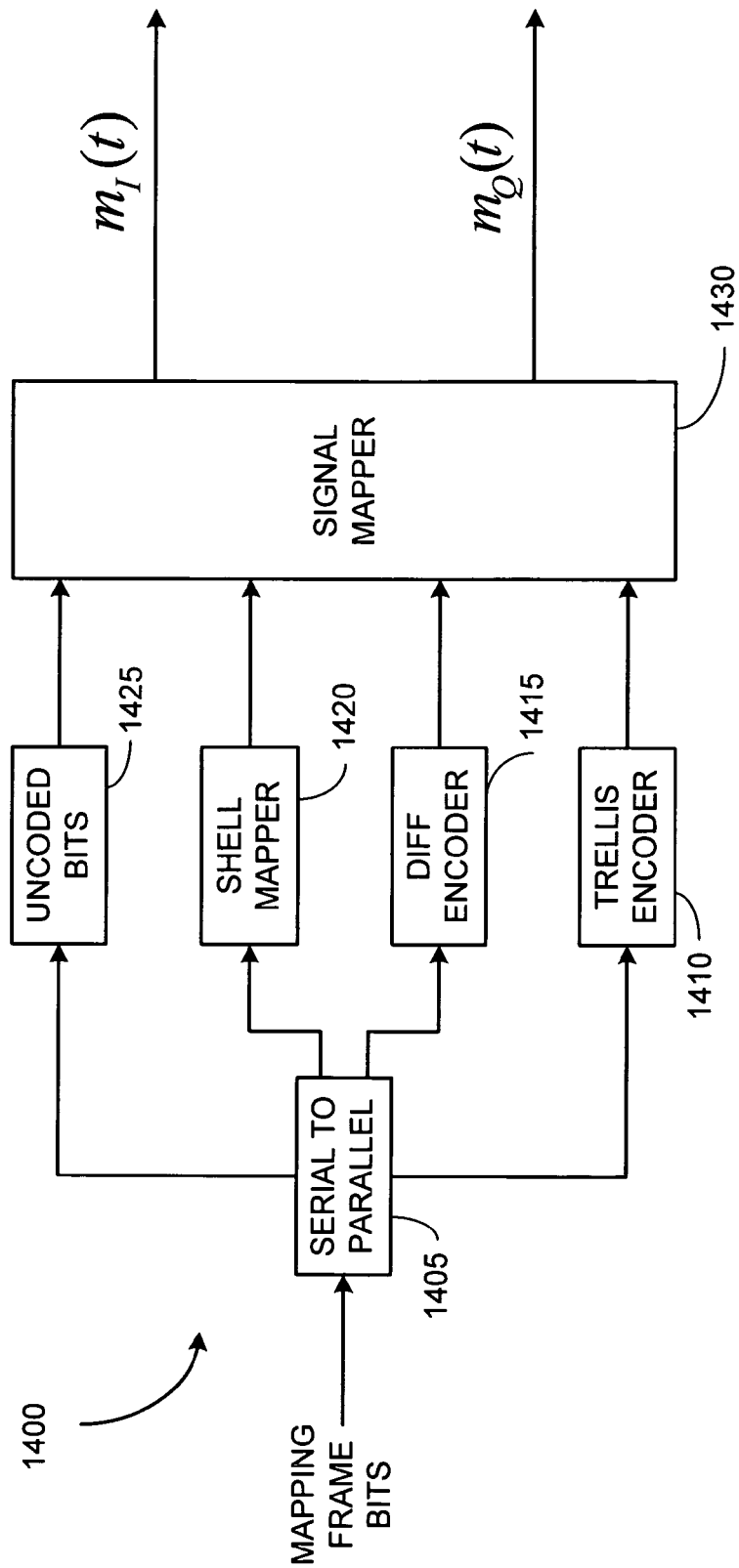
FIG. 22 is a block diagram that illustrates a structure that can generate various forms of DOAM, TCM-DOAM and TCM-OAM signals.

It is contemplated by the present invention that the joint differential phase and envelope (DEP) detection techniques and the other types of decoder structures discussed herein (QMF & DSM) can be generally used in communication systems where information is carried both in the amplitude and the differential phase of a transmitted communication signal. For example, differential quadrature amplitude modulation (DQAM) and differential TCM-DQAM are examples of this class of systems. An aspect of the present invention involves a DQAM transmitter that uses differential encoding between symbols. Different symbols transmitted by the inventive DQAM transmitter are defined by their respective amplitudes and trajectories of differential phases as the system transitions from a first symbol to a second symbol. The DEP decoder structures and the other types of decoder structures discussed herein (QMF & DSM) can be used to decode such DQAM signals. It should be noted that DQAM is general enough to cover many types of modulation schemes, for example, DQPSK and the like. That is, the constellation points of a DQAM constellation can be on a rectangular grid, concentric circles, a single circle, or any other differentially encoded and/or trellis encoded constellation shape, to include any TCM-QAM constellation in general. For example, FIG. 22 illustrates a structure that can generate various forms of DQAM, TCM-DQAM and TCM-QAM signals and the transmitted symbols may be of any specified pulse shape or transition symbol signal shape. Note that the trellis encoder 1410 can be used to incorporate additional trellis constraints to the DQAM signal.

The DEP receiver can also be used in situations when transmitting non-equiprobable symbols and the transmitter knows and employs apriori probabilities to adjust the transmitted amplitudes to optimize performance. In Korn et al. "Optimal Binary Communication with nonequal probabilities," IEEE Trans. Comm, September 2003. pp. 1435-1438 (incorporated herein by reference for background usage), an optimal receiver is presented for the transmission of coherent binary symbols. When applied to carrier modulation, such a system would become a BPSK type scheme with different amplitudes used for the two different symbols. When extended it to non-coherent detection, the transmitted signal will have information in both the envelope and the differential phase, and hence the DEP can be used for detection of the various types of signals (to include nonequal probability signals) discussed in the Korn reference.

To understand how to construct an additional class of alternative embodiments, consider equation (39). Equation (39) is a function of a single amplitude sample and a single phase sample. Instead, we can filter the amplitudes and phases over a symbol interval to obtain filtered values that can be plugged back in equation (39) to provide an alternative measure. We can thus compute $\int r(t)dt$ over an observation period and then use it to calculate branch metrics in accordance with the DPE approach, i.e., derived from equation (39). For the detection of the received signals given by equations (27)-(29) with $\tau=0$, the integral values at the end of the $N^{th}$ interval can be written using the low pass representation as:

$$[I_n+jQ_n]=[C_n+jD_n]e^{j\gamma}+nc_n+jns_n \tag{60}$$

where $$C_n = \int_{nT}^{(n+1)T} m_1(t)\,dt, \tag{61}$$

$$D_n = \rho \int_{nT}^{(n+1)T} m_2(t)\,dt$$

and $nc_n$ and $ns_n$ are two independent Gaussian random variables with variance $N_0 T/A^2$. We can express (60) as $$I_n+jQ_n=R_n e^{j\beta_n}, R_n=\sqrt{I_n^2+Q_n^2}, \beta_n=\text{atan}(Q_n/I_n). \tag{62}$$

Next express the conditional joint pdf of $R_n$ and $\theta_n$ as $$f(R_n, \beta_n | \gamma) = \frac{R_n}{2\pi\sigma^2} e^{-\frac{A_n^2+R_n^2}{2\sigma^2}} e^{\frac{A_n R_n \cos(\beta_n - \theta_n - \gamma)}{\sigma^2}} \quad (63)$$

where, $$A_n = \sqrt{C_n^2 + D_n^2},$$
$$\theta_n = a\tan(D_n/C_n) \quad (64)$$

Note that equation (63) is similar to equation (39). The difference between equations (63) and (39) is that $A_n$ and $\theta_n$ in equation (63) are calculated using the integrals of $m_2(t)$ and $m_1(t)$ as per equation (61) whereas they are calculated in equation (39) using the amplitudes of equations (40) and angles of equation (11).

Also because of the integration of equations (60)-(61), the noise components in equation (60) are transformed into independent random variables and any independence assumptions become satisfied. Therefore, all of the $f(R_n, \beta_n|\gamma)$'s for different values of n are independent. Due to the similarities between equations (63) and (39), the entire analysis of the DPE receivers presented in equations (41)-(45) can be applied to derive receivers using the integrals of equation (60).

A simple symbol-by-symbol detection receiver can be constructed by observing two consecutive outputs of the integrals of equation (60)-(61). Consider the joint probability density function of $(R_n, R_{n-1}, \beta_n, \beta_{n-1})$, $$f(R_n, R_{n-1}, \beta_n, \beta_{n-1}) = c\left[e^{-\frac{A_n^2+A_{n-1}^2+R_n^2+R_{n-1}^2}{2\sigma^2}}\right]I_0(\xi) \quad (65)$$

where $$\xi = \frac{1}{\sigma^2}\sqrt{[d_1^2 + d_2^2 + 2d_1 d_2 \cos\phi]} \quad (66)$$

and $d_1 = A_{n-1}R_{n-1}$, $d_2 = A_n R_n$, $\phi = [(\beta_n - \beta_{n-1}) - (\theta_n - \theta_{n-1})]$ is the difference between the observed and the expected quantities in equations (62) and (64), and $c = R_n R_{n-1}/[(2\pi\sigma^2)]^2$ is a term common to all paths. By taking the natural logarithm of equation (65) and by dropping the terms that are common to all paths, we construct a decision metric as:

$$M = -\frac{[A_{n-1}^2 + A_n^2]}{2\sigma^2} + \ln[I_0(\xi)]. \quad (67)$$

The above decision metric is based on the transition of the signal from one symbol interval to the next. In order to prevent error propagation, we can employ differential encoding. Symbol-by-symbol decisions can be made using the decision metric, variations of this approach involving branch metrics and form use in sequence estimation, with or without per-survivor processing could be constructed using these ideas by those skilled in the art using the concepts disclosed herein.

This same analysis can be applied to the QMF, DPE, or DSM receivers. Note the integral ∫r(t)dt can be computed in OFDM and similar types of systems using the FFT or other similar vector transforms, and in accordance with the present invention, this can be used in the construction of a broad class of noncoherent detectors. For example, this approach can be directly used to construct noncoherent detectors for QAM-based OFDM. The present invention contemplates that these noncoherent detectors for QAM-based OFDM would be advantageously employed in QAM-based OFDMA uplinks.

Consider an $M^2$-ary QAM with a rectangular constellation. Let the in-phase and the quadrature-phase symbols during the nth interval be $m_{1,n} = a_n$ and $m_{2,n} = b_n$ with $a_n, b_n \in \{\pm 1, \pm 3, \ldots \pm(M-1)\}$, and $\rho = 1$. Consider a standard OFDM system with tones separated by a spacing of 1/T. FIG. 1B shows a conceptual block diagram of a receiver that uses a single integration per channel of equation (60) which is implicit in the demultiplexer block 455 that can be implemented using an FFT or other type of vector transform. In a QAM embodiment, the SSB-FM blocks 460 of FIG. 1B would be replaced by QAM demodulator blocks. Note that in such embodiments the OFDM orthogonality is preserved despite the unknown carrier phase $\gamma$.

Now compare the computational complexity of a detector as constructed above with a QMF based detector based on equation (30). The QMF-based detectors would typically require $M^2$ correlation integrals to be computed. However, in accordance with the present invention, for the case of QAM-based OFDM, a single FFT operation implicitly computes all the integrals of equation (60) for each channel. These integral values can be plugged directly into equations (65)-(67) to implement the symbol-by-symbol detectors. Alternatively, all correlations of equation (30) can be computed from the FFT outputs which provide the integral values of equation (60). Hence FFT-based noncoherent QMF detectors can be produced that process the integral values of equation (60) in each channel, but with much lower computational complexity than a more direct extension of noncoherent QMF to OFDM. This is true because with QAM, the transmitted signal phase and amplitude in each channel is constant in each symbol interval and all the integrals of equation (30) can be written in terms of those of equation (60). Further, all the integrals in equations (30) and (33) can be calculated with one integrated sample per interval, i.e. with K=1 and using equations (31) and (34). It should be understood that any such noncoherent detection scheme used with OFDM or NBFDM uplinks are specific embodiments of the present invention, but we favor the more computationally efficient approaches and therefore point those out.

Note also that a DPE receiver can be constructed to maximize the probability density function of equation (65) or its logarithm. As mentioned above for generalized DQAM types of modulations. When the above approach is applied in OFDM systems, we note that the integrals of equation (60)-(61) are implicitly computed via the FFT similar to FIG. 1B, and the symbol interval corresponds to an OFDM symbol interval. Similarly, any of the K-point summations discussed herein can be implicitly computed using vector transformations in various embodiments, where the K-point summations thus correspond to the integrals of equation (60)-(61), their equivalents, their approximations, or other similar quantities.

In accordance with an aspect of the present invention as per FIGS. 20-21, a bursted orthogonal frequency division multiple access method is provided for use in a wireless communication system. The method involves wirelessly transmitting downlink signals from the headend 1005 to a plurality of wireless subscriber stations using an OFDM downlink communication protocol. A set of antenna parameters are varied at or on behalf of the headend to provide a time-varying downlink antenna pattern. The headend 1005 then receives from respective ones of the wireless subscriber stations respective quality measurements indicative of received downlink signal reception quality. A scheduler, preferably and optionally implemented in the headend, then schedules two or more of the plurality of wireless subscriber stations to simultaneously transmit separate portions of an uplink OFDM signal on respective sets of tones during a burst interval comprising one or more symbol intervals. The scheduling of the two or more of the plurality of wireless subscriber stations takes into account the quality measurements and, for example, any further information such as a geographical location information, relative time slip data relative to the OFDMA uplink frame, and Doppler shift data, or membership of subscriber terminals within local ad hoc synchronization sub networks. The headend 1005 then receives during the burst interval from the two or more of the plurality of wireless subscriber stations respective information modulated onto the respective sets of tones in the form of a composite OFDM uplink signal.

Although the present invention has been described with reference to specific embodiments, other embodiments may occur to those skilled in the art without deviating from the intended scope. For example, certain ones of the steps of the methods or blocks of the apparatus or systems may be omitted and certain blocks can be swapped with blocks in other figures, or blocks from certain figures can be added to other figures. Alternative embodiments can be constructed by using other monotonically increasing functions of the joint probability density functions used in the derivation of various branch metrics derived herein. Similarly, while many block diagrams are described in terms of systems, apparatus and devices, any of these block diagrams could also serve as flow diagrams to describe software embodiments (i.e., methods or processes), or embodiments where certain blocks or elements are implemented in hardware and others in software. Likewise, while certain modulator and demodulator structures are described herein, these structures also define method steps that could more generally be carried out by other structures that generate the same or equivalent results in different ways using different functions. While QM-CPM was used as a primary example in this application, the general schemes can be readily used with other types of modulation formats, e.g., CPM, MSK, QPSK, DQPSK, QAM, TCM-QAM, various forms of DQAM, with either equi-probable or non-equi-probable symbols. Also, various different types of modulation schemes may be used beyond the explicitly described exemplary embodiments discussed herein. For example, while much of the application discusses AOFDMA type systems and embodiments, the noncoherent detection schemes, for example, could be used in other types of communication systems such as single channel systems, or symmetric OFDM or OFDMA type systems. The DQAM methods discussed herein are especially well suited for use in current day OFDMA systems with only minor modifications to existing uplink protocols. If further information is known about the random phase, γ, improved detectors can be constructed by taking this information into account. For example, equation (42) would be modified to take into account more detailed information than γ, being uniformly distributed over the range [0, 2π). Also, while various embodiments made reference to FIG. 1B, those embodiments optionally do not need to use the pilot channels 470, because depending on the embodiment, coherent or noncoherent detection may be used in the individual user channels 460 (which may or may not employ SSB-FM) so that the external pilot channels 470 are no longer needed. However, mixed embodiments are also envisioned where coherent or noncoherent detection is applied in user channels 460 and additional side information is supplied in the external pilot channels 470. Another variation is that while the differential phases discussed in most embodiments herein were relative to the beginning of a symbol interval. This is not required, and the differential phases can be referenced from other placed like the center of each symbol interval. Likewise, differential phases could be computed from adjacent ones of the K samples per interval, or could be combined using linear or nonlinear transformations to create transformed differential phase type values. Likewise, linear or nonlinear combinations of differential phase estimates and envelope estimates and other signal parameters can be computed and used to construct QMF-like, DPE-like or DSM-like cost functions using these transformed or combined values. Therefore, it is to be understood that the invention herein encompasses all such embodiments that do not depart from the spirit and scope of the invention as defined in the appended claims.

What is claimed is:

1. A method for use in a wireless multiple-access communication system wherein a headend communicates with a plurality of wireless subscriber stations, and the plurality of wireless subscriber stations use frequency division multiplexing to share an uplink frequency bandwidth, comprising:
   simultaneously transmitting in a downlink direction a plurality of downlink information signals to a plurality of wireless subscriber stations using an orthogonal frequency division multiplexed (OFDM) communication protocol;
   receiving a non-orthogonal narrow band frequency division multiplexed uplink signal that comprises a plurality of uplink information signals that are modulated onto respective uplink tones, wherein respective ones of the plurality of uplink information signals are transmitted from respective ones of the plurality of wireless subscriber stations, and respective ones of the uplink information signals are substantially confined to respective sub-band portions of the uplink frequency bandwidth; and
   performing frequency-domain filtering to isolate respective signal energies contained in the respective sub-band portions to extract each respective uplink information signal from the plurality of uplink information signals;
   wherein adjacent ones of the respective uplink tones have a frequency spacing drawn from a range of [0.8T, 1.2T], where T is the narrow band frequency division multiplexed signal's symbol duration, and wherein each of the respective sub-band portions of the uplink frequency bandwidth are equal to or less than the frequency spacing.

2. The method of claim 1, wherein each respective uplink information signal has at least 90% of its signal energy confined to its respective sub-band portion of the uplink frequency bandwidth.

3. The method of claim 1, wherein each respective uplink information signal has at least 95% of its signal energy confined to its respective sub-band portion of the uplink frequency bandwidth.

4. The method of claim 1, wherein each respective uplink information signal has at least 97% of its signal energy confined to its respective sub-band portion of the uplink frequency bandwidth.

5. The method of claim 1, wherein at a particular time, a particular one of the uplink information signals ceases to be modulated onto its respective uplink tone and begins to be modulated onto a second uplink tone to effect a tone switching operation in a frequency hopped uplink transmission.

6. The method of claim 1, wherein the wherein each respective one of the uplink information signals is modulated onto its respective uplink tone using a member of the group consisting of continuous phase modulation (CPM), single sideband continuous phase modulation (SSB-CPM), and quadrature multiplexed continuous phase modulation (QM-CPM).

* * * * *